(12) United States Patent
Martin et al.

(10) Patent No.: US 6,540,939 B1
(45) Date of Patent: Apr. 1, 2003

(54) TEMPLATED COMPOSITIONS OF INORGANIC LIQUIDS AND GLASSES

(75) Inventors: James D. Martin, Apex, NC (US); Todd A. Thornton, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 125 days.

(21) Appl. No.: 09/620,823

(22) Filed: Jul. 21, 2000

Related U.S. Application Data

(60) Provisional application No. 60/145,433, filed on Jul. 23, 1999.

(51) Int. Cl.[7] .................... C09K 19/52; C09K 19/54; B01J 13/02; C01B 33/26; C01G 3/35
(52) U.S. Cl. .................. 252/299.01; 252/299.5; 423/463; 423/470; 423/472; 423/704; 423/705
(58) Field of Search .................. 252/299.01, 299.5; 423/463, 470, 472, 704, 705

(56) References Cited

U.S. PATENT DOCUMENTS

| | | |
|---|---|---|
| 5,308,602 A | 5/1994 | Calabro et al. |
| 5,885,542 A | 3/1999 | Martin et al. |

FOREIGN PATENT DOCUMENTS

| | | |
|---|---|---|
| WO | WO 99/43427 | 9/1999 |

*Primary Examiner*—Shean C. Wu
(74) *Attorney, Agent, or Firm*—Jenkins & Wilson, P.A.

(57) ABSTRACT

An inorganic liquid or glass of hybrid composition including an inorganic component; and a template component, wherein the inorganic component and the template component are present in composition in a ratio that provides an intermediate range structural order to the composition. The intermediate range structural order results in the formation of metallotropic liquid crystals and anisotropic glasses. Methods of preparing the composition are also disclosed.

61 Claims, 9 Drawing Sheets

Reverse micelle $[ZnCl_6]^{4-}$

Lamellar $[ZnCl_4]^{2-}$  $[Zn_2Cl_6]^{2-}$  $[ZnCl_3^-]_n$

Cubic (bicontinuous network)

Ia3d

Hexagonal (columnar micelles)

Cubic (spherical micelles)

Inorganic Networks

TEMPLATED COMPOSITIONS OF INORGANIC LIQUIDS AND GLASSES

CROSS REFERENCE TO RELATED APPLICATIONS

This application is based on and claims priority to U.S. Provisional Application Ser. No. 60/145,433, filed Jul. 23, 1999, the entire contents of which are herein incorporated by reference.

TECHNICAL FIELD

The present invention relates to templated inorganic compositions. More particularly, the present invention relates to templated inorganic liquid and glass compositions.

BACKGROUND ART

Liquid crystals exhibit unique properties due to anisotropic ordering and orientation of the mesogens within macroscopic domains of the material. The domain ordering in liquid crystals is typically dependant on the conditions under which the mesogens are processed, and the ordering can be obtained either by varying the concentration of the mesogen in solution ("lyotropic" liquid crystallinity) or by varying the temperature of the neat mesogen ("thermotropic" liquid crystallinity). Ordered fluid phases are termed "mesophases" in that their characteristics are intermediate between those of an isotropic liquid and those of a crystalline solid. The ordered phase of liquid crystals has many of the properties of the solid state such as optical anisotropy and birefringence which produce special interference patterns that can be detected using a cross polarizing microscope.

The design of structural order in complex fluids such as liquid crystals generally involves the construction of anisotropic molecular units, and thus, the vast majority of known liquid crystalline materials are organic molecules. More recently, materials that incorporate metals into the anisotropic molecules, described as metallomesogens, have been prepared in which the metal cations act as a template for a particular geometric organization of anisotropic organic ligands. (L. Serrano, Ed., *Metallomesogens: Synthesis, Properties and Applications*, VCH, New York 1995). Anisotropic structures such as 1-D chains and 2-D layers are also frequently observed in the solid-state for inorganic materials, although much less is understood about the structural organization in the melts of such materials.

The structure, and particularly the understanding of intermediate range order in glasses and viscous liquids has been the topic of considerable controversy. (S. R. Elliott, Nature, 1991, 354, 445–452; P. S. Salmon *Proc. R. Soc. Lond.* 1994, 445, 3151–365.) Some form of network organization is generally accepted for liquids such as $SiO_2$, $ZnCl_2$ and even $H_2O$. (P. H. Poole, M. Hemmati, and C. A. Angell, *Phys. Rev. Lett.*, 1997, 2281–2284; H. E. Stanley, *MRS Bull.*, 1999, 24, 22–30.) Numerous studies attempting to articulate the nature of the intermediate range order have focused on the origin of the "first sharp diffraction peak," FSDP, observed in neutron and X-ray scattering experiments. Interpretations of FSDP origin vary from suggestions of its correlation to the first Bragg plane observed in a related crystalline phase of the material (P. H. Gaskell and D. J. Wallis, *Phys. Rev. Lett.*, 1996, 76, 66–69), to proposals of cluster and chain type-units (A. Uhlherr and S. R. Elliott, *J. Phys. Condens. Matter*, 1994, 6, L99–L105), as well as models resulting from the void structure in the liquid. (S. R. Elliott, *J. Phys. Condens. Matter*, 1992, 4, 7661–7678; M. Wilson and P. A. Madden, *Phys. Rev. Lett.*, 1998, 80, 532–535.) In view of this controversy and in view of the skepticism of the existence of large correlation lengths in liquids and glasses, there remains significant room for improvement and innovation in the design of intermediate range structural order in inorganic liquid and glasses compositions.

The observation of liquid crystallinity in inorganic systems is uncommon. (A. S. Sonin, J. Mater. Chem., 1998, 8, 2557.) While recognized as early as 1925 that sols of $V_2O_5$ form lyotropic-liquid crystals (H. Zocher, Z. *Anorg. Atlg. Chem.*, 1925, 147, 91), the development of inorganic liquid crystalline systems other than dispersions of colloidal rod-like particles (T. Jiang, and G. A. Ozin, *J. Mater. Chem.*, 1997, 7, 2213), has received very little attention. (D. -P. Kim and J. Economy, *Chem. Mater.*, 1994, 6, 395; T. Jiang, and G. A. Ozin, *J. Mater. Chem.*, 1997, 7, 2213; and A. Firouzi, et al., *J. Am. Chem. Soc.*, 1997, 119, 3596.)

What is needed, then, is further characterization of inorganic liquids and glasses in an effort to facilitate the design of such compositions. This represents a significant deficiency in the art, particularly when inorganic liquid crystals could offer a range of unique properties by combining the fluid properties of liquid crystals with potential magnetic, conducting, dielectric, optical, redox and catalytic properties common to inorganic materials.

SUMMARY OF THE INVENTION

An inorganic liquid of hybrid composition or an inorganic glass of hybrid composition is disclosed. The composition comprises an inorganic component; and a template component, wherein the inorganic component and the template component are present in the composition in a ratio that provides an intermediate range structural order to the composition.

A metallotropic liquid crystalline composition is also disclosed. The composition comprises an inorganic component; and a template component, wherein the inorganic component and the template component are present in the composition in a ratio that provides an intermediate range structural order to the composition. The specific intermediate range order can further be controlled by the variation of the ratio of the inorganic and template components.

A metallotropic glass composition is also disclosed. The composition comprises an inorganic component; and a template component, wherein the inorganic component and the template component are present in the composition in a ratio that provides an intermediate range structural order to the composition. The specific intermediate range order can further be controlled by the variation of the ratio of the inorganic and template components.

A method of preparing an inorganic liquid or glass that is a hybrid material comprising an inorganic component and an organic component that together exhibit an intermediate range structural order is also disclosed. The method comprises: providing an inorganic component; providing a template component; and mixing the inorganic and the template components at a ratio that provides an intermediate range structural order, whereby an inorganic hybrid material having an intermediate range structural order is produced.

Accordingly, it is an object of the present invention to provide a novel templated inorganic liquid or glass composition. The object is achieved in whole or in part by the present invention.

An object of the invention having been stated hereinabove, other objects will be evident as the description proceeds, when taken in connection with the accompanying Drawings and Laboratory Examples as best described hereinbelow.

DETAILED DESCRIPTION OF THE INVENTION

Figure 1A:
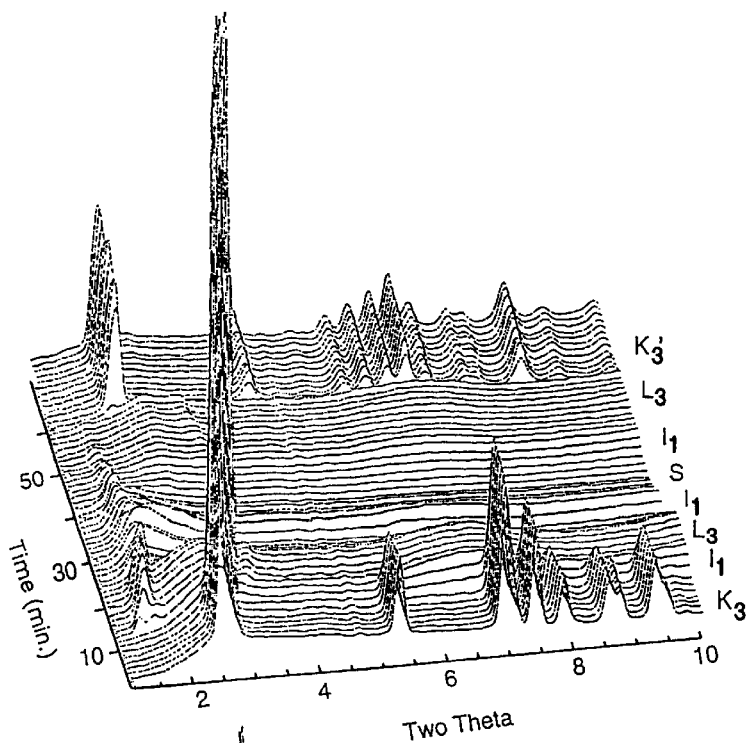
FIG. 1A is a plot of time resolved X-ray diffraction of $C_{16}TA\ ZnX-50$ obtained with 0.942 Å synchroton radiation (NSLS, X7B). The sample, placed in a Lindeman capillary, was heated at a rate of 7° C. per minute from room temperature to 250° C. then cooled to room temperature during the diffraction experiment.

The present invention pertains to templated inorganic liquid compositions and to templated inorganic glass compositions. In a preferred embodiment, the templated inorganic liquid compositions further comprise liquid crystalline systems. In another preferred embodiment, the templated inorganic compositions comprise glasses. In a more preferred embodiment, the present invention pertains to metallotropic liquid crystalline fluids that further comprise a metal-halide. These liquid crystals are described as being metallotropic because the relative template to metal-halide ratio defines the structure of the inorganic component and thus also the liquid crystalline structures and textures observed. Stated differently, the inorganic and the template component are present in the composition in a ratio that provides an intermediate structural range order to the composition.

An aspect of the present invention pertains to the observation by the applicant that for $MX_2$ covalent liquids and glasses, M=metal and X=anion such as a halide or chalcogenide, the first sharp diffraction peak (FSDP), a characteristic signature of IRO, is related to a crystalline-type distribution of the metal cations within the anion sublattice. For chalcogenides and the heavier halides, the FSDP in $MX_2$-type glasses and liquids is represented by $Q=\pi/\sqrt{2/3}r_{MM}$, whereas the FSDP for oxides and fluorides is represented by $Q=3\pi/2r_{MM}$.

In accordance with the present invention, the nature of this IRO can be further directed with respect to size and shape, yielding 1–10 nm features by the utilization of the templates disclosed herein. For example, when alkylammonium-halide (ACl) templates are added directly to $ZnCl_2$ a depoymerization of the 3-D network ensues. The structure of the inorganic anion is dependent on the relative template:zinc chloride composition; a concept described herein as metallotropism. Network depolymerization can be avoided by adding equimolar amounts of CuCl with the ACl template resulting in a $MX_2$ stoichiometry analogous to zeolite-type networks. Portions of halozeotype frameworks are retained in the network liquids.

Using the templates disclosed herein (e.g. alkyltrimethylammonium surfactant in a $ZnCl_2$ system) applicants have achieved reverse micelle, lamellar, bicontinuous cubic, hexagonal columnar and spherical micelle formation in the compositions of the present invention. The metallotropic liquid crystalline compositions of the present invention exhibit characteristics reminiscent of both thermotropic and lyotropic liquid crystals (certain remaining liquid to below room temperature). In the zinc chloride system, liquid crystallinity is observed for up to 85 mole percent $ZnCl_2$. Similar metallotropic liquid crystals of $CdCl_2$ and $CuCl_2$ are observed up to 55 and 75 mole % metal-halide, respectively. The different compositional range wherein liquid crystallinity is observed is a result of the different structural requirements of their inorganic networks. Similar liquid crystalline metal halides have been prepared with $Mn^{2+}$, $Fe^{2+}$, $Co^{2+}$, and $Ni^{2+}$. Exerting such nanometer scale control over the structure of liquids allows unparalleled control of structure/property relationships that can be exploited to manipulate optical, magnetic, reactivity, and transport properties. For example, templated structure in glassy and liquid semiconductors and alloys that are provided in accordance with the present invention find application in electronics.

Furthermore, the present invention provides high temperature templated melts, for example of metal halides or other inorganics, such as $SiO_2$. While organic templates will decompose at temperatures above ~250° C. anisotropic inorganic species including but not limited to carbon fibers, nano-tubes, clays, ceramics, etc. can be utilized to template the organization of higher-temperature metallotropic systems. Such high temperature anisotropic liquids can be used in high friction applications (for example as a clutch) since such a fluid should exhibit differential viscosity depending on the orientation of the anisotropic species.

The present invention demonstrates the viability of inorganic liquid crystals and glasses. All liquid crystals utilized in commercial applications such as display devices are organic molecules. Unlike such organic materials, the liquid crystals of this invention require no complex multi-step syntheses, and they are prepared from inexpensive commodity chemicals. The thermal stability provided by the metallotropic liquids is significant. Many organic molecules decompose at temperatures below the present high temperature limit of 275° C. The compositions of the present invention have been shown to retain liquid crystalline properties from about 275° C. to below room temperature.

Furthermore, these materials can be described as ionic liquids with an anionic inorganic component and a cationic surfactant. As such, these materials can also function as electrolytes that can be useful in, for example, battery applications. The rod-like structure of the liquid crystal also introduces an anisotropy to the conductivity of the system. By exploiting the conductivity and anisotropic molecular properties it is possible to prepare a liquid crystalline switch. An applied electric field is utilized to orient the liquid crystalline material such that there can be increased ionic conductivity parallel to the liquid crystalline director and virtually none in any other direction. This devise can be designed as a multi-pole switch with essentially molecular control. Such a multi-pole switch could be useful, for example, for the design of a logic circuit utilizing greater than a binary code.

The present invention provides the highest metal content of any known liquid crystals. When these materials are prepared with transition metals containing unpaired electrons, such as $Mn^{II}$, $Fe^{II}$, $Co^{II}$, $Ni^{II}$, and $Cu^{II}$, magnetic properties are exhibited. As such, these materials can function as magnetic liquids. By application of a magnetic field it is possible to orient the liquid crystalline material and thus its rheological and birefringence properties. By exploiting the magnetic, conductivity and optical properties of this material it is possible to prepare a magneto/electro-optic transducer. Such a transducer could be useful, for example, as an interface between magnetic and optical signals for communications and information storage.

The unpaired electrons on the metals of the metallotropic liquid crystals described above also result in colored liquids, due the electronic transitions in the range of visible light. Liquid crystals exhibiting colors throughout the red through green portion of the visible spectrum have been prepared. These colored liquid crystals provide application as colored liquid crystal displays and further as switchable colored filters.

Furthermore, the high metal content of these metallotropic liquid crystals provides a reactive liquid with a defined structural organization. When used as a solvent, these metallotropic liquids will act as a catalyst and provide reactant and product selectivity based on the anisotropic structure of the liquid crystal. The utilization of chiral templates further provides for the preparation of chiral and catalytic liquids which when utilized as solvents can provide enantiomeric selectivity of the reaction products.

Additionally, in certain embodiments, a composition of the present invention can act as a Lewis-acidic inorganic liquid that has been expanded to yield a channel structure that is filled with essentially an organic solvent, e.g. surfactant tails. Small molecules can be dissolved in these solvent channels within, for example, a catalytically active metal halide.

The compositions of the present invention thus offer several advantages. The advantages include, but are not limited to, the make-up of the composition itself, i.e. comprising an inorganic component; optional high metal content; thermal stability and large temperature window over which the liquid crystalline properties are observed; cost of preparation (very economical, prepared from essentially commodity chemicals); potential for magnetic liquids and potential for anisotropic conductivity.

Like all liquid crystals, these materials have considerable utility as display materials. Their properties as an anisotropic polyelectrolyte offer the possibility for the construction of liquid, current switching devices. Such a material could also, for example, be utilized in a battery in which the electrolyte will only carry charge when an appropriate potential is applied to the liquid-crystalline electrolyte.

Thus, the present invention provides several families of inorganic/organic composite liquid crystalline phases. These materials are prepared with up 90 mole % inorganic content. These hybrid systems can optionally be described as metallotropic liquid crystals. Materials have been prepared with numerous transition metal halides as the foundation of the inorganic component, thus providing a tunability of their thermal, structural, magnetic, optical and etc. properties, and the ionic liquid character of several of these phases make them attractive for a variety of applications.

A. Definitions

As used herein, the following terms are meant to have their art-recognized meanings. However, the following definitions are set forth to facilitate explanation of the present invention.

As used herein, the terms "composite" and "hybrid" are used interchangeably to refer to a material comprising two or more distinct components. The components can optionally be present as a continuous matrix and a templating or ordering structure. A composite or hybrid is formed when two or more materials are combined with the intent of achieving better properties than can be achieved with a single component.

The term "intermediate range order" and "intermediate range structural order" are used interchangeably herein and refer to any regular geometry of nanometer-scale dimension intrinsic to a network liquid or glass, or, imparted to a liquid or glass composition upon interaction of an inorganic component with a template component.

The term "liquid-crystalline" refers to having fluid properties similar to that of a liquid and a degree of molecular order reminiscent of a crystalline solid.

As used herein, the term "mesogenic unit" includes any portion of a component that is responsible for the formation of a liquid crystalline mesophase.

The term "component" is used herein to refer to each of the individual chemical substances that interact with one another to produce a particular material.

The term "material" is used herein to refer to solid-state compounds, extended solids, extended solutions, clusters of molecules or atoms, crystals, liquid crystals, glasses, etc.

The term "covalent network liquid" as used herein refers to a liquid that comprise atoms held together in a large network of chains by covalent bonds.

The term "ionic liquid" as used herein and in the claims refers to a liquid that can be modeled as cations and anions held together by electrical attraction of opposite charge.

The terms "inorganic material" or "inorganic component" refer to material or to a component that does do not contain carbon as a principal element. The oxides and sulfides of carbon and the metal carbides are considered inorganic materials. Other examples include, but are not restricted to, the following:

(a) Intermetallics (or intermediate constituents): Intermetallic compounds constitute a unique class of metallic materials that form long-range ordered crystal structures below a critical temperature. Such materials form when atoms of two metals combine in certain proportions to form crystals with a different structure from that of either of the two metals (e.g., NiAl, $CrBe_2$, CuZn).

(b) Metal alloys: A substance having metallic properties and which is composed of a mixture of two or more chemical elements of which at least one is a metal.

(c) Magnetic alloys: An alloy exhibiting ferromagnetism such as silicon iron, but also iron-nickel alloys, which can contain small amounts of any of a number of other elements (e.g., copper, aluminum, chromium, molybdenum, vanadium, etc.), and iron-cobalt alloys.

(d) Ceramics: Typically, a ceramic is a metal oxide, boride, carbide, nitride, or a mixture of such materials. In addition, ceramics are inorganic, nonmetallic products that are subjected to high temperatures (i.e., above visible red, 540° C. to 1,000° C.) during manufacture or use. Such materials include, for example, alumina, zirconium, silicon carbide, aluminum nitride, silicon nitride, the $YBa_2Cu_3O_{7-\delta}$ superconductor, ferrite ($BaFe_{12}O_{19}$), Zeolite A ($Na_{12}[(SiO_2)_{12}(AlO_2)]27H_2O$), soft and permanent magnets, etc.

(e) High temperature superconductors: High temperature superconductors include, but are not restricted to, the $La_{2-x}Sr_xCuO_4$ superconductors, the $Bi_2CaSr_2Cu_2O_{8+x}$ superconductors, the $Ba_{1-x}X_xBiO_3$ superconductors and the ReBaCu superconductors. Such high temperature superconductors can have critical temperatures above 30 K, preferably above 50 K, and more preferably above 70 K.

The terms "organic material" or "organic component" are meant to refer to compounds, which generally consist of carbon and hydrogen, with or without oxygen, nitrogen or other elements, except those in which carbon is not a principal element (e.g., carbonate salts). Examples of organic materials include, but are not restricted to, the following:

(a) Non-biological, organic polymers: Nonmetallic materials consisting of large macromolecules composed of many repeating units. Such materials can be either natural or synthetic, cross-linked or non-crosslinked, and they can be homopolymers, copolymers, or higher-ordered polymers (e.g., terpolymers, etc.). By "non-biological", α-amino acids and nucleotides are excluded. More particularly, "non-biological, organic polymers" exclude those polymers that are synthesized by a linear, stepwise coupling of building blocks. Examples include, but are not limited to, the following: polyurethanes, polyesters, polycarbonates, polyethyleneimines, polyacetates, polystyrenes, polyamides, polyanilines, polyacetylenes, polypyrroles, etc.

(b) Organometallic materials: A class of compounds of the type R—M, wherein carbon atoms are linked directly with metal atoms (e.g., lead tetraethyl ($Pb(C_2H_5)_4$), sodium phenyl ($C_6H_5Na$), zinc dimethyl ($Zn(CH_3)_2$), etc.).

(c) Another organic molecule or ion, such as an alkylammonium ion or $((CH_3)_3NH]X$, X=Cl or Br.

Following long-standing patent law tradition, the terms "a" and "an" are meant to refer to one or more as used herein, including the claims.

B. General Considerations

Much of the present understanding of chemical structure has been derived from studies of isolated molecules and extended crystalline solids. However, as is well known to chemists studying polymers, liquid crystals and glasses, an organization of chemical structure intermediate between that of molecules and extended crystalline solids is critical for specific properties of these important materials. As progress is being made toward rational strategies for the synthesis of extended inorganic solids, it is also recognized that molecular aggregates often play a critical role in the formation of extended structures. In this respect, the use of molecular precursors has received considerable attention as an approach for developing low temperature routes for the preparation of solid-state materials. (A. P. Alivisatos, et al. *Adv. Mater.*, 1998, 10, 1297–1336.) The converse perspective, which seeks to understand the structure of the molecular aggregates formed upon melting (the dissociation of) extended solids, has received significantly less attention.

B.1. Intermediate Range Order in Liquids

A complexity in the structure of a liquid that cannot be described as the condensation of hard spheres is observed when the liquid comprises molecules with anisotropic shape, or when the liquid comprises elements, molecules or ions which exhibit bonding characteristics to form extended assemblies. Anisotropic molecular shape or network assembly results in liquids which exhibit structural organization well beyond that of the short range order (SRO) of the basic substituant species, i.e. an intermediate range order (IRO).

Since the discovery of liquid crystalline materials in the late $19^{th}$ century (F. Reinitzer, *Monatsch Chem.*, 1888, 9, 421) it is now well recognized that the liquid structure of rod and disk shaped molecules, with an aspect ratio of approximately 5, exhibit significantly long range order to induce optical birefringence that has been extensively developed for display applications. Such fluids are generally grouped into classifications of nematic—in which molecules are distributed at random but have a common direction, and smectic—in which the molecules have both a common direction and are generally arranged in parallel layers. A systematic diffraction study of primary, normal alcohols, $CH_3(CH_2)_nOH$, n=0–10 clearly demonstrates the onset of structural ordering in these liquids. (G. W. Stewart, R. M. Morrow, *Phys. Rev.*, 1927, 30, 232.) A broad diffraction feature corresponding to a real space distance of ~4.5 Å is relatively invariant across this series, consistent with the van der Waals diameter of an alkyl chain. A second diffraction feature is observed with a linear dependence on the molecular chain length. These diffraction features are produced by the intermediate range ordering (IRO) of planes containing the polar alcohol groups that are perpendicular to the direction of the parallel carbon chains.

Supramolecular assemblies of molecules, particularly through hydrogen bonding arrangements, lead to particularly complex liquid structures. The structure of water, among the most thoroughly studied exhibits a complex hydrogen bonded network with a transient gel-like local structure. (H. E. Stanley, *MRS Bull.*, 1999, 24, 22.) Numerous non-aqueous solvents exhibit similar complex structural organization. (H. Ohtaki and S. -I. Ishiguro in *Chemisry of Non-Aqueous Solutions*, G. Mamantov and A. I. Popov, Eds., VCH Publishiers, New York, 1994, pp. 179–226.) An understanding of the structure and intermolecular interactions of solvents plays a role in understanding the physicochemical properties of solvents, the medium in which the vast majority of chemical reactions are performed.

While liquid elemental metals and noble gasses are reasonably described from a model of hard spheres, elements in group 14, 15, 16 and 17 typically form strong element-element interactions that are not lost on going from the solid to liquid state. For example, P, As, S and Se exhibit distinct signatures for intermediate range order by diffraction and Raman experiments. (J. S. Lannin, *J. Non-Cryst Solids*, 1987, 97&98, 203.) Diffraction studies of amorphous P and As exhibit a strong first sharp diffraction peak (FSDP) at indicative of an ordering length scale of about 6 Å. It has been suggested that this corresponds to a local anisotropy giving rise to a quasi-layer-like regions over short distances. (B. V. Shanabrook and J. S. Lannin, *Phys. Rev.*, 1981, B24, 4771.) The formation of chain and ring-like structures are important for the understanding of liquid and amorphous sulfur and selenium. Crystalline polymorphs of sulfur exhibit different packings of discrete $S_8$ rings, which have been shown to persist into the liquid state upon melting. (C. W. Tompson and N. S. Gingrich, *J. Chem. Phys.*, 1959, 31, 1598; A. T. Ward, *J. Phys. Chem.*, 1968, 72, 4133.) At 433 K however the λ-transition occurs where the rings rupture to form long polymeric chains, which in turn result in a marked increase in viscosity. Liquid Se exhibits much less pronounced intermediate range order, but there is reasonable evidence for chain structures in amorphous Se.

An aspect of the present invention pertains to the analysis of the structure of covalent liquids $MX_n$ where M is a metal or main group element, X is O, S, Se, F, Cl, Br, and I and n is a real number between 0 and 6. Unlike a classical molten salt, such as NaCl, melts of such covalent liquids (e.g. $SiO_2$, $GeS_2$, $ZnCl_2$ . . . ) exhibit high viscosity and low conductivity consistent with their description as strong to intermediate on Angell's scale of fragility. Many of these network-forming liquids also readily supercool to a glassy state in which structural characteristics of the respective glasses and liquids are often very similar. (*Supercooled Liquids: Advances and Novel Applications*, J. T. Fourkas, D. Kivelson, U. Mohanty, and K. A. Nelson, Eds. ACS Books, Washington, D.C., 1997; W. Vogel, *Glass Chemistry*, $2^{nd}$ edition, Springer-Verlag, Berlin, 1985.) Unlike simple elemental liquids in which the short-range length scale of the nearest neighbor contact also determines the scale of any longer range ordering, these more complex covalent liquids exhibit distinct structural features of short range order (SRO), the M—X distance, and features from next-nearest neighbor contacts which provide signatures of intermediate range order (IRO). The resultant M-M and X-X pair correlations in these complex fluids give rise to diffraction features on longer length scales. A majority of these covalent liquids exhibit a diffraction peak at between ~1 and 1.5 Å$^{-1}$, the first sharp diffraction peak (FSDP) which is indicative of IRO. As discussed above, extensive debate is found regarding the origin and interpretation of this diffraction feature. (M. Wilson, P. A. Madden, *Phys. Rev. Lett.*, 1998, 80, 532; M. Wilson, et al., *J. Chem. Soc. Faraday Trans.*, 1998, 94, 122; L. Oervinka, *J. Non-Cryst. Solids*, 1988, 106, 291; P. S. Salmon, *Proc. R. Soc. Lond.* A, 1994, 445, 35.)

A further complication to understanding the structure of multi-component covalent liquids is that in the absence of discrete molecular units, varied proportions of M to X result in different bonding characteristics of M, different oxidation states, and differing degrees of oligomerization. These bonding features directly influence the SRO, for example whether tetrahedral or octahedral coordination is observed, and also influence the extent and geometry of oligomerization, which likely impact the IRO of the system. Chlorosilanes nicely demonstrate this principle. $SiCl_4$ exhibits discrete tetrahedral molecular units, which even in the liquid state poses sufficient IRO to give rise to a FSDP at ~1.2 Å. (C. T. Rutledge, G. T. Clayton, *J. Chem. Phys.*, 1970, 52, 1927.) By contrast several higher silicon halides $[SiCl_2]_n$ have also been reported (n=4, 5, 6, and ∞) which generally form viscous liquids or glasses. (J. R. Koe, et al., *Angew. Chem. Int. Ed.*, 1998, 37, 1441; J. R. Koe, et al., *Polyhedron*, 1998, 17, 1971; R. Schwarz, H. Mekbach, *Z. Anorg. Allg. Chem.*, 1937, 232, 241; R. Schwartz, A. Koster, *Z. Anorg. Alig. Chem.*, 1952, 270, 2; E. Hengge, D. Kovar, *Z. Anorg. Allg. Chem.*, 1979, 458, 163.) Here the Si remains tetrahedrally coordinated, however, to two chlorides and two neighboring Si atoms. The smaller perchloropolysilanes, exhibit ring oligomers. Upon sublimation of $Si_4Cl_8$ crystals of the ring opened polymer $[SiCl_2]_\infty$ were obtained which exhibit parallel-alligned chains of trans-$SiCl_2$.

B.2. Metallotropism

The structure of any hybrid material (i.e. one that is composed of more than one component) varies as a function of the relative contribution by each component. In the context of a homogeneous solution, a specific change in structure might not be discernable. By contrast, the onset of phase separation between the two components creates distinct structural mophologies as a function of the materials composition. For example, many surfactants form lyotropic liquid crystals because their polar head and non-polar tail organize with dramatically different structures to minimize polar/non-polar repulsion when dissolved a solvent; the specific structure being dependent on the relative surfactant to solvent concentration.

A similar composition dependent structural variation is observed for numerous crystalline inorganic systems in which the specific structure of the primary inorganic species of a hybrid material varies with the relative inorganic to A concentration (where A can be an organic template or the salt of an alkali or alkaline earth metal, for example). This hetero-species is frequently described as the template to the primary inorganic material. This concept of composition dependent structural behavior in a hybrid material is herein described as metallotropism.

Until the disclosure of the present invention, metallotropism has not been recognized in liquid crystalline and glass systems. Discrete inorganic anions, such as $PdCl_4^{2-}$, $AlCl_4^-$, $BF_4^-$, $PF_6^-$, etc. have been utilized to direct the organization of surfactants in a manner related to thermotropic liquid crystals. The bonding preferences of the discrete inorganic anions dictate a single composition of the inorganic and template components. In the present invention a continuous range of composition of the inorganic and template components is described. With surfactants as templates the present invention describes the surfactant organization of the inorganic component whereby the structure of the inorganic component is not restricted to a discrete composition and structure, but rather is the matrix that is organized by the template. Further, the present invention pertains to providing intermediate range structure in liquids and glasses as a result of the size, shape and charge of the local structural units of the liquid or glass.

C. Compositions

An inorganic liquid of hybrid composition or an inorganic glass of hybrid composition is disclosed. The composition comprises an inorganic component and a template component, wherein the inorganic component and the template component are present in composition in a ratio that provides an intermediate range structural order to the composition.

A metallotropic liquid crystalline composition is also disclosed. The composition comprises an inorganic component and a template component, wherein the inorganic and the template components are present in the composition in a ratio that provides an intermediate range structural order to the composition.

A metallotropic glass composition is also disclosed. The composition comprises an inorganic component and a template component, wherein the inorganic and the template components are present in the composition in a ratio that provides an intermediate range structural order to the composition.

Preferably, the ratio further comprises a greater mole percent of the inorganic component as compared to the template component to thereby provide an inorganic hybrid composition that is rich in the inorganic component. At the inorganic richer compositions, the template component can serve to template lamellar, cubic and hexagonal organizations to thereby provide an intermediate range structural order. Thus, the term "intermediate range structural order" and "intermediate range order" are meant to encompass such organizations.

In accordance with the present invention, the inorganic component can direct structural order. As discussed in the Examples, aggregation and micelle formation has been observed. For example, in template rich compositions, the inorganic component directs the structural organization of the template. Thus, the terms "intermediate range structural order" and "intermediate range order" are also meant to encompass such organizations.

C.1. Inorganic Components

The inorganic component can further comprise a covalent liquid $MX_n$ where M is a metal or main group element, X is O, S, Se, F, Cl, Br, and l and n is a real number between 0 and 6. The metal or main group element can comprise any suitable oxidation state, but preferably comprises a monovalent or divalent oxidation state. Exemplary metals include but are not limited to Al, Mn, Fe, Co, Ni, Cu, Zn, Cd and combinations thereof. In a preferred embodiment, the compositions of the present invention further comprise a divalent metal halide, and exemplary halogens include but are not limited to F, I, Cl, Br and combinations thereof. Other metal halides include CuCl, $AlCl_3$ and $FeCl_3$.

In one embodiment, the metal halide is $ZnX_2$ where X=Cl or Br, and the composition further comprises from about 0.01 to about 90 mole percent $ZnX_2$. In this case, when the composition further comprises at least about 45 mole percent $ZnX_2$, a secondary component such as up to about 5 mole percent of $((CH_3)_3NH]X$, X=Cl or Br can dissolve in the liquid crystal with retention of the liquid crystalline properties.

In another embodiment, the metal halide is $CdX_2$ where X=Cl or Br, and the composition further comprises from about 0.01 to about 60 mole percent $CdX_2$. In yet another embodiment, the metal halide is $CuX_2$ where X=Cl or Br, and the composition further comprises from about 0.01 to about 75 mole percent $CuX_2$. In each of these embodiments and as discussed in the Examples, the mole percent can comprise any value across the listed range, including but not restricted to 1, 5, 10, 15, 20, 25, 30, 35, 40, 45, 50, 55, 60, 65, 70, 75, 80, 85 and 90 mole percent.

Optionally, a composition of the present invention can further comprise the formula:

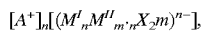

wherein A is the template component, $M^I$ is a metal in a monovalent oxidation state, $M^{II}$ is a metal in a divalent oxidation state. X is a halogen, and m and n are integers, and the integers can range from 1 to infinity, preferably from 1 to 150, more preferably from 1 to 20, and even more preferably from 1 to 6.

Thus, the inorganic component can encompass any glass-forming inorganic material. By way of additional example, the present invention encompasses oxygen-, sulfur-, and/or silicon-containing materials, such as oxides, sulfides, chalcogenides, selenides, and silicates. Such compositions can optionally comprise the metal ions listed above and can also comprise Sn, Sb, Ag, Au, Pb, Mg, Al, Ga, Cr, Si, Ge, Ti, Zr, V, W, Mo and/or combinations thereof, and/or any other suitable metal as would be apparent to one of ordinary skill in the art.

The present invention utilizes other glass-forming inorganic elements, including but not limited to B-, P-, As-, S-, Se- and Te. Certainly, any combination of the metals and other chemical species listed herein that comprises a glass-forming inorganic material is also provided in accordance with the present invention.

The present invention also provides the production of liquid crystalline metals and semiconductors in view of the similarities in geometry that are observed between, for example, the liquid metal halides and liquid metals. Many metals exhibit a lower melting temperature than their respective metal halides, thus, liquid crystalline metals can be formed at temperatures below the decomposition temperature of organic surfactant templates. Exemplary metals are listed above.

Glass compositions of the present invention can preferably be formed by quenching a melt of metal halide (e.g. $ZnCl_2$) with a template such as an alkyl ammonium cation. Glass compositions of the present invention can also be from the melts of CZX-1, CZX-2, CZX-3, and CZX-4, or from the melts of $ZnCl_2$ and $CuAlCl_4$. Luminescent glasses of $ZnCl_2$ and $CuAlCl_4$ are also provided.

Compound CZX-1, has the formula $[NH(CH_3)_3]CuZn_5Cl_{12}$. Compound CZX-2, has the formula $[NH_2(CH_2CH_3)_2]CuZn_5Cl_{12}$. Compound CZX-3 has the formula $[H_2N(CH_3)_2]n[Cu_nZn_6nCl_{12}]$, wherein n can be 1 or 2. Compound CZX-4 has the formula $[Al]_n[Cu_2Zn_2Cl_7]$, wherein A can be $H_3NCH_3^+$ or $Rb^+$. These compounds are also disclosed in U.S. Pat. No. 5,876,637 to Martin et al.; and U.S. Pat. No. 5,885,542 to Martin et al., herein incorporated by reference.

C.2. Template Components

The template component can be any suitable template component in accordance with an object of the present invention. For example, the template component can be selected from the group including, but not limited to, an organic molecule or ion, a surfactant, an alkali metal cation, an alkaline earth metal cation, a clay, a nano-tube, a carbon fiber, a ceramic, and combinations thereof.

The surfactant can further comprise an unsubstituted branched or unbranched $C_{1-20}$-alkyl, a substituted branched or unbranched $C_{1-20}$-alkyl, an unsubstituted branched or unbranched $C_{1-20}$-alkenyl, a substituted branched and unbranched $C_{1-20}$-alkenyls, an unsubstituted branched or unbranched $C_{1-20}$-alkynyls, a substituted branched or unbranched $C_{1-20}$-alkynyls, substituted, unsubstituted, or multiple ring aryl groups, or combinations thereof.

The term "alkyl" is meant to have its art-recognized meaning. Substituted and unsubstituted, as well as branched and unbranched $C_1$ through $C_{20}$-alkyls are particularly contemplated, including methyl- (also referred to herein as Me), ethyl- (also referred to herein as Et), propyl-, isopropyl-, n-propyl- and butyl-. Exemplary substituents include —OH and —OR, wherein R is a $C_{1-4}$ alkyl.

The term "alkenyl" is meant to have its art-recognized meaning. Substituted and unsubstituted, as well as branched and unbranched $C_1$ through $C_{20}$-alkenyls having at least one double bond at varying locations are particularly contemplated, including vinyl-, allyl- and isopropenyl-. Exemplary substituents include —OH and —OR, wherein R is a $C_{1-4}$ alkyl.

The term "alkynyl" is meant to have its art-recognized meaning. Substituted and unsubstituted, as well as branched and unbranched $C_1$ through $C_{20}$-alkynyls having at least one triple bond at varying locations are particularly contemplated, including ethynyl-, propynyl-, and butynyl-. Exemplary substituents include —OH and —OR, wherein R is a $C_{1-4}$ alkyl.

The term "aryl" is meant to have its art-recognized meaning. Substituted, unsubstituted, and multiple ring aryl groups are particularly contemplated, including benzyl-, ethylbenzyl-, phenyl-, xylene substituents, toluene substituents, sytrene substituents, and naphthalene substituents.

A surfactant template can thus further comprise a chain length of $C_8$ to $C_{18}$. A surfactant template can also further comprise a nitrogen substituent. The template component can further comprise an organic molecule or ion, such as an alkylammonium ion or $[(CH_3)_3NH]X$, X=Cl or Br.

C.3. Other Components and Characteristics

An inorganic hybrid composition of the present invention can further comprise a polar solvent. Optionally, the polar solvent is water, acetone, methanol or a combination thereof. The inclusion of a polar solvent can provide additional characteristics to the composition, as discussed in the Examples.

The compositions of the present invention preferably further comprise at least one macroscopic characteristic. Representative macroscopic characteristics include but are not limited to a magnetic characteristic, an optical characteristic, a conductive characteristic, a catalytic characteristic, a luminescent characteristic, and combinations thereof.

Thus, in addition to the synthesis and structural chemistry of the inorganic hybrid materials of the present invention, a broader range of physical properties such as their birefringence, rheology, polarizability, ionic conductivity and switching characteristics are disclosed herein. For example, a measurement of the birefringence of $C_{16}$TA-ZnX-66 using the Michel-Lévy interference color chart found a positive birefringence of approximately 0.015.

D. Methods for Producing the Compositions

A method of preparing an inorganic liquid or glass that is a hybrid material comprising an inorganic component and an organic component that together exhibit an intermediate range structural order is also disclosed. The method comprises: providing an inorganic component; providing a template component; and mixing the inorganic and the template components at a ratio that provides an intermediate range structural order, whereby an inorganic hybrid material having an intermediate range order characteristic is produced.

As noted above, the ratio can further comprise a greater mole percent of the inorganic component as compared to the template component to thereby provide an inorganic hybrid material that is rich in the inorganic component. The mixing of the inorganic component and the template component can further comprise melting the mixture, and can also comprise melting the inorganic component, melting the template component and mixing the melts. Alternatively, the mixing of the inorganic component and the template component can further comprise mixing the inorganic component and the template material in a solvent and evaporating the solvent.

A polar solvent can be added during the mixing of the inorganic component and the template component. The polar solvent can comprise, but is not limited to, water, acetone, methanol or combinations thereof.

E. Laboratory Examples

The following Laboratory Examples have been included to illustrate preferred modes of the invention. Certain aspects of the following Laboratory Examples are described in terms of techniques and procedures found or contemplated by the present inventors to work well in the practice of the invention. These Laboratory Examples are exemplified through the use of standard laboratory practices of the inventors. In light of the present disclosure and the general level of skill in the art, those of skill will appreciate that the following Laboratory Examples are intended to be exemplary only and that numerous changes, modifications and alterations can be employed without departing from the spirit and scope of the invention.

LABORATORY EXAMPLE 1

Templated Zinc Chloride Compositions

Zinc chloride forms covalent network structures in both the glass and low temperature melts. S. Bigin, and J. E. Enderby, *J. Phys. C: Solid State Phys.*, 1981, 14, 3129; C. A. Angell and J. Wong, *J. Chem. Phys.*, 1970, 53, 2053. In this Example, zinc chloride liquids were employed in the creation of intermediate range order in the presence of, for example, surfactant templates.

It is demonstrated that an entire family of metallotropic liquid crystalline materials can be prepared by the combination of zinc chloride, $ZnCl_2$, and a variety of alkylammonium halide salts. This Example pertains to the use of alkylammonium surfactants as the templating cations, though this phenomenan is not limited to this type of template. Liquid crystalline properties have been observed for compositions ranging from five mole percent $ZnCl_2$ and ninety-five mole percent surfactant (described as $C_{16}$TA-ZX-5) for the surfactant cetyltrimethylammonium, to compositions with eighty-five mole percent $ZnCl_2$ and fifteen mole percent surfactant (described as $C_{16}$TA-ZX-85). And depending on the composition, liquid crystallinity has been observed at temperatures from below room temperature upon super cooling, up to approximately 275° C.

Several isolable metastable phases have been observed on super cooling. It should also be noted that specific variations have been documented for varied alkyl chain lengths, and in general, the shorter the alkyl chain length of the surfactant the lower the temperature of the crystal to liquid crystal transition.

Exploiting the propensity for zinc chloride to supercool into an amorphous state, and to form network structures in both the glass and low temperature melts, this Example thus discloses the preparation of liquid crystalline fluids in the presence of cetyltrimethylammonium (CTA) surfactant cation templates. Similar behavior was observed with both the bromide (CTAB) and chloride (CTAC) salts. However, because of the initial availability of anhydrous CTAB the details of this Example, and thus, the discussion focus on the $CTAB/ZnCl_2$.

In the $CTAB/ZnCl_2$ binary system, a novel range of complex fluids are observed that exhibit liquid crystalline characteristics with greater than 80 mole percent $ZnCl_2$.

Inorganic-templated organic fluids are observed for the surfactant rich compositions and organic-templated inorganic fluids are formed for metal-halide rich compositions. This is notably distinct from other ionic metalomesogens (F. Neve, *Adv. Mater.* 1996, 8:277), which have been prepared with surfactants in the presence of discrete ions such as the $MCl_4^{2-}$ anions. C. J. Bowlas, et al., *J. Chem. Soc. Chem. Commun*, 1996, 1625; and F. Neve, et al., *Chem. Mater.*, 1998, 10, 1904. To describe this system, the nomenclature "$C_{16}$TA-ZnX #" is adopted where $C_{16}$ represents the sixteen-carbon tail of the surfactant, TA represents the trimethylammonium head, ZnX represents the zinc halide (X=Cl and/or Br) and # represents the mole-percent of $ZnCl_2$. The phase relationships within this system were measured via DSC, polarized light optical microscopy, and variable temperature X-ray diffraction measurements.

The phase transitions are readily observed by polarized light microscopy. Two to three samples of neighboring compositions were placed on the same microscope slide and examined after equilibration for at least ½ h, at a minimum of 100 intervals to establish boundaries. DSC transitions are generally only observed on heating, likely due to the propensity of zinc chloride to supercool into amorphous phases on cooling from the melt.

Two crystalline phases are observed at ambient temperature between the binary components of the $CTAB/ZnCl_2$ phase diagram. These crystalline phases are readily synthesized from melt reactions or by recrystallization from methanol. At a composition of two equivalents of CTAB to one equivalent of $ZnCl_2$ ($C_{16}$-ZnX 33), the crystalline material exhibits a powder diffraction pattern very similar to the previously characterized $[H_3N(n-C_nH_{2n+1})]_2ZnCl_4$ salts. F. J. Zuniga and G. Chapuis, *Cryst Struct. Comm.*, 1981, 10, 533; C. Almirante, et al., *J. Phys. Chem.*, 1986, 90, 852. Layers of tetrahedral $ZnCl_4^{2-}$ anions separate interdigitated bilayers of surfactant cations. The unit cell parameters of a=15.16 Å, b=7.68 Å, c=28.45 Å, $\alpha=\gamma=90°$, $\beta=92.04°$ suggest that the surfactant alkyl chains are oriented nearly orthogonal to the inorganic plane. Addition of $ZnCl_2$ to the reaction mixture to yield a 1:1 mole ratio of the surfactant and inorganic yields crystals of a new structure type, $C_{16}$-ZnX 50, in which $Zn_2Cl_6^{2-}$ dimers are separated by an interdigitated surfactant bilayer as determined by a single crystal structure. J. D. Martin, et al., *Chem. Mater.*, 1998, 10, 2699. (Lattice constants a=7.9066(8)Å, b=7.9459(7)Å, c=20.3558(2)Å, $\alpha=80.561(9)°$, $\beta=87.814(9)°$ and $\gamma=74.408(7)°$.) With the anionic charge separated over a greater surface area by the larger $Zn_2Cl_6^{2-}$ anion, the alkyl bilayer is required to adopt a significantly canted geometry with respect to the inorganic plane (38°) in order to maintain van der Waals contacts between the surfactant alkyl chains. Reactions loaded at compositions intermediate to these crystalline phases yield materials with a soap like consistency and diffraction patterns are generally characteristic of one or the other of these phases. Depending on the source of CTAB used, crystallites of an impurity phase are also observed for compositions of less than 30% $ZnCl_2$, which exhibit a cubic morphology and do not melt until above 300° C. In a related cadmium system we have found similar impurity single crystals of $[A]CdX_3$, X=Cl and/or Br. See Example 7 below.

Upon melting, each of the crystalline and intermediate compositions exhibit liquid crystalline characteristics. The optical texture of the surfactant rich liquid crystalline fluid (<28% $ZnCl_2$) observed under cross-polarized light shows a unique lancet-type texture that is shearable. This texture is observed at compositions on either side of 15 mole-percent; however, the narrow region 15±1% composition exhibits unique characteristics. The lancet-type texture is similar to that described for a discotic organization (G. W. Gray and J. W. G. Goodby, *Smectic Liquid Crystals: Textures and Structures*, Leonard Hill, London, 1984 pp. 23–44, 74–81, plates 4, 26 and 29; J. Billard, in *Liquid Crystals of One- and Two Dimensional Order*, W. Helfrich and G. Heppke Eds., Springer-Verlag, Berlin, 1980, pp. 383–395), suggesting the formation of columnar structures of reverse micelles. This texture is also reminiscent of that recently reported for $Pd((C_{16}H_{33})_2\text{-imy})_2Cl_2$. C. K. Lee, et al., *Chem. Mater.* 1999, 11, 1237. At the 20% composition, the stoicheometric formation of $ZnCl_6^{4-}$ anions is implicated whereby four surfactant cations are organized into a geometry similar to that observed for the Pd complex. Interestingly, the apparent eutectic-like feature observed at a composition of ~28 mole-percent $ZnCl_2$ is reminiscent of a similar feature in the aqueous/CTAB phase diagram at just above 95 weight-percent CTAB (in the aqueous/CTAB system 98 wt. %=70.7 mol. %). X. Auvray, et al., *J. Phys. Chem.*, 1989, 93, 7458. This eutectic-like feature is implicated as the point of transition between reverse micellar and lamellar structures.

Discrete $ZnX_4^{2-}$ anions organize two surfactant cations per anion into a lamellar structure at the composition $C_{16}$TA-ZnX-33. This crystalline phase undergoes two crystal-crystal phase transitions which result in a slight increase in the lamellar spacing before melting to a lamellar liquid crystalline phase ($L_1$, d=30.4 Å) similar to that described as a lyotropic neat phase. On further heating to 180° C., a distinct transition is observed in the optical texture from striated ribbons to a mosaic texture. On passing through the neat- to $D_s$-type ($L_2$) phase transition, the lamellar spacing increases by ~1 Å but otherwise no significant change is observed in the diffraction. Each of these phase transitions is observed to be reversible and exhibits only limited supercooling.

A material with soap-like consistency at room temperature is formed for compositions intermediate between $C_{16}$TA-ZnX-33 and $C_{16}$TA-ZnX-50. Oligomerization of zinc chloride units is required for compositions beyond 33 mole percent in order to maintain the minimum zinc coordination number of four, found in molten $ZnCl_2$ itself. Thus, the formation of $Zn_2X_7^{3-}$ anions is suggested with respect to a plastic crystal-type phase observed at the 40% composition (d=37.2 and 28.7 Å). Upon melting, a lamellar liquid crystalline phase ($L_3$, $d_{40\%}$=32.1 Å) that exhibits a striated ribbon texture is observed. However, optically isotropic crystallite-like regions also appear, which are very analogous to photos and description of the $S_C/S_D$ transition. (G. W. Gray and J. W. G. Goodby, *Smectic Liquid Crystals*: Textures and Structures, Leonard Hill, London, 1984 pp. 23–44, 74–81, plates 4, 26 and 29; J. Billard, in *Liquid Crystals of One-and Two Dimensional Order*, W. Helfrich and G. Heppke Eds., Springer-Verlag, Berlin, 1980, pp. 383–395). The appearance of the "crystallites" at these compositions is independent of the method of sample preparation (i.e. from the melt of CTAB and $ZnCl_2$, or from the melt of $C_{16}$TA-ZnX-33 and $C_{16}$TA-ZnX-50 which had previously been recrystallized from MeOH.) The $S_D$ phase is reportedly related to a cubic structure, which is consistent with its lack of birefringence.

Two oligomeric structures, including the molecular anion $Zn_2Cl_6^{2-}$ and the polymeric $[ZnCl_3^-]_n$, are formed from 1:1 mixtures of surfactant and zinc chloride. The former edge shared tetrahedral dimer is observed in the crystalline structure of $C_{16}$TA-ZnX 50. The latter structural unit is common to $ZnCl_2$ polymorphs (B. Brehler, *Z. Kristallogr.*, 1961, 115, 373; H. L. Yakel and J. Brynestad, *Inorg. Chem.*, 1978, 17, 3294) and $ZnCl_2 \cdot 1.33H_2O$ (H. Follner, B. Brehler, *Acta Cryst.*, 1970, B26, 1679) and is also observed for $K_2CuCl_3$ (C. Brink, *Acta. Cryst.*, 1949, 2, 158. The fluid structure, as a function of temperature, for $C_{16}TA$-ZnX 50 is quite complex; and from this to more metal-rich compositions significant sensitivity to trace amounts of moisture or solvent is observed. Materials exposed to atmospheric moisture or recrystallized from methanol exhibit lamellar textures immediately upon melting at about 75° C. However, $C_{16}TA$-ZnX 50 prepared directly from the melt of anhydrous starting materials and only handled under dry nitrogen, passes through a very viscous isotropic gel, $I_1$, (78° C. to 96° C.) before forming a lamellar liquid crystal ($L_3$). Time resolved X-ray diffraction measurements (TRXRD) of a reasonably anhydrous sample of $C_{16}TA$-ZnX 50 (FIG. 1A) give indication of two low angle lines at d=34.9 Å and 30.2 Å for the initial isotropic phase, which, based on √4/3 relationship, can be indexed as the 211 and 220 reflections of an 85.6 Å cubic cell. This is consistent with an la3d cubic structure-type of lyotropic surfactant phases. K. Fontell, *Colloid Polym. Sci.*, 1990, 268, 264.

The lamellar phase exhibits diffraction consistent with a layer spacing of 34.1 Å. Broad diffraction features observed at approximately 19.4 Å, 7.6 Å and 4.7 Å provide an indication of intermediate range organization within the layers. The increase in the lamellar spacing of about 14 Å over that of the crystalline phase is consistent with the straightening of the surfactant chains from their extremely canted geometry in the solid state. The rigorously anhydrous material then forms another viscous isotropic fluid, $I_1'$, at 130° C. before melting to a very fluid isotropic solution at 148° C. The solvent exposed material forms a viscous shearable isotropic fluid at about 100° C. that clears to the very fluid isotropic solution at 186° C. Neither TGA, NMR nor single-crystal X-ray diffraction experiments provide any evidence for the presence of water or methanol in these phases.

On cooling, a viscous isotropic fluid that can be sheared to yield a lamellar texture is obtained below about 150° C. All texture disappears for the anhydrous material between 110° C. and 45° C. when a metastable crystalline (or plastic crystalline) phase grows in ($K_2'$). However, in the solvent exposed material, lamellar texture is retained until the appearance of the $K_2'$. The TRXRD indicates the onset of sharp diffraction on cooling from the solution, but below about 100° C. the sharp diffraction lines disappear; however the broad features at 20, 8, and 5 Å return. Small angle scattering measurements will be required for definitive structural assignments. Finally, at about 50° C., the sharp diffraction of $K_2'$ is observed which can be indexed to a monoclinic cell with lattice constants of a=12.89 Å, b=42.65 Å, c=9.53 Å, $\beta$=115.46.) After 12–24 h. the metastable $K_2'$ reverts back to the parent crystalline phase, $K_2$. The lamellar spacing of $K_2'$ is approximately 1.5 Å larger than that observed for the $K_2$ phase, which implies that the charge density of the inorganic layer has increased slightly such that a lesser amount of canting of the surfactant chains is required. This observation is consistent with the proposal that on heating past 100° C., the edge shared tetrahedral dimers, $Zn_2Cl_6^{2-}$, condense to form the corner shared tetrahedral chains, $(ZnCl_3^-)_n$.

Figure 1B:
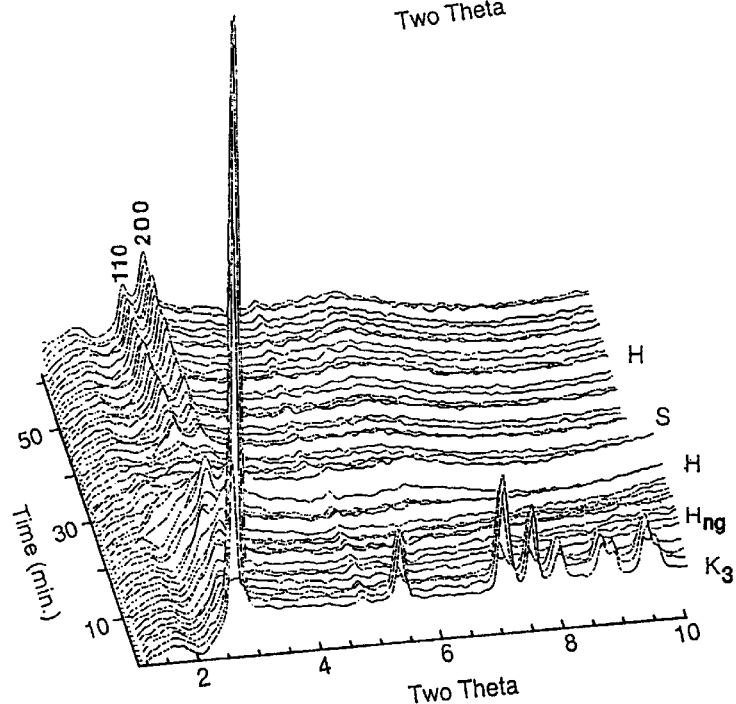
FIG. 1B is a plot of time resolved X-ray diffraction of $C_{16}TA\ ZnX-66$ obtained with 0.942 Å synchroton radiation (NSLS, X7B). The sample, placed in a Lindeman capillary, was heated at a rate of 7° C. per minute from room temperature to 250° C. then cooled to room temperature during the diffraction experiment.
Figure 1C:
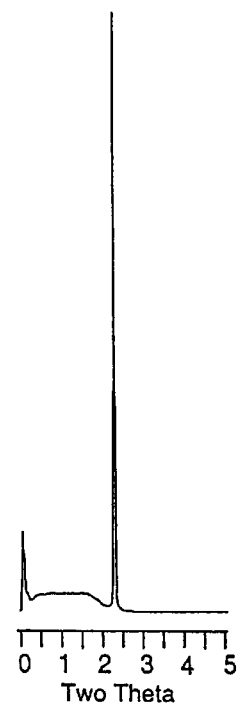
FIG. 1C is a plot of small angle scattering pattern for hexagonal $C_{16}TA\ ZnX\ 66$, supercooled to room temperature obtained with 1.378 Å synchroton radiation (NSLS line X3A2).

A new liquid crystalline texture is observed for compositions of greater than about 55% $ZnCl_2$. As the inorganic/surfactant ratio increases network structures become necessary to retain the four coordination around zinc and to accommodate the drastically reduced charge density. At room temperature, these compositions exhibit a gel-like texture with a small amount of crystalline $C_{16}TA$-ZnX-50. On heating through a plastic crystal region, a texture analogous to that described as hexagonal non-geometric ($H_{ng}$) is observed at 60° C. At this temperature the strong 100 reflection is observed at low angle, but only a nondescript feature is observed in the diffraction in the region of the 110 and 200 (FIG. 1B). This is indicative of incomplete formation of the hexagonal order. On heating to ~120° C. the 110 and 200 grow in as sharp diffraction lines consistent with a 41 Å hexagonal cell. The appearance of hexagonal order in the X-ray diffraction is coincident with the appearance of a hexagonal optical texture. With additional heating, this material passes through a narrow region with isotropic texture (~10° by DSC measurements) that is assigned to the cubic 12 phase before completely melting to an isotropic solution. On cooling the hexagonal texture returns at ~170° C., shown in FIG. 1B. This hexagonal phase supercools to below room temperature, such that the hexagonal liquid crystal persists for 12 to 24 hours before disproportionating into crystalline $C_{16}TA$-ZnX-50 and a zinc chloride rich gel. Small Angle X-ray (SAX) diffraction measurements on this room temperature fluid reveal the 100 reflection d=34.5 Å (FIG. 1C), and wide-angle measurements exhibit the 110= 19.7 Å and 200=17.5 Å reflections corresponding to the hexagonal lattice a=b=39.8 Å. There is a significant temperature dependence to the hexagonal lattice, where the a lattice constant increases from room temperature to about 80° C. (1.5 Å) then decreases by ~3 Å before formation of the isotropic fluid. Interestingly, the SAX measurement also reveals a broad feature centered around 72 Å. Broad diffraction features are also observed at 18 Å, 9 Å, and 4.5 Å. These broad diffraction features suggest that elongated cylinders with an average length of 72 Å form the columnar core of this hexagonal phase. This is in good agreement with the average cylinder length of 71 Å reported for the $H_2O$/CTAB system.

The metal-richer phases (>70%—present as gels), on heating, initially exhibit a hexagonal non-geometric texture. These then undergo a structural transition exhibiting hexagonal texture before clearing to a very viscous isotropic fluid, $I_2$, which is likely composed of spherical micelles. The transition from the isotropic fluid, $I_2$, to the solution phase is quite marked by a drastic decrease in the viscosity of the fluid. After significant supercooling, hexagonal texture is again observed; and in most cases these supercool to room temperature.

Figure 2A:
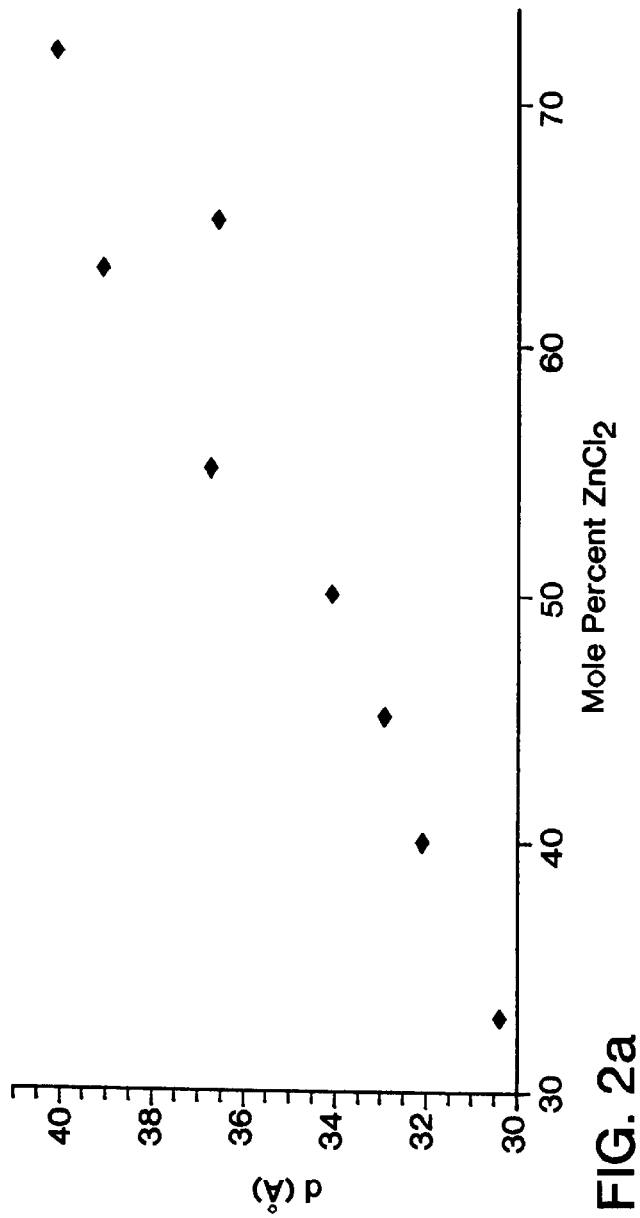
FIG. 2A depicts d-spacing as a function $ZnCl_2$ concentration for lamellar phases at 120° C. for compositions <50% $ZnCl_2$ and hexagonal phases at 80° C. for compositions of >55% $ZnCl_2$. (The deviation of the 66% data point might be in part due to a trace amount of moisture in the sample.)
Figure 2B:
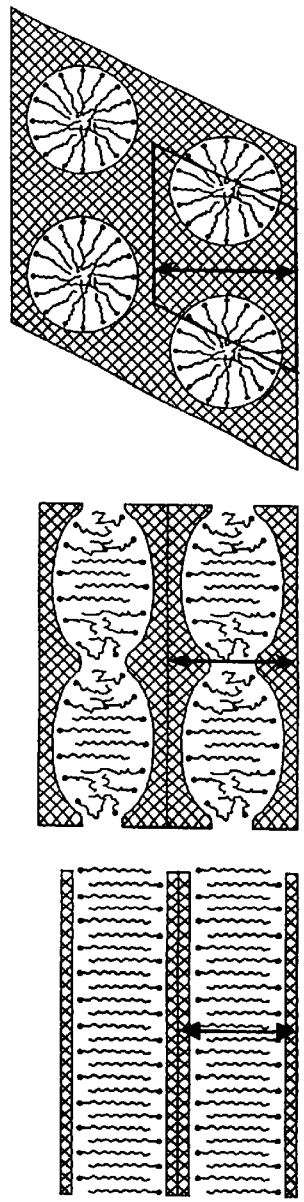
FIG. 2B is a representation of the common origin of the lamellar and the hexagonal $d_{(100)}$ lattice upon the growth of the inorganic layer and formation of the columnar micelles.

For each of the above compositions with between 30% and 50% zinc chloride, a lamellar phase is first observed on heating from the room temperature crystalline or plastic crystalline state, Tanford's law suggests that the chain length of CTA surfactant should be about 22 Å, C. Tanford, *The Hydrophobic Effect: Formation of Micelles and Biological Membranes*, Wiley, N.Y., 1980 p. 75, and the van der Waals diameter of a $ZnCl_4^{2-}$ anion should be about 8 Å ($d_{Zn-Cl}$=2.3 Å, $Cl^- r_{(vdW)}$=1.7 Å). These are consistent with the observed lamellar spacing of 30.4 Å for the first $C_{16}TA$-ZnX-33 lamellar liquid crystalline phase, and imply a liquid structure in which isolated zinc tetrachloride anions form the inorganic layer between interdigitated surfactant cations (FIG. 2B). Increased inorganic content results in zinc-chloride oligomerization, which should result in a thickening of the inorganic layer. The progressive increase in the d-spacing as a function of the percent $ZnCl_2$ is shown in FIG. 2A. Addition of one corner shared $ZnCl_{4/2}$ tetrahedron to the inorganic layer results in a thickening by approximately 3.5 Å, as observed between the 33 and 50% composition.

Beyond 55% the first liquid crystalline phase formed adopts the hexagonal non-geometric structure. Nevertheless, the hexagonal 100-plane spacing has its origins from the more surfactant rich lamellar phases as shown in FIG. 2B.

Thus, the progressive increase in this lattice spacing continues into the inorganic rich region, consistent with a model in which at ~60% $ZnCl_2$ the inorganic wall is approximately three tetrahedra thick. The loss of surfactant interdigitation must also account for some of the increase in the lattice constants upon columnar micelle formation. This thickening of the inorganic lamella and condensation to a hexagonal inorganic network is reminiscent of the mechanism for framework formation based on surfactant/inorganic charge matching that was previously proposed for the formation of mesoporous aluminosilicates. A. Monnier et al., Science, 1993, 261, 1299.

Progression across this phase diagram from reverse micelle to lamellar, hexagonal and cubic structures, thus, shows a strong parallel to traditional lyotropic systems; yet in the absence of traditional solvents. Furthermore, the structure of the inorganic component to these metallotropic liquid crystals changes with composition (eg. $ZnCl_6^-$, $ZnCl_4^{2-}$, $Zn_2Cl_6^{2-}$, $[ZnCl_3^-]_n$, etc.), which is unprecedented with respect to traditional lyotropic systems in which there is no change in the structure of the solvent molecules. In addition, this composite system provides details for understanding the mechanisms by which a templated inorganic network is constructed. At low inorganic concentrations, the inorganic unit serves as the template for organizing surfactants into reverse micelles. At intermediate compositions, crystal packing forces exhibit sufficient control over the structural organization that at least two crystalline structures are observed. This structural organization can be retained into the liquid state resulting in lamellar liquid crystals. And at metal-halide rich compositions, the organization of the surfactant can be utilized to template the structure of the inorganic fluid.

The temperature of the phase transitions and a description of the liquid crystalline phase formed after passing through the phase transition are described for selected compositions in Table 1.1. (Compositions between 33 and 50 mole percent were prepared by evaporation of methanol solutions of the inorganic and template components and all other compositions were prepared from a melt of the inorganic and template compositions.)

TABLE 1.1

Temperature of Phase Transitions in Liquid Crystalline
C16TA-ZnXm (m = 20–85%)
Descriptions of the liquid crystalline structure, in parenthesis,
correspond to the phase observed after passing through the transition
on heating or cooling, respectively.

| % $ZnCl_2$ | Temperature of Phase Transition | | | | Decomposition |
|---|---|---|---|---|---|
| 20% | 62° C. (K + S) | 80° C. (RM + S) | 133° C. (S) | | 245° C. |
| 33% | 70° C. (K') | 99° C. (K") | 130° C. ($L_1$) | 180° C. ($L_2$) | 240° C. |
| 50% | | | | | |
| HEAT | 66° C. (PK) | 78° C. (L) | 97° C. ($I_1$) | 178° C. (S) | 245° C. |
| COOL | 178° C. ($I_1$) | 100° C. (L') | 32° C. (K') | | |

TABLE 1.1-continued

Temperature of Phase Transitions in Liquid Crystalline
C16TA-ZnXm (m = 20–85%)
Descriptions of the liquid crystalline structure, in parenthesis,
correspond to the phase observed after passing through the transition
on heating or cooling, respectively.

| % $ZnCl_2$ | Temperature of Phase Transition | | | | Decomposition |
|---|---|---|---|---|---|
| 65% | | | | | |
| HEAT | 40° C. (PK) | 60° C. (L) | 174° C. (H) | | 275° C. |
| COOL | 170° C. (H) | | | | |
| 75% | | | | | |
| HEAT | 72° C. ($H_{ng}$) | 130° C. (H) | 160° C. ($I_2$) | 190° C. (S) | 245° C. |
| COOL | 150° C. (H) | | | | |
| 85% | | | | | |
| HEAT | 40° C. ($H_{ng}$) | 85° C. ($I_2$ + K) | 125° C. (S) | | 270° C. |
| COOL | 90° C. ($I_2$) | 88° C. (H) | | | |

K = crystal,
PK = plastic crystal,
L = lamellar liquid crystal,
$H_{ng}$ = hexagonal non-geometric liquid crystal
H = hexagonal liquid crystal,
I = cubic liquid crystal,
RM = reverse micelle,
S = isotropic solution.

LABORATORY EXAMPLE 2

Zinc Chloride Compositions Templated By Polar Solvents

Polar solvents, such as alcohols or even water, can also serve as unique templates for the zinc-chloride fluids. The structure of $ZnCl_2.1.3$ $H_2O$ adopts a network structure comprising corner-shared chains (like those described above for α- and δ-$ZnCl_2$) which are linked by $ZnCl_2(OH_2)_4$ octahedra. Such chain-like structures were observed to be retained in the melt. It has also been determined by TGA studies that the methanol solvate does not loose the final equivalent of sorbed MeOH until 300° C. under a purge of dry nitrogen. It should also be noted that trace amounts of water are reported to enhance the FSDP in $ZnCl_2$. Thus, water and small alcohols can be used as "micro-templates" for neutral networks.

A small amount water or methanol can alter the thermal characteristics of particularly the metal-halide rich compositions. Thus, an investigation of a portion of the ternary ($H_2O$ or MeOH)/$ZnCl_2$/$C_n$TAB is conducted. Both $C_{16}$TA-ZnX-33 and –50 can be recrystallized from water or methanol indicating no influence by the solvent. However, for $C_8$TA-ZnX-33, no texture is observed in materials prepared from the $C_8$TA/$ZnCl_2$ melt, but distinct liquid crystalline texture is observed for the material recrystallized from methanol. In a related experiment, the single crystalline structure of $[C_{16}TA]_3[Cl]CuCl_4$. 4MeOH was determined and upon heating, this methanol solvate material forms a lamellar liquid crystal.

LABORATORY EXAMPLE 3

Halozeotype Melts and Glasses

This Example pertains to the design of intermediate range order (IRO) in a liquid or glass by the addition of templates (or network modifiers). IRO modification can be detected, among other ways, by the position, intensity or even number of First Sharp Diffraction Peaks (FSDP). Typically, the addition of network modifiers, such as AX salts (A=alkaline earth), to a $MX_2$ glass or liquid is understood to result in the depolymerization of the network by the introduction of terminal M—X bonds, where, for example, M is a metal and X is a halogen. However, by recognizing the structural similarities between $ZnCl_2$ and $SiO_2$, applicants have demonstrated the ability to circumvent such depolymerization by the addition of an equal amount of CuCl and the ACl (A=alkylammonium] template, or network modifier. The tetrahedral $Cu^I$ cations replace certain of the $Zn^{II}$ sites, in analogy to $A^{III}$ substitution in $Si^{IV}$ sites in aluminosilicates, to construct zeolite-type architectures. The single crystal structures with $[HNMe_3]^+$ (CZX-1), $[H_2NMe_2]^+$ (CZX-3) and $[H_2NEt_2]^+$ (CZX-2) exhibit the overall $MX_2$ stoichiometry for $[CuZn_5Cl_{12}]^-$ network-anions. (CZX=Copper Zinc halide.) The smaller $[H_3NMe]^+$ deviates slightly from the $MX_2$ stoichiometry forming the network anion $[Cu_2Zn_2Cl_7]^-$ in the crystalline structure (CZX-4); however, a glass can be formed by quenching a melt of the 1:1:5 composition.

The preparation of halozeotype materials based on the analogy between $SiO_2$ and $ZnCl_2$ has been described, (See e.g. U.S. Pat. No. 5,876,637 to Martin et al.; U.S. Pat. No. 5,885,542 to Martin et al.; J. D. Martin and K. B. Greenwood, *Angew. Chem. Int Ed. Engl.*, 36, 2072 (1997).) Like zinc chloride itself (S. Biggins and J. E. Enderby, *J. Phys C: Solid State Phys.*, 14, 3129 (1981)), copper zinc chloride halozeotype materials can readily be supercooled to a glass by cooling at a rate greater than 50° C./min. In the synthesis of copper zinc chloride halozeotypes, $[Cu_nZn_{m-n}Cl_{2m}]^{n-}$, (metal halide analogs of aluminosilicate zeolites) glass forming melts, as well as room temperature liquids, were observed depending on the alkylammonium cation used as the structure directing templates.

Interestingly, cross-polarized optical microscopic analysis of certain glassy droplets of $(H_2NMe_2)(CuZn_5Cl_{12})$, CZX-3, shows remarkable birefringence that completely extinguishes light every 90° upon rotation of the sample between the cross polarizers, indicating a coherent molecular organization in the droplet. Similar birefringence is not observed for the glass of CZX-1, $(CuZn_5Cl_{12})^-$, in which the $(HNMe_3)^+$ cation templates the sodalite-type structure, because of its isotropic cubic symmetry. However, neutron scattering studies of CZX-1, using the deuterated template $(DN(CD_3)_3)^+$, provide strong evidence for the templated organization of intermediate range order of the metal halide framework in both the glass and molten states.

To investigate the role of small cationic templates on the structural organization of covalent metal-halide melts, a neutron scattering investigation of the glass and melt of the halozeotype CZX-1, $(CuZn_5Cl_{12})^-$, which is templated by $(DN(CD_3)_3)^+$ and yields the cubic crystalline structure of sodalite (J. D. Martin and K. B. Greenwood. *Angew. Chem.*, 1997, 36, 2072–75) was investigated. At this composition, cooling of a melt at greater than 50° C./min readily forms a glass. The glass devitrifies on heating above 60° C., and the crystalline material melts at 180° C.

Figure 3A:
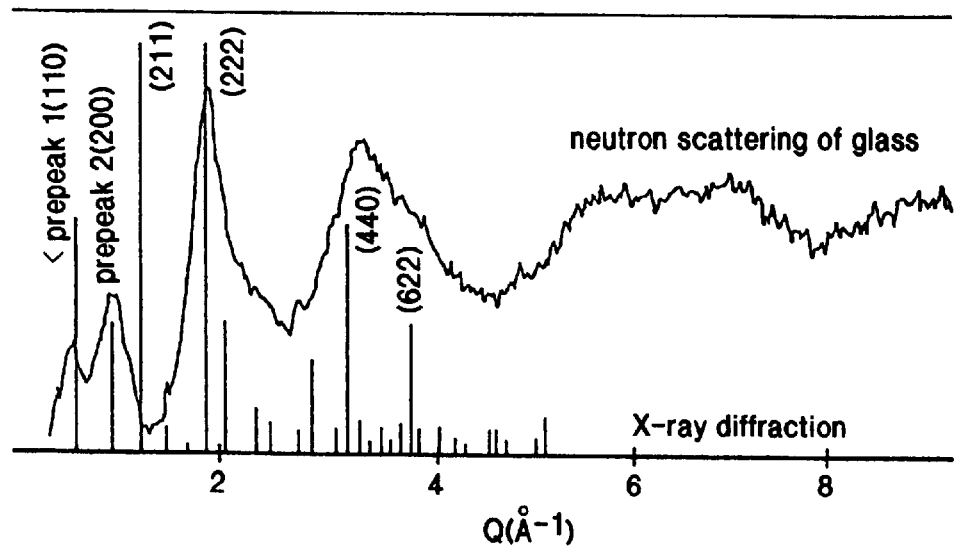
FIG. 3A is an S(Q) vs. Q plot of the neutron scattering from $[DN(CD_3)_3]CuZn_5Cl_{12}$, and the X-ray powder diffraction pattern of crystalline Czx-1.
Figure 3B:
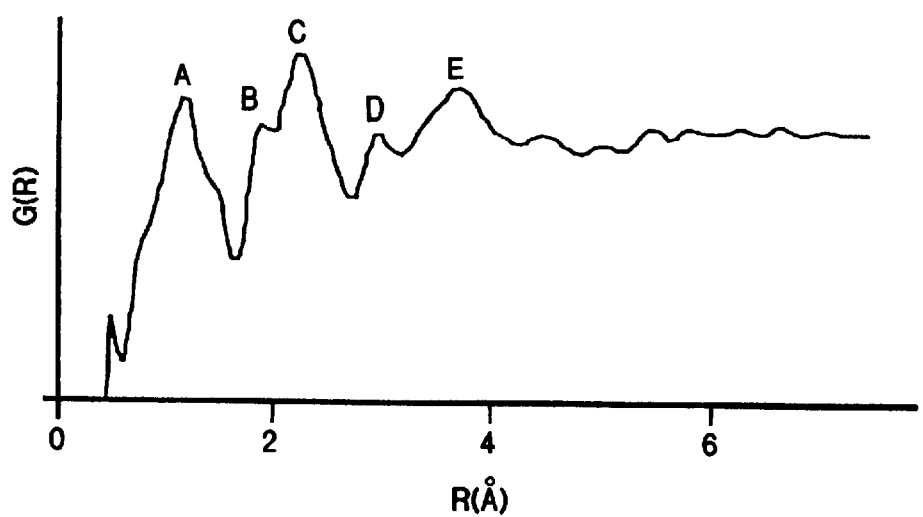
FIG. 3B is a plot of the radial distribution function from the neutron scattering of vitreous CZX-1 (A=N—D and D—C=1.19 Å, B=D—$C_{non-bonded}$=1.91 Å, C=M—Cl=3.70 Å).

The total structure factor plots of the melt (250° C.), glass (RT) and devitrified sample (80° C.) of CZX-1 are shown in FIG. 3A, along with a plot of the G(r)(FIG. 3B). In the glass (and the less pronounced in the melt) two low Q diffraction peaks, FSPD=0.77 $Å^{-1}$ and SSPD=1.18 $Å^{-1}$ (first and second sharp diffraction peak) are observed. This is in notable contrast to the single FSPD 1.01 $Å^{-1}$ for pure $ZnCl_2$. These give evidence to the templating of intermediate range order in both the glass and melt. The higher Q portion of the total structure factor plot is directly analogous to that of $ZnCl_2$. There is a direct correspondence between the total structure factor pattern of the glass and melt to the Bragg reflections of the devitrified crystalline sample. The FSDP and SSDP correspond to the (110) and (200) Bragg reflections and the higher Q features coincide with the (222), (440) and (622) Bragg planes, respectively. The most notable difference between these samples is the absence of the strong (211) Bragg reflection in the glass and melt samples.

The (222), (440) and (622) Bragg planes correspond to distances within the tetrahedral building blocks. The diffraction planes that coincide with the FSDP and SSDP of the glass and melt of CZX-1 correspond to the diameter of the 6-rings and 4-rings, of the sodalite β-cage, respectively. The latter also represents the plane spacing for the combination of a 6-ring/4-ring/6-ring pattern that is the size of half of the β-cage. On heating to the melt (70° above the melting point) the FSDP is reduced in intensity with respect to the SSDP. By contrast, the (211) planes, which exhibit strong diffraction intensity in the crystalline phase are absent (or at best diminished to a shoulder) in both the glass and the melt. This reflection corresponds to a longer range ordering of β-cages. Its absence is thus indicative of the diminished intermediate range order expected for a glass or liquid.

In the real space Fourier transform, G(r), the D—N/D—C, N—C, M—Cl, M—M/Cl/Cl pair correlations, of the (DN $(CD_3)_3)^+$ template and the $(CuZn_5Cl_{12})$ framework, respectively, are clearly observed. In addition a shoulder is observed on the M—Cl pair correlation at about 2.7 Å, which decreases and then disappears on going to the high temperature melt. This distance is consistent with a D—Cl contact that corresponds to the hydrogen bonding between the template and three chlorides of one of the 6-rings of the β-cage. The simultaneous loss of this D—Cl pair correlation and the reduction of the FSDP in the 250° melt suggests that the "templated-void" of the β-cage is a less significant structural unit at higher temperature.

Like the structures of $ZnCl_2$, the structure of CZX-1 can also be described by an ordering of the metal cations in certain of the tetrahedral interstices in a ccp anion sublaftice. However, in CZX-1 the trimethylammonium template displaces 4/16 of the anion sites to create the void of the 13-cage, and organizes the metal-halide tetrahedra into layers of 6-rings. Stacking of three of the 6-ring layers (. . . ABCA . . .) results in the formation of β-cages. The period of oscillation of ~3.3 Å in the G(r) is correlated to the M—M and Cl—Cl contacts as determined from the single crystal structure and correspond to the stacking of these layers. The reduced oscillations from the crystal, to the glass, to the melt is consistent with the reduction of intermediate range order. Comparison of the calculated powder patterns for CZX-1, the structure minus the template, and the structure of only the halide sublattice with "β-cage" voids, suggest that the metal and template organization largely contribute to the SSDP, whereas the arrangement of the metals and the voids are primarily responsible for this FSDP.

Figure 4A:
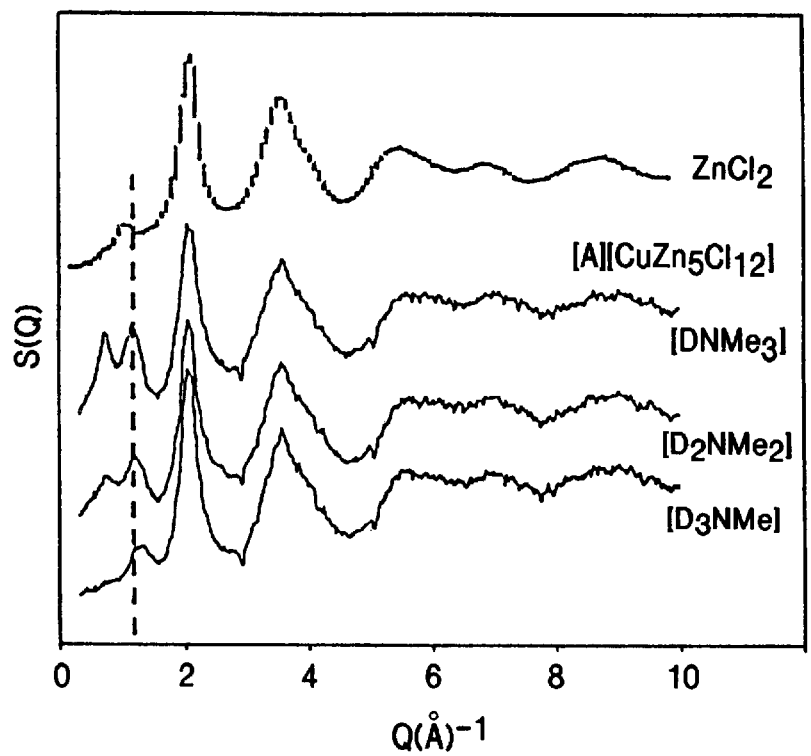
FIG. 4A is an S(Q) vs. Q plot of $ZnCl_2$, $[A][CuZn_5Cl_{12}]$, $[DNMe_3]^{30}$, $[D_2NMe_2]^+$ and $[D_3NMe]^+$ templated glasses.
Figure 4B:
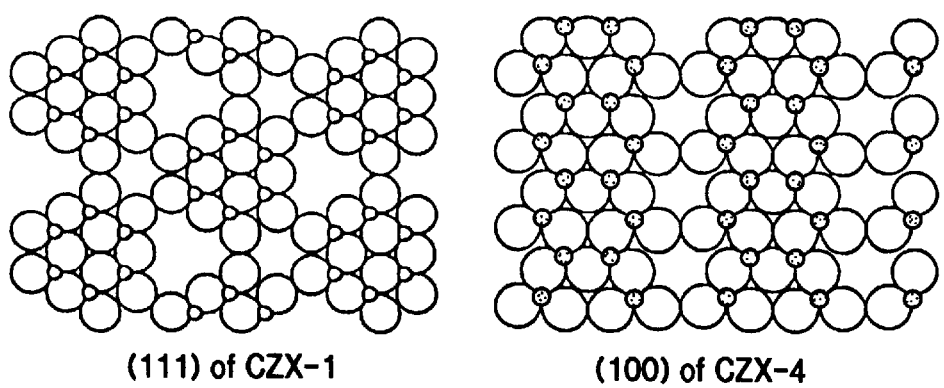
FIG. 4B is a schematic of the (111) Bragg reflection of CZX-1 and of the (100) Bragg reflection of CZX-4.

Subsequent neutron diffraction experiments using templates $[D_2NMe_2]^+$ and $[D_3NMe]^+$, which are known to template the crystalline structures of CZX-3 and CZX-4, respectively in order to further investigate the influence of the template on the intermediate range order. From the crystal structures it is readily seen that $[DNMe_3]^+$ occupies 4/16 of the anion sites resulting in the tetrahedral void of the β-cage (see FIG. 4B), whereas $[D_3NMe]^+$ occupies only a single anion site resulting in a smaller cage void. The rough plots of S(Q) vs. Q for the $(D_2NMe_2)^+$ and $(D_3NMe)^+$ templated glasses are shown in FIG. 4A. Two FSDPs are observed for the $(D_2NMe_2)^+$ templated material at Q=0.77 $Å^{-1}$ and 1.20 $Å^{-1}$, but only a single FSDP is observed for the $(D_3NMe)^+$ templated glass at Q=1.27 $Å^{-1}$. Clearly, control of the nature of the IRO is accomplished in part by the size (and charge density) of the templating cations.

The variation in the IRO is likely related to the networks observed in the crystalline structures. The $(D_3NMe)^+$ cation is approximately the size of one chloride anion, thus in the crystal structure of CZX-4 the template fills (creates) a void in the metal halide network in which ⅛ of the anion sites are missing. The $(D_2NMe_2)^+$ is intermediate in size between the mono- and trimethylammonium cations, but in the glass it apparently is disordered such that it occupies a similar size as the tri-methyl cation based on the observed FSDPs. In the crystalline structures, and apparently also in the glass and network liquid structures, the replacement of 1 or 4 closest packed anion sites with the template created void has been demonstrated. Replacement of Six (6) sites with an octahedral template, 10 sites with a super-tetrahedral template, and 12 sites with a large spherical template within the framework of the closest packed anion sublattice can also be provided.

The glass and/or melt of $(N(C_3D_7)_4)(CuZn_{23}Cl_{48})$, which is anticipated to form a super-sodalite network structure in which the tetrapropyl ammonium cations with a radius of ~4.7 Å can be envisioned to occupy a similar space as chlorides and can be measured by neutron diffraction. The cubic assembly of $Zn_4Cl_6Cl_{4/2}$ super-tetrahedral structural units around the TPA template should direct the formation of a sodalite-tetrahedrite cubic network with a ≈23 Å. Such super-sodalite structures have precedence in the open framework InS chemistry described by H. Li, et al., *Science*, 1999, 283, 1145.

The utilization of a mixture of TPA with the trimethylammonium (HTMA), which is known to template β-cages, should yield a liquid and/or glass which adopts a zeolite-Y type structure at the composition (HTMA)(TPA)$Cu_2Zn_{22}Cl_{48}$.

For temperature analysis, samples are sealed in fused silica tubes under vacuum to rigorously restrict oxygen and moisture. The coffee-can furnace is utilized for heating. Samples are sealed in single 8 mm O.D. tubes. Neutron scattering data are collected on the GLAD (glass liquids and amorphous materials diffractometer) at the IPNS, Argonne National Laboratory. The diffraction patterns are corrected for scattering by the sample tubes and the vanadium furnace and normalized with respect to a standard vanadium rod. The total structure factor and the total radial distribution function are determined.

LABORATORY EXAMPLE 4

$CuAlCl_4$ as a Zinc Chloride Analog

In the synthesis of metal-halide analogs of metal-oxide type framework structures, it was demonstrated that $CuAlCl_4$ was a structural analog of $ZnCl_2$ in the similar fashion that $AlPO_4$ is related to $SiO_2$. The analogy in which a $Cu^I$ and an $Al^{III}$ cation substitute for two $Zn^{II}$ cations is used in this Example to evaluate the structure of zinc chloride-type covalent liquids. Unlike $ZnCl_2$, a melt of $CuAlCl_4$ when quenched (even to liquid $N_2$ temperature) does not form a glass, but rather forms the crystalline β-$CuAlCl_4$ phase. This crystalline structure is related to that of δ-$ZnCl_2$ in that it is derived from a hcp stacking of the anion sublattice. However, the different size of the $Cu^I$ and $Al^{III}$ cations results in an organization into 2×2 zigzag chains. The β-phase is metastable with respect to the ac-phase which adopts a ccp stacking of the layers of 2×2 zigzag chains (an analog to α-$ZnCl_2$). The related structure of $CuGaI_4$ is a direct analog of α-$ZnCl_2$ with 1×1 zigzag chains of alternating $Cu^I$ and $Ga^{III}$ in a ccp anion sublattice. (R. Burns, et al., *Z. Kristallogr.*, 1995, 210, 62.)

Figure 5A:
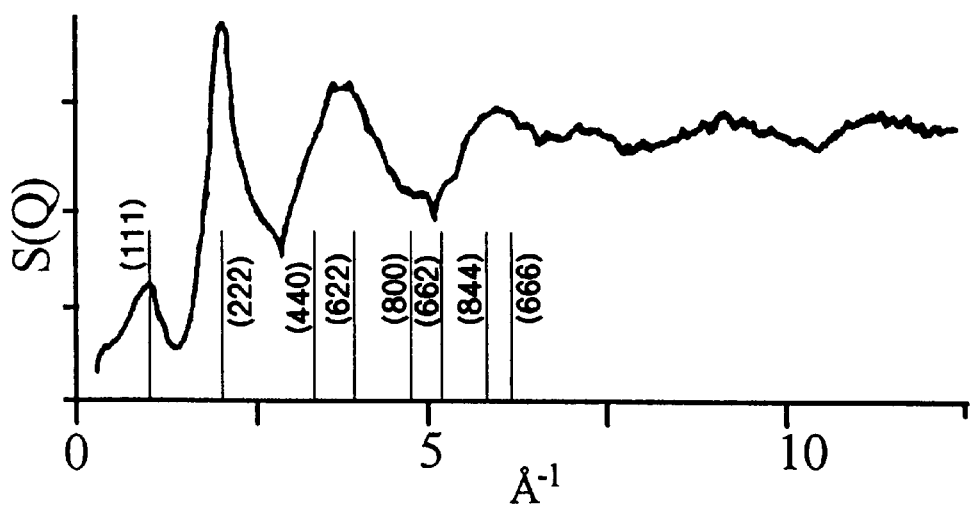
FIG. 5A is a S(Q) vs. Q plot of the Neutron Scattering from liquid $CuAlCl_4$.
Figure 5B:
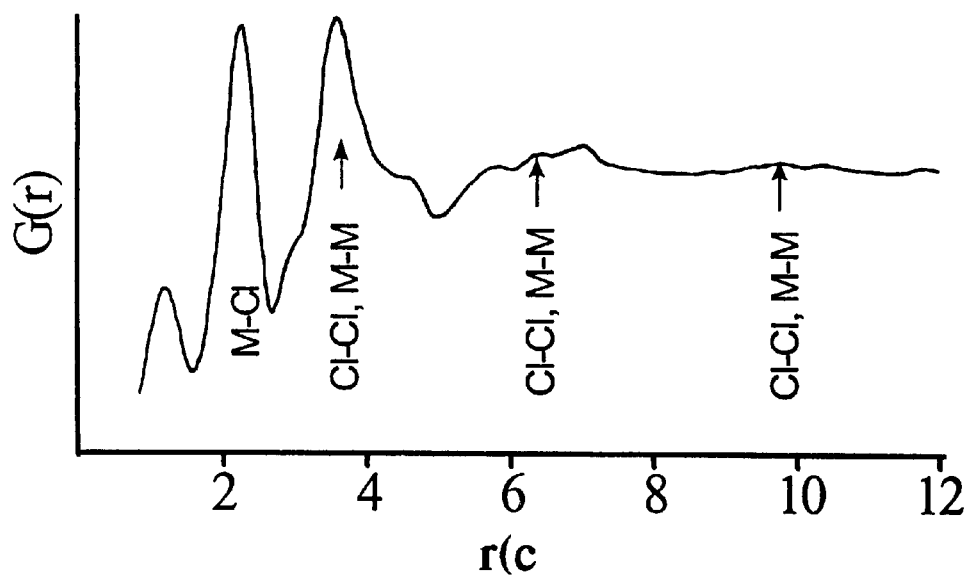
FIG. 5B is a plot of G(r) vs. r for liquid $CuAlCl_4$.

At 275° C., 45° above its melting point, the structure factor data, S(Q), for the neutron scattering of $CuAlCl_4$ is nearly identical to the previously published data for $ZnCl_2$ melts. Here the FSDP at 1.0 $Å^{-1}$ is quite sharp and thus gives indication of more pronounced intermediate range order out to rather large r. In addition, while the coherent scattering length of Al is slightly less than that of Zn, Cu is a stronger scatterer providing a pseudo-isotopic substitution which can be helpful for the identification of the M—M partials. (Furthermore, $CuGaCl_4$ is completely isostructural to $CuAlCl_4$ and Ga is a stronger scatterer than Al allowing further identification of M—M partials. The data for $CuAlCl_4$ are shown in FIGS. 5A and 5B, and the data for $CuGaCl_4$ are analyzed in a similar manner. Some of the broadening of the peaks and shoulders on the plot of the G(r) are likely due to the different Al—Cl ~2.15 Å and Cu—Cl ~2.3 Å distances.

In their crystalline structures the closest packed layers differ in the arrangement of the $ZnCl_2$ exhibiting a 1×1 zigzag chain motif whereas the different size of the $Cu^+$ and $Al^{3+}$ metals results in a 2×2 chain pattern as seen below. The net result is that a Cu—Cu pair correlation of 7.4 Å should be present for $CuAlCl_4$, which is absent in $ZnCl_2$. Analysis of the data from a 4 hr. collection on molten $CuAlCl_4$ gave evidence of such an enhanced feature at 7.4 Å (FIG. 5B).

There is general agreement between the observations of this Example and the numerous published studies of $ZnCl_2$ that the anion arrangement is essentially a closest packed geometry with the metals residing in tetrahedral interstices. See e.g. D. A. Allen, et al., *J.Chem. Phys.* 1991, 94, 5071–5076. This is confirmed by M—Cl distances of 2.27 Å, and, Cl—Cl and M—M distances of 3.71 Å. However, use of the crystal-structure-type analysis as described above for the glass of CZX-1 finds that none of the crystalline structures of $ZnCl_2$ are compatible with the peaks at Q ~1.0 $Å^{-1}$ and 2.0 $Å^{-1}$. Some have suggested a similarity of the glass to β-$ZnCl_2$ because it exhibits the lowest Q Bragg reflection. P. H. Gaskell and D. J. Wallis, *Phys. Rev. Lett.*, 1996, 76, 66–69. But the β-phase (B. Brehier, *Z. Kristallogr.* 1961, 115, 373402) has four Bragg reflections below Q=1.5 $Å^{-1}$, and also it is not completely anhydrous. Thus, it is not a reasonable model structure.

The applicants, however, have observed that if one assumes a ccp or hcp packing of the anion sublattice, the 001 and 002 planes of a hcp lattice or the 111 and 222 planes of a doubled ccp lattice corresponds exactly to the observed scattering peaks at Q=1.0 $Å^{-1}$ and 2.0 $Å^{-1}$. These are consistent with a hexagonal lattice with c=6.2 Å or a cubic lattice with a=10.5 Å. The scattering features in FIG. 5A are indexed to the cubic cell for example.

The applicants have demonstrated that the pseudo hcp δ-$ZnCl_2$ phase persists up until the melt and is the only phase observed upon recrystallization from the melt. And millimeter sized crystals of the hcp β-$CuAlCl_4$ phase have been grown by quenching a 300° melt. These support a model in which an approximate hcp lattice is maintained in the melt and the prepeak at 1.0 $Å^{-1}$ corresponds to the ABA stacking. Alternatively, a model of a fluid with a cubic network structure is extremely reminiscent of the cubic structure observed for a variety of lyotropic liquid crystalline phases. K. Fontell, *Colloid Polym. Sci.*, 1990, 268, 264–285. Among the two most common structure-types are the Ia3d and Pm3n cubic networks, which consist of networks of micellar columns which may be related to the corner-shared tetrahedral metal-halide chains. Further, there is a subtle relationship between certain cubic and tetragonal phases. In the aqueous SDS system, it was noted that the tetragonal $T_\alpha$ phase is a distortion of the cubic $Q_\alpha$ phase, which is observed experimentally by the transformation of the cubic 211 and 222 Bragg reflections to the 101 and 002 reflections of the tetragonal lattice. P. Kékicheff, Mol. Cryst. Liq. Cryst., 1991, 198, 131–144. (Note: the 101 reflection is the first Bragg peak in $\alpha$-$CuAlCl_4$, and this might correspond to the 211 reflection of a body centered cubic cell with a=14.25 Å, or the 111 reflection for a face centered or primitive cell with a=10.5 Å.) Such models are attractive for the $ZnCl_2$ type fluid, which is envisioned to describe units related to the zigzag chains observed in the crystalline structures. Nevertheless, the picture that is emerging to relate these diverse $MCl_2$ glasses consists of a fluid in which the anions adopt an expanded "closest-packed" arrangement and the metal cations occupy certain of the tetrahedral interstices to form covalent corner-sharing tetrahedral networks. In the case of $ZnCl_2$ and $CuAlCl_4$, networks likely consist of corner-shared chains arranged in a hcp or ccp fashion.

Templated structure in the copper-aluminum chloride melts is provided by the relationship between the fluid structure of $ZnCl_2$ and $CuAlCl_4$. $CuAlCl_4$ exhibits a neutral framework, as opposed to the copper-zinc-halide frameworks. However, it has been determined that a 1:6 ration of $[D_2N(CD_3)_2]:ZnCl_2$ yields a liquid and glass that is structurally similar to that of CZX-1. Thus, the alkylammonium-chloride salt also serves as a neutral template for $CuAlCl_4$. Alternatively, the anionic composition $[Cu_2ZnAl_3Cl_{12}]$ can be a more direct analog of CZX-1.

LABORATORY EXAMPLE 5

Template Chain Length Modifications

The structure direction of the $ZnCl_2$ network fluid by the large anisotropic surfactant molecules is similar to that determined for the smaller alkylammonium templates described above. To further illustrate, systematic studies of the $[Me_3NR]^+$ templates (R=H to n-$C_8H_{37}$) and of sodalite-type fluid of CZX-1, where R=H could be described as HTA-ZnX-85 based on the nomenclature adopted for the CTAB/$ZnCl_2$ system, are conducted.

Diffraction and DSC studies of intermediate chain-length materials are employed for structural identification. Chain-lengths of between $C_{10}$ and $C_{14}$ have been observed to yield room-temperature liquid crystals. The shorter chain lengths also shift the structural features of the liquid crystals toward structures with greater inorganic network formation. For example at the $C_n$TA-ZnCl-50 composition, hexagonal liquid crystalline structures are observed for chain lengths of n=10 to 14, whereas chain lengths of n=16 to 18 yield lamellar liquid crystalline structures.

LABORATORY EXAMPLE 6

Swelling of the Fluid-Mesopores of Zinc Chloride

Based on the similarity between the apparent structure of the $C_{16}$TA-ZnX-66 to the M41S-type aluminosilicates, this Example pertains to the swelling the "fluid-mesopores" of zinc chloride as has been done for M41S-type aluminosilicates. For example, silicate-type frameworks with very large pores have been prepared using block-copolymers as the "swelling agent". The flexibility of these metal-halide fluids should be significantly more amenable to swelling than that observed for the silicates.

LABORATORY EXAMPLE 7

Liquid Crystalline Cadmium Halide Compositions

This Example pertains to the examination of the structure directing role of the inorganic component in a $CdCl_2$ system. By moving down one row in the periodic table from the halides of zinc to cadmium, two very different crystalline structures are observed. $CdCl_2$ crystallizes with a cubic closest packed anion sublattice in which cadmium cations fill the octahedral interstices in every other layer. Zinc chloride also crystallizes with a closest packed anion sublattice, however the zinc cations occupy ¼ of the tetrahedral interstices resulting in a 3-D network of corner sharing tetrahedra. The bonding in the two crystalline structures gives rise to different physical properties, for example, there is a significant difference between the melting point of $CdCl_2$ and $ZnCl_2$, 568° C. vs. 298° C., respectively, corresponding to the significant difference in their lattice energy.

This Example also describes binary phase diagrams for the $CdX_2$/$C_{16}$TAX systems as well the templating influence of the surfactant $C_{16}$TAX, X=Cl or Br, on $CdCl_2$ fluids. This will provide a context to understand how the driving forces for crystallization of the inorganic component can influence the metallotropic nature of the system. The effect of varying the chain length of the surfactant cation on the observed liquid crystalline properties and structures of the system is also described. To describe these materials, the following nomenclature has been adopted: $C_n$TA—CdX #. $C_n$TA represents an alkyl trimethyl ammonium surfactant molecule with a saturated alkyl chain of length n, while # represents the mole percent of cadmium halide in the systems, X represents the halide ion, either chloride and/or bromide.

General Exierimental Procedures. $CdCl_2$ (99+%, anhydrous, Aldrich) was purified by drying under dynamic vacuum at 250° C. for 12 hours. This was followed by sublimation under dynamic vacuum at 500° C. The identity of all materials was confirmed by X-ray powder diffraction. Cetyltrimethylammonium chloride, $C_{16}$TAC, (25 wt. % in water, Aldrich), was used as received. Cetyltrimethylammonium chloride, $C_{16}$TAC(s), (98+%, TCl America), Cetyltrimethylammonium bromide, $C_{16}$TAB (Note: $C_{16}$TAB (Aldrich) contains an impurity that results in the formation of a crystalline impurity phase, $HNMe_3CdCl_3$ whenever employed in melt reactions.), (98+%, Aldrich), $C_n$TAB (n=8, 18 Fluka, n=14, 12 Aldrich, n=6, 10 TCl America) and $C_n$TAC materials (n=6–18 TCl America) were dried under dynamic vacuum between 100 and 105° C. for 12 hours before use. All solid materials were stored in a dry, nitrogen filled glove box in capped vials prior to their use. While these materials can be handled on the bench, they were treated in a rigorously moisture free environment to eliminate the influence of hydration on the observed properties. Methanol, (Aldrich), was dried and distilled over Mg turnings and sublimed iodine according to literature methods, e.g. Gordon, A. J.; Ford, R. A. *The Chemist's Companion*. John Wiley & Sons: New York, (1972) p. 434, and was stored in a Schlenk flask over molecular sieves under a nitrogen atmosphere.

Room Temperature Powder X-ray Diffraction (PXRD). Room temperature PXRD data were collected on an Enraf- Nonius Guinier camera and/or a Rigaku D/Max-B diffractometer using monochromated Cu Kα radiation, λ=1.5415 Å. Samples were prepared by grinding a suitable amount of material in a mortar and pestle with a small amount of elemental silicon as an internal standard. The mixed material was then dusted onto cellophane tape and attached to the sample holder.

Variable Temperature Powder X-ray Diffraction (VT-PXRD). Variable temperature PXRD experiments were performed on a sample of $C_{16}$TA-CdX 50 using the Marr camera on the X7B beam line at the National Synchrotron Light Source (NSLS), Brookhaven National Labs. A sample was loaded into a 0.5 mm Pyrex capillary then affixed to a goiniometer that held the sample just above a resistive ceramic heater. The wavelength of radiation used in this experiment was 0.9388 Å. Exposures were taken approximately every two and a half minutes on heating and cooling at a rate of 15° C./min to obtain a time and temperature resolved picture of the phase transitions.

Differential Scanning Calorimetry (DSC). DSC data were collected using a Perkin-Elmer DSC-7 and analyzed with the Perkin-Elmer Thermal Analysis Software. Samples of 5 to 30 mg were loaded into stainless steel, high-pressure pans and sealed with gold seals. The pans were loaded and hermetically sealed in a nitrogen filled glove box. The samples were heated and cooled at a standard rate of 10° C./min.

Polarized Optical Microscopy (POM). Optical microscopy was performed using a Nikon Optiphot-2™ microscope equipped with crossed polarizers. All photographs were taken using a Mirex Loborec™ 35 mm camera equipped with Kodak Gold® 200 speed film. Samples for analysis were placed between a clean glass slide and coverslip. A modified Thomas Model 40 micro hot stage controlled by a Eurotherm™ 91P temperature controller was used to observe the phase transitions.

Synthesis. The surfactantlinorganic materials prepared for this investigation were prepared by recrystallization from a saturated methanolic solution and/or prepared from melt reactions. The general procedure is described for the $C_{16}$TA-CdCl 50 composition.

$C_{16}$TA-CdCl 50 from melt. 183.3 mg of $CdCl_2$ (1 mmole) and 320.01 mg of $C_{16}$TAC (1 mmole) were mixed together in mortar and pestle, transferred to a pyrex tube and sealed under dynamic vacuum using a gas/$O_2$ torch. The sealed tube was heated to 220° C. for 12 hours in a tube furnace. The sample mixtures were examined at 220° C. to ensure a homogeneous reaction mixture before cooling. The homogeneous melt was then cooled to room temperature at 1.5° C./min. The resulting product was a microcrystalline solid with a soft, wax feel to it. The identity of the material was observed by PXRD and POM.

$C_{16}$TA-CdCl 50 from solvent. The mixed bromide/chloride $C_{16}$TA-CdX 50, from which X-ray quality single crystals were obtained, was prepared by dissolving 183.3 mg of $CdCl_2$ (1 mmole) and 364.5 mg of $C_{16}$TAB (1 mmole) in 10 to 15 milliliters of distilled methanol. The glass vial was then sealed with a piece of Parafilm® which had holes punched in it to allow for the slow evaporation of the solvent. Prior to complete evaporation of the solvent, crystals suitable for single crystal X-ray diffraction were recovered after 7 to 10 days. Elemental analysis of $C_{19}H_{42}NCdCl_2Br$, observed: 41.86% C, 7.71% H, 2.51% N; calculated: 41.66% C, 7.73% H, 2.56% N.

Syntheses by melt or recrystallization were used in preparing all of the $C_n$TA-CdX # compositions. The proper stoichiometric amounts were mixed and ground together. When $C_n$TAC, n=6 to 18, were employed as surfactants, the reaction mixtures were heated only to 220° C. for 12 hours to avoid decomposition of the surfactant. When COTAB, n=6 to 18, was employed as the surfactant, the reaction mixtures were heated to 230° C. for 12 hours. Crystalline material was obtained for all chain lengths and compositions, however, $C_{10}$TA-CdX 50 recrystallized from methanol was a gel at room temperature.

Determination of Phase Diagram. To determine the $CdCl_2$/surfactant binary phase diagram, compositions were prepared at intervals of at a minimum of every 5% mole percent from 0 to 85% $CdCl_2$ in the $CdCl_2/C_{16}$TAC and $CdCl_2/C_{16}$TAB systems. Samples were placed between a clean glass slide and coverslip in a dry, nitrogen filled glove box. The slide was transferred to the hot stage where samples were typically heated at a rate of 10° C. to 15° C./min until all texture was lost and/or decomposition set in. The stage was allowed to cool to room temperature at a rate of ~15° C./min by shutting off the temperature controller. Reversibility of the phase transitions were checked by repeated heating and cooling of the sample through the phase transitions. For confirmation of the equilibrium phase characteristics of each sample, 2 to 3 neighboring compositions were examined under separate coverslips on the same microscope slide. Samples equilibrated at a given temperature for 10–15 minutes exhibited no variation in texture from that observed during the ramped heating and cooling. DSC measurements were also obtained to determine the temperature of the phase transitions on heating and cooling. Samples for DSC analysis were heated to 300° C. then cooled to room temperature at a rate of 10° C./min. Reversibility of the phase transitions was determined by reheating and cooling the sample to 300° C. at 10° C./min. Very good agreement was observed between the optical and DSC measurements.

Single Crystal X-ray Crystallography $C_{16}$TA-CdX 50. A colorless, plate-like crystal of $C_{16}$TA-CdX 50 was obtained by slow evaporation of a saturated methanolic solution. The crystal, measuring 0.30×0.28×0.20 mm, was mounted on a glass fiber affixed to a goiniometer then cooled to 47° C. in a nitrogen stream on a Enraf-Nonius CAD4 Mach diffractometer using monochromatic Mo Kα radiation, λ=0.71073 Å. Lattice constants were determined from a set of 24 well centered reflections between 32°<2θ<36°. A unique hemisphere, −11<h<10, 0<k<13 and −30<l<29, was collected using omega scans. A total of 8942 unique reflections were collected of which 6156 reflections had an I(net) greater than 1.0 sigma. An empirical absorption correction was applied using ψ scan data.

All non-hydrogen atoms were found by direct methods using the SIR92 program. Gabe, E. J.; Le Page, Y.; Charland, J. P.; Lee, F. L.; White, P. S. *J. Appl. Cryst.* 1989, 22, 384. Hydrogen atoms were placed in calculated positions with a bond length of 0.96 Å to the carbon atoms. The thermal parameters of the hydrogen atoms were not refined while all non-hydrogen atoms were refined anisotropically. The final refinement converged with residuals of R=6.0% and $R_w$=6.7%. In the last difference map, the highest peak was 1.290e/Å$^3$ found in the vicinity of Cl(1).

$HNMe_3CdX_3$. As noted previously, $C_{16}$TAB, purchased from Aldrich, contains an impurity, $HNMe_3$+, which, when mixed in an equimolar amount of $CdCl_2$ results in the formation of merohedrally twinned crystals with the formula $HNMe_3CdCl_3$. A colorless single crystal, (0.40×0.18×0.18 mm), of the impurity material was picked out of the liquid crystalline matrix and subsequently mounted on a glass fiber affixed to a goiniometer head. Data was collected on an Enraf-Nonius CAD 4 diffractometer at 25° C. with monochromatic Mo Kα radiation, λ=0.71073 Å. Lattice constants were determined from a set of 24 well centered reflections between 33°<2θ<34°. A unique hemisphere, −10<h<11, −5<k<6, and −9<l<9 was collected in the θ/2θ scan mode. A total of 5697 reflections were collected of which 490 were unique and 486 had an l(net) greater than 1.0 sigma. The resulting crystalline structure was a merohedral twin. To solve the structure, the SHELX97 package of programs was utilized to locate all non-hydrogen atoms. Hydrogen atoms were in calculated positions with a bond length of 0.96 Å to the carbon and nitrogen atoms. The refinement converged with residuals of R=5.7% and $R_w$=16.6%. In the last difference map, the highest peak was 2.805 e/Å$^3$ located 0.13 Å from Cl(1).

$C_8$TA-MX 33, M=Zn, Cd. A scolorless single crystal of $C_8$TA-CdX 33 was obtained from a slow evaporation of a saturated methanolic solution. The crystal was mounted on a glass fiber affixed to a goiniometer head which was subsequently cooled to −127° C. in a nitrogen stream on an Enraf-Nonius CAD 4 Mach™ diffractometer using monochromatic Mo Kα radiation, λ=0.71073 Å. Lattice constants were determined from a set of 24 well centered reflections. A data set was not collected due to the weak diffraction of the crystal.

$C_8$TA-ZnX 33 was obtained from a slow evaporation of a saturated methanolic solution. The crystal was mounted on a glass fiber and affixed to a goiniometer that was subsequently cooled to −127° C. in a nitrogen stream on a Siemens Smartm CCD X-ray Diffractometer. Lattice constants were collected from a set of 24 well centered reflections. A unique hemisphere, −58<h<56, 0<k<10, and 0<l<32 was collected using omega scans. A total of 19096 reflections were collected of which 9993 were unique and 835 had an l(net) greater than 1.0 sigma. Zinc, chloride and bromide atoms were found by direct methods using the SIR92 program. No carbon and nitrogen atoms could be definitively located in subsequent difference maps. Efforts to refine the structure have been hampered by high disorder in the structure. The current status of the refinement yields residuals of R 53.3% and $R_w$=61.1%.

Results

Crystalline Structures. In the $C_{16}$TAX/CdCl$_2$ system only one crystalline phase is observed at the 50 mole percent composition between the parent surfactant and CdCl$_2$ materials. The material, $[H_3C(CH_2)_{15}N(CH_3)_3]_4Cd_4Br_4Cl_8$, $C_{16}$TA-CdX 50, crystallizes in the triclinic space group P-1, with cell parameters of a=9.467(2), b=11.374(2), c=25.761(4), α=103.09(2)°, β=91.92(2)° and γ=109.19(1)°. Crystallographic data is given in Table 7.1 while positional parameters are given in Table 7.2. The lamellar structure is most generally described as a stacking of interdigitated surfactant cations separated by a layer of inorganic anions, $Cd_4Br_4Cl_8^{4-}$. The alkyl chains of the CTA$^+$ cation exhibit an interchain separation of 4.8 Å, typical of van der Waals stacking of hydrocarbon chains. However, these interdigitated surfactant chains are significantly canted by 38° off of the perpendicular to the layer of inorganic anions.

The inorganic anion, $Cd_4Br_4Cl_8^{4-}$ exhibits an unusual coordination geometry. The four Cd cations form a linear oligomer with the two end units exhibiting tetrahedral coordination while the middle two cadmiums exhibit 5-coordinate trigonal bipyramidal coordination with an inversion center relating the ends of the molecular anion. This type of coordination geometry has not been observed for any cadmium halide compounds based on a search of the Inorganic Crystal Structural Database, ICSD and the Cambridge Structural Database, CSD.

TABLE 7.1

Crystallographic data for $[(H_3C)_3N(CH_2)_{15}CH_3]CdCl_2Br$.

| | |
|---|---|
| formula | CdCl$_2$BrC$_{19}$H$_{42}$N |
| formula weight (g/mol) | 587.25 |
| Space group (No.) | P-1 (2) |
| Color | Colorless |
| a (Å) | 9.467(2) |
| b (Å) | 11.374(2) |
| c (Å) | 25.761(4) |
| α, ° | 103.09(2) |
| β, ° | 91.92(2) |
| γ, ° | 109.19(1) |
| V(Å$^3$) | 2533.9(8) |
| Z | 1 |
| temp. (° C.) | −47 |
| ρ$_{calcd}$ (mg cm$^{-3}$) | 1.336 |
| F(000) | 1051.80 |
| Min and max 2 theta values for final cell | 32°, 36° |
| (Mo K$_a$ Å | 0.71073 |
| M (mm$^{-1}$) | 1.82 |
| Diffractometer | Enraf-Nonius CAD4 Mach |
| scan type | Omega |
| max 2theta | 50° |
| No. reflns measured | 8942 |
| No. reflns unique | 8942 |
| No. obs. data I$_{net}$ > 1.0σ(I) | 6156 |
| min and max transmission | 0.9145, 0.9977 |
| number of parameters in least-squares | 435 |
| R$^a$ | 0.060 |
| R$_w$$^b$ | 0.067 |
| GOF$^c$ | 1.85 |
| min and max peak heights on final DF map (e$^-$/Å$^3$) | −0.820, 1.290 |

$^a$R$_f$ = (Σ(F$_0$ − F$_c$)/F$_0$.
$^b$R$_w$ = [Σ(w(F$_0$ − F$_c$)$^2$)/wF$_0$$^2$)]$^{1/2}$.
$^c$GOF = [Σ(w(F$_0$ − F$_c$)$^2$)/(No. of reflns. − No. of parameters)]$^{1/2}$

TABLE 7.2

Positional Parameters for $[(H_3C)_3N(CH_3)_{15}CH_3]CdCl_2Br$

| Atom | x | y | z | b(iso) |
|---|---|---|---|---|
| Cd(1) | .16651(5) | .55947(4) | .37635(2) | .0205(8) |
| Cd(2) | .41582(5) | .89255(5) | .43274(2) | .0189(5) |
| Cl(1) | .14796(2) | .75641(1) | .44833(6) | .0122(1) |
| Cl(2) | .63111(2) | .90750(2) | .49624(7) | .0138(1) |
| Cl(3) | .43334(2) | .67833(2) | .36491(8) | .0128(9) |
| Cl(4) | .47927(2) | 1.01342(2) | .36506(8) | .0284(3) |
| Br(1) | −.03342(1) | .50986(1) | .30177(4) | .0251(4) |
| Br(2) | .15504(2) | .39244(1) | .42531(6) | .0386(9) |
| N(1) | .64889(6) | .40046(5) | .41213(2) | .0187(9) |
| N(2) | 1.95521(7) | −.01689(6) | 1.36680(3) | .0306(8) |
| C(1) | .58134(1) | .33391(9) | .35424(5) | .0331(2) |
| C(2) | .47349(1) | .36198(1) | .32918(5) | .0207(0) |
| C(3) | .39252(1) | .29763(8) | .27689(4) | .0180(0) |
| C(4) | .29624(1) | .34053(9) | .25084(4) | .0018(5) |
| C(5) | .21248(1) | .29070(8) | .19973(4) | .0193(0) |
| C(6) | .12403(1) | .34922(9) | .17517(4) | .0013(4) |
| C(7) | .04265(1) | .30662(8) | .12382(4) | .0175(4) |
| C(8) | −.03861(1) | .36926(8) | .10057(3) | .0028(3) |
| C(0) | −.12389(1) | .32923(9) | .04929(4) | .0179(7) |
| C(10) | −.20314(1) | .39314(8) | .02628(3) | .0055(4) |
| C(11) | −.28732(1) | .35320(9) | −.02503(5) | .0136(5) |
| C(12) | −.36726(1) | .41732(8) | −.04818(3) | .0132(1) |
| C(13) | −.44944(1) | .37251(9) | −.09988(5) | .0173(5) |
| C(14) | −.53206(1) | .43460(9) | −.12529(4) | .0190(6) |
| C(15) | −.61801(1) | .38756(1) | −.17686(5) | .0179(6) |
| C(16) | −.69503(1) | .44846(1) | −.20158(5) | .0433(3) |
| C(17) | .71139(9) | .54344(7) | .42121(3) | .0148(1) |

TABLE 7.2-continued

Positional Parameters for [(H₃C)₃N(CH₂)₁₅CH₃]CdCl₂Br

| Atom | x | y | z | b(iso) |
|---|---|---|---|---|
| C(18) | .54190(1) | .36180(9) | .44920(5) | .0390(1) |
| C(19) | .76996(1) | .35087(9) | .41878(5) | .0522(1) |
| C(20) | 1.90528(2) | .05111(9) | 1.33412(5) | .0245(2) |
| C(21) | 1.83254(1) | .00800(9) | 1.28236(4) | .0255(1) |
| C(22) | 1.77842(1) | .08411(9) | 1.25498(4) | .0242(2) |
| C(23) | 1.69726(2) | .04355(1) | 1.20411(4) | .0169(6) |
| C(24) | 1.62966(1) | .10836(9) | 1.17687(4) | .0124(2) |
| C(25) | 1.53763(1) | .06520(9) | 1.12727(4) | .0184(4) |
| C(26) | 1.46866(1) | .12674(9) | 1.10052(4) | .0111(9) |
| C(27) | 1.37132(1) | .08305(1) | 1.05139(5) | .0222(2) |
| C(28) | 1.30616(1) | .14578(9) | 1.02416(4) | .0134(8) |
| C(29) | 1.20598(2) | .10229(9) | .97563(5) | .0161(8) |
| C(30) | 1.14028(1) | .16491(1) | .94934(4) | .0124(8) |
| C(31) | 1.04191(1) | .12457(1) | .90057(4) | .0148(4) |
| C(32) | .97805(2) | .18750(1) | .87462(5) | .0233(2) |
| C(33) | .88040(2) | .15477(1) | .82630(4) | .0178(7) |
| C(34) | .81687(2) | .22279(1) | .80300(6) | .0335(3) |
| C(35) | .72169(2) | .19413(2) | .75953(6) | .0224(9) |
| C(36) | 1.86801(2) | -.15340(1) | 1.35489(5) | .0440(9) |
| C(37) | 2.11494(1) | .00864(2) | 1.36147(8) | .1693(0) |
| C(38) | 1.94886(2) | .03994(1) | 1.42108(5) | .0340(7) |

The chlorides Cl(1)-Cl(3)-Cl(4) are equatorially coordinated to a five coordinate Cd(2) with an average Cl—Cd—Cl bond angles of 119.90°. Chlorides Cl(2) and Cl(3a) exhibit axial coordination to Cd(2) with average bond angles to the equatorial halides of 90.70 and 90.4°, respectively. The central two trigonal bipyramidal cadmiums are asymmetrically bridged by Cl(3a) and Cl(3), which are axial and equatorially coordinated to Cd(2), respectively. These chlorides are also equatorially and axial coordinated to Cd(2a), respectively. The equatorial bond distance for Cd(2)-Cl(3) is 2.51(2)Å, but the axial distance is significantly longer for Cl(3)-Cd(2a), 2.75(2)A. Chlorides Cl(1), Cl(2), Br(1) and Br(2) form a tetrahedral coordination sphere about Cd(1). The average bond angle around the tetrahedrally coordinated Cd(1) is 114.5°, slightly distorted from the ideal tetrahedral bond angle of 109.50. The bond lengths for Cd(1)-Br(1) and Cd(1)-Br(2) are both 2.48(1)Å. The chloride bridges Cl(1)-Cl(2) between the tetrahedral Cd(1) and trigonal bipyramidal Cd(2) are equatorially and axially coordinated to Cd(2), respectively. A longer distance is observed for the axially coordinated halide versus the equatorial coordinated halides, 2.63(2) Å versus 2.51 (2) Å, respectively.

HNMe₃CdX₃. C₁₆TAB from Aldrich contains a trimethylammonium impurity that leads to the formation isolable crystalline compound in the surfactant/CdCl₂ materials prepared from melt reactions. The impurity was found to crystallize in the hexagonal space group P6₃/m with cell constants of a=9.2103(5) Å and c=6.7931(3) Å. Crystallographic data is given in Table 7.3 while atomic positions are given in Table 7.4. The structural solution clearly indicates the existence of an infinite chain of face sharing CdX₃ octahedra. The Cl—Cd bond distance is 2.70(1) Å and the average Cd—Cd distance is 3.40(2)Å.

The structural solution was complicated by merohedral twinning and a disorder of the carbon atoms of the trimethylammonium group. The structure was successfully solved and refined using the Shelx 97 suite of software. The carbon atoms are disordered across a mirror plane that is perpendicular to the 6-fold axis. Similar work with NiBr₂ and C₁₆TAB from Aldrich yields an isomorphous crystalline impurity phase.

TABLE 7.3

Crystallographic data for HNMe₃CdCl₃.

| | |
|---|---|
| formula | CdCl₃C₃NH₁₀ |
| formula weight(g/mol) | 278.87 |
| space group | P 6₃/m |
| Color | colorless |
| a (Å) | 9.2103(5) |
| c (Å) | 6.7931(3) |
| α, ° | 90.0 |
| β, ° | 90.0 |
| γ, ° | 120.0 |
| V(Å³) | 499.05(3) |
| Z | 2 |
| temp. (K) | 293(2) |
| ρ$_{calcd\,(mg/m}$⁻³$_)$ | 1.856 |
| F(000) | 268 |
| Min and max theta values for data collection/ | 2.55°, 29.88° |
| λ(Mo Kα Å | 0.71073 |
| μ(mm⁻¹) | 2.915 |
| Diffractometer | Enraf-Nonius CAD4 |
| scan type | theta/2 theta |
| max 2theta | 60° |
| no. reflns measured | 525 |
| no. reflns unique | 519 |
| no. obs. data I$_{net}$ > 1.0σ(I) | 519 |
| Min and max transmission | 0.3885, 0.6219 |
| number of parameters in least-squares | 23 |
| R$^a$ | 0.0569 |
| R$_w$$^b$ | 0.1659 |
| GOF$^c$ | 1.301 |
| min and max peak heights on final DF map (e⁻/Å³) | -2.043, 2.805 |

$^a$R$_f$ = (Σ(F₀ - F$_c$)/F₀.
$^b$R$_w$ = [Σ(w(F₀ - F$_c$)²)/wF₀²)]$^{½}$.
$^c$GOF = [Σ(w(F₀ - F$_c$)²)/(No. of reflns. - No. of parameters)]$^{½}$

TABLE 7.4

Atomic coordinates and isotropic displacement parameters.

| | x | y | z | b(iso) |
|---|---|---|---|---|
| Cd(1) | 0 | 0 | 0 | 0.041(1) |
| Cl(1) | 0.2615(2) | 0.1561(2) | -0.2500 | 0.041(1) |
| N(1) | 0.3333 | -0.3333 | -0.2500 | 0.048(2) |
| C(1) | 0.3800(3) | -0.1683(2) | -0.3290(5) | 0.200(1) |

C₈TA-MX 33, M=Zn or Cd. C₈TA-CdX 33 was found to crystallize in the monoclinic space group C2/c, a=52.97(4) Å, b=9.264(2) Å, c=29.82(1) Å, λ=104.40(4)°. C₈TA-CdX 33 crystallizes in the same space group and has a similar PXRD pattern to that obtained for C₈TA-ZnX 33, (lattice constants a=52.40(2) Å, b=9.22(1) Å, c=29.59(1) Å, β=104.64°(1). Crystallographic data for C₈TA-ZnX 33 are given in Table 7.5, atomic positions are given in Table 7.6. These structures comprise puckered layers of MX₄²⁻ tetrahedra. Due to the disorder amongst the octyltrimethylammonium cations, a complete structural solution has not yet been found for either material. The cross channel distance is approximately 27.9 Å. The average bond length and angle in ZnX₄²⁻ is 2.30 Å and 116.5°, slightly distorted from the ideal bond angle of 109.5°.

TABLE 7.5

Crystallographic data for [(H₃C)₃N(CH₂)₇CH₃]₂ZnCl₂Br₂.

| | |
|---|---|
| Formula | ZnCl₂Br₂C₂₆N₂H₅₂ |
| Formula weight(g/mol) | 581.93 |
| space group | C 2/C |
| Color | Colorless |

TABLE 7.5-continued

Crystallographic data for $[(H_3C)_3N(CH_2)_7CH_3]_2ZnCl_2Br_2$.

| | |
|---|---|
| A (Å) | 52.3997(2) |
| B (Å) | 9.2280(1) |
| C (Å) | 29.5857(1) |
| β, ° | 104.637(1) |
| V(Å³) | 13833.9(2) |
| Z | 16 |
| Temp. (K) | 293(2) |
| $\rho_{calcd}$ (mg/m$^{-3}$) | 1.118 |
| F(000) | 4330.98 |
| Min and max 2 theta values for data collection | 2.55°, 46.7° |
| λ(Mo K$_{60}$Å | 0.71073 |
| μ(mm$^{-1}$) | 4.570 |
| Diffractometer | Seimens Smart CCD |
| No. reflns measured | 19093 |
| No. reflns unique | 9993 |
| No. obs. data $I_{net} > 1.0\sigma(I)$ | 835 |
| number of parameters in least-squares | 24 |
| R$^a$ | 0.533 |
| R$_w^b$ | 0.611 |
| GOF$^c$ | 5.53 |

$^a R_f = (\Sigma(F_0 - F_c)/F_0$.
$^b R_w = [\Sigma(w(F_0 - F_c)^2)/wF_0^2)]^{1/2}$.
$^c GOF = [\Sigma(w(F_0 - F_c)^2)/(No.\ of\ reflns. - No.\ of\ parameters)]^{1/2}$

TABLE 7.6

Positional Parameters for C$_8$TA-ZnX 33

| Atom | x | y | z |
|---|---|---|---|
| Zn(1) | 0.1269(2) | 0.2112(8) | 0.1951(1) |
| Zn(2) | 0.8168(2) | 0.7284(5) | 0.5601(4) |
| Zn(3) | 0.2252(2) | 0.2133(3) | 0.2465(1) |
| Zn(4) | 0.8145(6) | 0.7300(1) | 0.5327(5) |
| Zn(5) | 0 | 0.7191(1) | 0 |
| Cl(1) | 0.0280(8) | 0.7108(2) | 0.0881(3) |
| Cl(2) | 0.2381(7) | 0.1980(4) | 0.1779(1) |
| Cl(3) | 0.8076(1) | 0.5541(2) | 0.4715(9) |
| Cl(4) | 0.8046(1) | 0.9048(6) | 0.5992(2) |
| Cl(5) | 0.0933(1) | 0.1742(4) | 0.2342(1) |
| Cl(6) | 0.8033(5) | 0.4991(3) | 0.5972(3) |
| Cl(7) | 0.8115(9) | 0.9089(6) | 0.4947(7) |
| Cl(8) | 0.0933(1) | 0.1742(4) | 0.2342(1) |
| Cl(9) | 0.8637(6) | 0.7210(9) | 0.5750(6) |
| Cl(10) | 0.7817(4) | 0.7176(4) | 0.5743(1) |
| Cl(11) | 0.1812(1) | 0.1569(1) | 0.2420(9) |
| Cl(12) | −0.0313(8) | 0.8903(9) | 0.0169(9) |
| Cl(13) | 0.2433(1) | 0.1316(1) | 0.2839(7) |
| Cl(14) | 0.8559(5) | 0.6244(3) | 0.5879(2) |
| Br(1) | 0.1691(4) | 0.2157(3) | 0.2491(5) |
| Br(2) | 0.1231(3) | 0.4084(7) | 0.1509(0) |
| Br(3) | 0.2435(5) | 0.4174(7) | 0.2934(8) |
| Br(4) | 0.7917(1) | 0.7050(1) | 0.4810(4) |

Compositions loaded on either side of C$_{16}$TA-CdX 50 lead to materials with a soapy or wax-like texture. These materials exhibit PXRD patterns that are similar to that observed for C$_{16}$TA-CdX 50. Surfactant rich compositions typically crystallize as a colorless soapy material which are slightly fluid as observed by the applying shear to the sample between the glass slide and coverslip. Compositions of greater than C$_{16}$TA-CdX 55, exhibit the presence of crystalline CdCl$_2$ in addition to C$_{16}$TA-CdX 50 by PXRD.

CdCl$_2$/C$_{16}$TAC Phase Diagrams

C$_{16}$TAC has been utilized to direct the structure formation in cadmium halide fluids, which results in lyotropic-like textures observed on heating and thermotropic like textures observed on cooling. The phase diagram for the CdCl$_2$/C$_{16}$TAC system represents the compilation of DSC, POM and PXRD measurements, with compositions being loaded in at least 5% intervals across the phase diagram. No impurity crystalline phases are observed in the CdCl$_2$/C$_{16}$TAC system using C$_{16}$TAC (TCl America), thus melt reactions could be utilized to obtain precise phase compositions. As stated previously, an impurity phase is noted in the CdCl$_2$/C$_{16}$TAB (Aldrich) phase diagram that was persistent throughout the entire compositional range. In the all chloride system, no crystalline material is observed in the homogeneous melts until compositions of greater than 50% CdCl$_2$ at which point crystalline CdCl$_2$ is observed to be present along with the liquid crystalline phase.

Endotherms in the DSC data upon heating indicate the various crystal to liquid crystal and the clearing of the liquid crystalline to isotropic solution transitions. Corresponding cooling exotherms however, were only observed for metal rich compositions, >40% CdCl$_2$. In the following description these phases are described as: D-discotic; A-amorphous phase; Gel-gel or plastic crystalline; K-crystalline phase; SA-Smectic A phase; SE-Smectic E phase; S-solution (isotropic liquid). The crystalline structure, C$_{16}$TA-CdCl 50, can be represented in the phase diagram by a solid, black vertical line at 50% CdCl$_2$. The characteristics of the liquid crystalline phases are best described by consideration of four regions of phase space including <30%, 30–35%, 40–70% and >70% CdCl$_2$.

Surfactant rich phases, <30% CdCl$_2$. Reactions loaded between 0% and ~25% CdCl$_2$ yield a waxy crystalline solid at room temperature. PXRD indicate that this material consists of a new crystalline phase as well as crystalline C$_{16}$TAC. Initial melting of the crystalline material is observed around 30° C. for nearly all compositions in this region to form an amorphous liquid in addition to a crystalline phase. The amorphous phase has a low viscosity as observed by applying shear force to the coverslip. The remaining crystalline material melts into a liquid crystalline phase around 75 to 80° C. A lancet, or blade-like texture is observed for this liquid crystalline phase. A similar texture was observed for the crystalline material, however it is not shearable until the sample is heated above the liquid crystalline transition temperature. The lancet texture has a dark stripe running down the middle of it. On transition to the liquid crystalline phase, the lancets can be sheared into a fibrous texture. The liquid crystallinity exists over a narrow temperature range, ~20° C., with clearing of the lancet texture occurring around 91–92° C. Samples were heated to 300° C. to check for decomposition, which usually occurred around 275–280° C. wherein the samples become brown and charred on the slide. DSC transitions observed on heating correlate well with transitions seen by optical microscopy. A liquid crystalline to crystalline phase transition is observed in the DSC upon cooling at approximately 65° C. The samples become more viscous as the sample cools down to room temperature until the sample is no longer shearable under stress. 30 to 35% CdCl$_2$. Between 30 and 35% CdCl$_2$ a new liquid crystalline texture is seen on heating and cooling. These materials crystallize from the melt as a soft and waxy, white crystalline powder with a soap like consistency. These materials exhibit a PXRD pattern that is similar to that observed for C$_{16}$TA-CdCl 50 though the composition must have an excess of C$_{16}$TAC. A lamellar texture similar to that reported for an oily streak texture, L$_\alpha$, in the lyotropic literature is observed upon heating at 50° C. Blackmore, E. S. and Tiddy, G. J. T. Liquid Crystals 1990, 8, 131; Montalvo, G., et al., *J. Colloid Interface Sci*. 1995, 172, 494; Rosevear, F. B. *J. Amer. Oil Chem. Soc*. 1954, 31, 628. Upon further heating to approximately 150° C., the material clears to an isotropic liquid. The texture seen on cooling is still lamellar or layered in nature, however the optical texture is reminiscent of that described as $S_A$ in the thermotropic literature. On cooling, the isotropic liquid forms batonnets at 150° C. which coalesce into a focal conic, $S_A$ texture. The $S_A$ optical texture is not observed across the entire sample consistent with regions of homeotropic alignment. Gray, G. W.; Goodby, J. W. G. *Smectic Liquid Crystals: Textures and Structures*; Leonard Hill: London, 1984; Demus, D.; Richter, L. E. *Textures of Liquid Crystals*. Verlag Chemie: New York, 1978; Holbrey, J. D.; Seddon, K. R. *J. Chem. Soc. Dalton Trans.* 1999, 2133. However, applying shear to the sample disturbs the homeotropic alignment resulting in the observation of lamellar texture throughout the sample.

Upon increasing the inorganic content to 33 and 35% $CdCl_2$, the transition from crystal to a lamellar, oily streak liquid crystalline phase occurs at approximately the same temperature as 30% $CdCl_2$, 50° to 51° C. for both compositions. However, a dramatic increase in the clearing temperature is observed between $C_{16}$TA-CdX 33 and $C_{16}$TA-CdCl 35165° C. and 260° C., respectively. DSC measurements demonstrated these phase transitions for $C_{16}$TA-CdCl 33. The dome-like curve in this portion of the phase diagram is a feature reminiscent of a crystalline phase formed at approximately 33% $CdCl_2$ for shorter chain cations such as $C_8TA^+$ or $TEA^+$. This composition is consistent with the formation of isolated $CdCl_4^{2-}$ tetrahedral anions. However, no new crystalline phase is observed in the $CdCl_2/C_{16}$TAC system. The cooling phase transitions are not visible by DSC measurements; however, these are clearly visible by POM. Decomposition of these materials occurs on heating to temperatures in excess of ~275° C. as seen by POM and DSC.

40% to 70% $CdCl_2$. Increasing the inorganic content of the system results in the appearance of a new liquid crystalline phase between 40% and 70% $CdCl_2$. Upon heating $C_{16}$TA-CdCl 40, an initial phase transition from the crystalline to the first liquid crystalline phase occurs at 72° C. The texture seen under the optical microscope is similar to that described for a mosaic texture found in the lyotropic literature. Rosevear, F. B. *J. Amer. Oil Chem. Soc.* 1954, 31, 628. Upon further heating a phase transition occurs giving rise to a transformation to an oily streak texture at 215° C. This texture is analogous to the lamellar phase previously described for the $C_{16}$TA-CdCl 30–40%. Clearing of the oily streak lamellar liquid crystalline texture occurs at 269° C. Heating the material much past 270° C. results in decomposition of the surfactant as noted by a visibly browning of the sample under the microscope. On cooling, batonnets appear which coalesce into the $S_A$ texture at 269° C. Upon cooling to ~215° C., transition bars are observed to grow across the backs of the focal conic fans. The transition bars are characteristic signatures of the formation of the $S_E$ thermotropic liquid crystalline-type phase. In addition, regions exhibiting homeotropic alignment of the $S_A$ phase exhibit a marbled optical texture upon cooling through this $S_A$ to $S_E$ phase transition. If shear is applied to the sample before the transition bars appear, only a mosaic texture is seen on cooling. The viscosity of the sample slowly increases as the slide is cooled to room temperature. Applying shear to the sample after the transition bars appear is extremely difficult owing to the pseudo crystalline nature of the $S_E$ phase.

At 45% $CdCl_2$ and greater, a plastic crystalline or gel phase is seen on initial heating of the material. The plastic crystalline phase is characterized by a melting to a gel like material. There remains a high degree of plasticity to the material under shear. $C_{16}$TA-CdCl 45 exhibits a crystalline to plastic crystalline phase transition at 72° C. as noted by DSC and optical measurements. The plastic crystal melts to form a liquid crystalline phase at 97° C. exhibiting a mosaic lamellar texture. As observed for $C_{16}$TA-CdCl 40, the mosaic liquid crystalline texture transforms to the oily streak lamellar texture at 161° C. The liquid crystalline texture is lost upon clearing to an isotropic solution phase at 273° C. Decomposition of the sample occurs at roughly the same temperature. On cooling, batonnets form which coalesce to give rise to the $S_A$ focal conic texture. Further cooling to below 161° C. results in the $S_A$ to $S_E$ transition indicated both by the exotherm in the DSC and the appearance of transition bars across the backs of the focal conics in the optical texture.

The DSC measurement of the $C_{16}$TA-CdCl 50 sample now clearly demonstrates the reversibility of the phase transitions. The near crystalline organization of the $S_E$ phase and the higher lattice energy of the cadmium chloride lattice in the metal rich phases is apparently responsible for the more pronounced phase transitions. Similar cooling phase transitions were not observed in the DSC measurements of the more surfactant rich phases. Decomposition of $C_{16}$TA-CdCl 50 occurs on heating past the clearing temperature, 275° C.

VT-PXRD measurements of a sample of $C_{16}$TA-CdCl 50 were also performed. The observed strong low angle Bragg reflection is indicative of the lamellar spacing in both crystalline and liquid crystalline phases. The d-spacing for this first peak in the room temperature pattern is 24.99 Å consistent with the 0.001 reflection of the single crystal structure. The room temperature pattern is consistent with the theoretical PXRD pattern generated from the single crystal structural solution. A significant expansion of the lamellar d-spacing is observed on transition to the $S_E$ phase, d=29.11 Å. In addition to the strong lamellar diffraction, the $S_E$ pattern exhibits higher order consistent with diminished but significant 3-D ordering. The diffraction pattern indexes to a monoclinic cell, a=28.85 Å, b=14.33 Å, c=9.44 Å and A=96.934°. On heating to 180° C., all diffraction except for the lamellar spacing is lost, however four orders of the lamellar diffraction can be indexed to a lamellar spacing of 32.450 Å. Additional broad features are centered at d=16.13 Å (002), 8.05 Å (003) and 4.58 Å (004). The $S_A$ diffraction pattern indexes to a monoclinic cell, a=32.37 Å, b=8.05 Å, c=16.24 Å and λ=97.38°. On heating to 260° C., virtually all diffraction is lost, consistent with the formation of an isotropic solution.

A similar series of phase transitions, K to Gel to $S_E$ to $S_A$ to the clearing temperature, is observed for compositions throughout the range of 40% to 70% $CdCl_2$. The clearing temperature remains approximately the same as the decomposition temperature throughout this series at 270–275° C. The temperature of the Gel to $S_E$ and $S_E$ to S exhibit a noted increase from 40 to 65% $CdCl_2$. The Gel to $S_E$ transition exhibits a pronounced discontinuity just above 50%; the composition of the discrete $(C_{16}TA)_4Cd_4Cl_{12}$ crystalline phase. Furthermore, at compositions of greater than 52% $CdCl_2$, crystalline $CdCl_2$ is observed to persist in the liquid crystalline phases. The amount of crystalline material present increases with an increase in the mole percent $CdCl_2$, i.e. from left to right in the phase diagram. This crystalline material has been identified as $CdCl_2$ by PXRD.

Metal Halide Rich Phases, >70% $CdCl_2$. Compositions in excess of 70% $CdCl_2$ typically crystallize as a white powder from the melt. Upon heating the $S_A$ type lamellar liquid crystalline phase is observed in addition to crystalline CdCl$_2$. These metal-halide rich materials no longer exhibit a soap or wax-like consistency but are instead microcrystalline powders. The initial transition to a gel-like plastic crystalline phase is observed prior to a partial melting to the liquid crystalline state. However, the K to Gel phase transition increases in temperature by ~50° C. in the vicinity of 70% CdCl$_2$. A narrow window of plastic crystallinity ensues with melting of the plastic crystalline phase into the liquid crystalline, lamellar phase. Clearing of all liquid crystalline texture occurs around 200° C. for the 70–75% composition. Decomposition of the material occurs on further heating to 270° C. Cooling the material from the isotropic liquid results in the formation of S$_A$ texture around 200° C., however the observation of liquid crystallinity is made difficult by the large amounts of crystalline CdCl$_2$ present. While some melting and clearing of the sample can be witnessed under the microscope, DSC proved to be an invaluable tool for the accurate determination of the phase transition temperatures. In a trace of the DSC measurement for C$_{16}$TA-CdCl 75, heating endotherms and cooling exotherms are clearly observed with approximately 10° C. of supercooling. The same pattern of phase transitions is observed for C$_{16}$TA-CdCl 80 with the K to Gel+K transition occurring at 120° C., the Gel+K to S$_A$+K phase transition occurring at 130° and clearing of all liquid crystalline texture occurring at 206° C. Decomposition of the material results on heating to temperatures in excess of 275° C. wherein the sample slowly turns from a colorless to dark brown, leaving a charred sample beneath the coverslip.

Compositions>82% CdCl$_2$. Compositions of greater than 82% CdCl$_2$ exhibit no liquid crystallinity. No melting is observed upon heating to above 270° C. or 275° C., at which point the surfactant decomposed leaving a blackened char. PXRD of the blackened char revealed only CdCl$_2$ to be present in the reaction tube.

The CdCl$_2$/C$_{16}$TAB phase diagram. The phase diagram of the mixed halide system was also determined from the reaction of CdCl$_2$ and C$_{16}$TAB. Data points represent the compilation of DSC, POM and PXRD measurements. The compositions were loaded in at least 5% mole percent increments from 0 to 85% CdCl$_2$. The phase transitions are reversible as seen through multiple heating and cooling cycles of the sample by DSC as well as POM. PXRD was used to identify the crystalline phases present in the phase diagram. POM observations were used to identify the liquid crystalline phase present. While generally consistent with the phase diagram described above for the all chloride system, the impurity in the Aldrich C$_{16}$TAB clearly altered the phase diagram. The resulting crystalline impurity material was persistent across the complete range of binary mixtures. Select portions of this phase diagram could be accessed by recrystallization from methanol. Such recrystallized materials in the mixed halide system were analogous to the all chloride system.

The major difference between the C$_{16}$TAC/CdCl$_2$ and the C$_{16}$TAB/CdCl$_2$ phase diagrams is the presence of an impurity, crystalline material of formula HNMe$_3$CdCl$_3$ in the latter. The impurity has been correctly identified as a trimethylammonium cation. This material does not melt, even on heating to temperatures in excess of 300° C. Like the all chloride system crystalline CdCl$_2$ is observed in the liquid crystalline matrix for compositions greater than ~C$_{16}$TA-CdX 50. The amount of crystalline CdCl$_2$ increases as a function of mole percent CdCl$_2$. The observance of liquid crystallinity in compositions greater than C$_{16}$TA-CdX 66 is made extremely difficult due to the large amounts of crystalline CdCl$_2$ present. DSC measurements were crucial in determining the transition temperatures for the phase transitions. What follows below is a brief description of the C$_{16}$TAB/CdCl$_2$ phase diagram.

The structure and approximate phase boundaries are analogous between the C$_{16}$TAC/CdCl$_2$ and C$_{16}$TAB/CdCl$_2$ systems. In the surfactant rich domain (<30% CdCl$_2$) there is a greater temperature window of stability for the lancet textured liquid crystals. Both systems exhibit the eutectic at approximately 28% CdCl$_2$. The smectic-A liquid crystalline phase between 30–42% clears to an isotropic solution at a significantly lower temperature in the mixed halide system. The dome-like feature around 33% in the phase diagram, being much broader (30–42%) in the mixed halide system than in the all chloride system (30–35%), is where the tetrahedral CdCl$_4^{2-}$ anions can form. Such tetrahedral coordination is distinct from the octahedral coordination proposed for both lower and greater metal halide rich compositions. The phase characteristics of the more metal halide rich compositions also show a strong parallel between the all chloride and mixed chloride/bromide systems. The S$_A$ and S$_E$ liquid crystalline phases have a broad range of stability from 40–65% where the S$_E$ is no longer observed, the K to Gel dramatically increases temperature and the clearing point of the S$_A$ phase decreases in temperature.

Chain Length Study. To further probe the influence of the surfactant on directing the structure of the inorganic fluid the binary compositions of the surfactants of varying chain length were studied at the 50% CdCl$_2$ composition. Because the C$_n$TAB salts possessed the common trimethylammonium impurity, resulting in the appearance of a crystalline impurity in the liquid crystalline matrix, this investigation focused on the C$_n$TAC system for materials prepared via melt reactions.

To obtain the purest materials the C$_n$TA-CdX 50, 6<n<18, compounds recrystallized from a saturated methanolic solution of CdCl$_2$ and C$_{16}$TAB were studied. Materials prepared via this method do not possess the impurity crystalline material and are considered to be pure. Melts of these crystalline materials yielded a homogeneous single phase liquid. The phase diagram was prepared and indicated the phase characteristics as a function of temperature and surfactant chain length. These data represent the compilation of POM and DSC measurements.

C$_{18}$TA-CdX 50 crystallizes a colorless, crystalline powder which can be indexed to a triclinic cell, a=9.80 Å, b=15.20 Å, c=29.58 Å, α=69.17°, β=77.46°, γ=112.51°. Upon heating, the material melts slightly to yield a viscous gel-like plastic crystalline phase at 44° C. A lamellar mosaic texture is seen on heating to 114° C., which is then transformed to an oily streak texture after the phase transition at 149° C. The lamellar textures seen are the same as those observed in the C$_{16}$TAX/CdCl$_2$ phase diagrams. Clearing of all liquid crystalline texture occurs at 270° C. Decomposition of the sample occurs on heating past 275° C. Upon cooling from the isotropic liquid, characteristic bâtonnets of the S$_A$ phase appear at 270° C. The bâtonnets coalesce to form a focal conic texture approximately 2° to 3° C. below the first appearance of the bâtonnets. Along with the S$_A$ focal conic texture, isotropic regions of liquid are also present. By applying shear to the coverslip, it is possible to induce a mosaic texture to the isotropic liquid that remains on cooling all the way to room temperature. When no shear is applied, characteristic transition bars of the S$_E$ phase appear across the backs of the focal conic fans at 114° C. In addition, a marbled texture appears in regions of homeotropic alignment of the S$_A$ phase. It becomes very difficult to apply shear to the fluid because of the high viscosity of the S$_E$ phase.

Nevertheless, fracture of the crystallites is not observed until below the $S_E$ to K transition.

Like the $C_{18}$ and $C_{16}$ systems, $C_{14}$TA-CdX 50 exhibits the series of K to Gel to $S_E$ to $S_A$ to S phase transitions. Though the latter two are at slightly lower temperatures. The crystal to plastic crystal phase transition occurs at 65° C. followed by the transition to the $S_E$ phase at 125° C. The transition to the $S_A$ phase occurs at 161° C. followed almost immediately by clearing of all liquid crystalline texture at 173° C. Decomposition of the sample occurs on heating to 275° C. These transitions are clearly defined by DSC measurements and are well correlated with the transitions observed optically by POM. PXRD patterns are indicative of a similar structure with decreased lamellar spacing.

$C_{12}$TA-CdX 50 crystallizes as a colorless, crystalline powder which can be indexed to a monoclinic cell, a=21.62 Å, b=14.57 Å, c=11.48 Å, β=94.30°. By PXRD, $C_{12}$TA-CdX 50 is significantly different than longer chain lengths. Upon heating to 34° C. a texture is observed that is related to pictures and descriptions of a hexagonal non-geometric ($H_{ng}$) texture. (Demus, D.; Goodby, J.; Gray, G. W.; Spiess, H.-W.; Vill, V. *Handbook of Liquid Crystals, Vol 3: High Molecular Weight Liquid Crystals*; Wiley-VCH: New York, 1998. Slaney, A. J.; Takatoh, K, Goodby, J. W. in *The Optics of Thermotropic Liquid Crystals*. eds. Steve Elston and Roy Sambles. Taylor & Francis: Bristol, Pa., 1998.) At 94° C., there is an apparent decrease in the viscosity of the liquid and the $H_{ng}$ texture is transformed into the more standard hexagonal texture. However, this transition is not been observed in DSC measurements; only the clearing exotherm is observed. Clearing of the sample occurs at 117° C. Hexagonal texture reappears on cooling at 117° C. that supercools down to below room temperature.

$C_{10}$TA-CdX 50 is a liquid crystalline gel at room temperature that clears upon heating to 61° C. Like the $C_{12}$ phase, a hexagonal ordering is observed in this liquid crystal. Hexagonal texture also reappears on cooling at approximately 61° C. and the system remains an ordered liquid until well below room temperature. The room temperature PXRD indexes to a monoclinic cell of dimensions a=21.30 Å, b=8.20 Å, c=16.72 Å, β=119.23°.

No liquid crystalline texture was observed for melts of $C_n$TA-CdX 50 for n less than 10 for samples recrystallized from a saturated methanolic solution. On heating $C_8$TA-CdX 50, a crystalline plus amorphous phase is observed at 45° C. and all phases melt at 145° C. into an isotropic liquid. On cooling, crystalline material grows in at 145° C. and remains to room temperature. It is clear that this material is crystalline, since it can be fractured upon applying shear force to the coverslip. In addition, $C_6$TA and $C_8$TA-CdX 50 recrystallized from methanol are colorless solids. The same PXRD pattern is observed for $C_6$ and $C_8$ that are different than longer chain lengths. $C_{10}$TA-CdX 50 is a gel at room temperature further indicating that a change has occurred in the material on lowering the chain length from $C_{10}$ to $C_8$ wherein the latter is no longer liquid crystalline. X-ray quality single crystals were unable to be obtained for any of these materials.

$C_n$TA-CdX 33. The $C_n$TA-CdX 33 compositions were also studied, however, as in the $C_{16}$TAB/CdCl$_2$ system, no new crystalline phase was formed at the 33% composition for chain lengths of 10 or greater. A chain length of 8 yields a new crystalline phase, $C_8$TA-CdX 33. PXRD of this material suggests a structure similar to that obtained from a partial structural solution of $C_8$TA-ZnX 33 wherein isolated $MX_4^{2-}$ tetrahedra arrange in puckered layers. Upon heating, it was apparent that $C_8$TA-CdX 33 was not liquid crystalline. $C_8$TA-CdX 33 partially melts at 53° C. to give a crystalline plus amorphous phase, both of which completely melt at 73° C. to give an isotropic solution. Recrystallization starts at approximately the same temperature on cooling, however this process is extremely slow, often taking ~30° C. for the entire isotropic liquid to be covered with crystal. The crystalline material that appears fractures easily when sheared.

Conclusion. This Example demonstrates the templating of melts of CdCl$_2$ with the anisotropically shaped $C_n$TAX surfactant to make a unique family of metallotropic liquid crystals. This Example provides an indication as to the effect a different metal halide can have on the liquid crystalline texture and structure observed. By changing the metal halide from ZnCl$_2$ to CdCl$_2$, a family of liquid crystalline materials that shows lyotropic-type liquid crystalline textures on heating and thermotropic-type textures on cooling is observed. At low metal halide concentrations, the metallotropism of the system dictates the formation of isolated CdX$_6^{4-}$ octahedra that require the coordination of four surfactant molecules to charge balance the anion. This results in the formation of a reverse micelle, liquid crystalline species. By increasing the metal halide content of the system, lamellar structures become evident.

With $C_{16}$TA-CdX 50, a unique coordination geometry of the inorganic species is observed. The structure of the inorganic polyanion can be directly correlated to the size and charge density of the $C_{16}$TAC templating cation. The low charge density of the trimethylammonium head group and the alkyl chain disrupts the formation of the CdCl$_3$ infinite chain typically seen with high charge density head groups. However, it has been observed that without the influence of the alkyl chain, the formation of the infinite chain becomes possible. When compositions become metal halide rich, liquid crystallinity is observed only in the presence of excess crystalline CdCl$_2$. This liquid crystalline behavior is remarkably different when compared to the $C_{16}$TAB/ZnCl$_2$ system. However, by shortening the chain length to $C_{12}$, a lamellar arrangement of the surfactant cations becomes destabilized because of the decreased van der Waal's interactions between the surfactant chains. To accommodate for the destabilization, a rearrangement of the surfactants occurs to a hexagonal micellar network structure. Hexagonal liquid crystalline textures are observed on heating and cooling the sample.

Thus, the liquid crystalline fluids presented in this Example show a balance of structure directing influences of the metal halide and the $C_{16}$TAC templating surfactant. While reminiscent of lyotropic and thermotropic liquid crystalline phases, these metallotropic liquid crystals are unique due to the varying structures that are observed as the metal halide to surfactant ratio is changed.

EXAMPLE 8

Magnetic Inorganic Liquid Crystals

The observation of magnetic properties in a material is dependent on the presence and number of spins as well as the organization of chemical-structure, which directs the communication between spins. Because of the strict orientational requirements necessary to obtain bulk magnetic properties, greatest attention has been given to the design and application of crystalline solids. However the long-range structural organization obtainable with liquid crystals, and the ability to prepare spin-containing metallomesogens offers the exciting possibility for the preparation of magnetic liquids.

Figure 7:
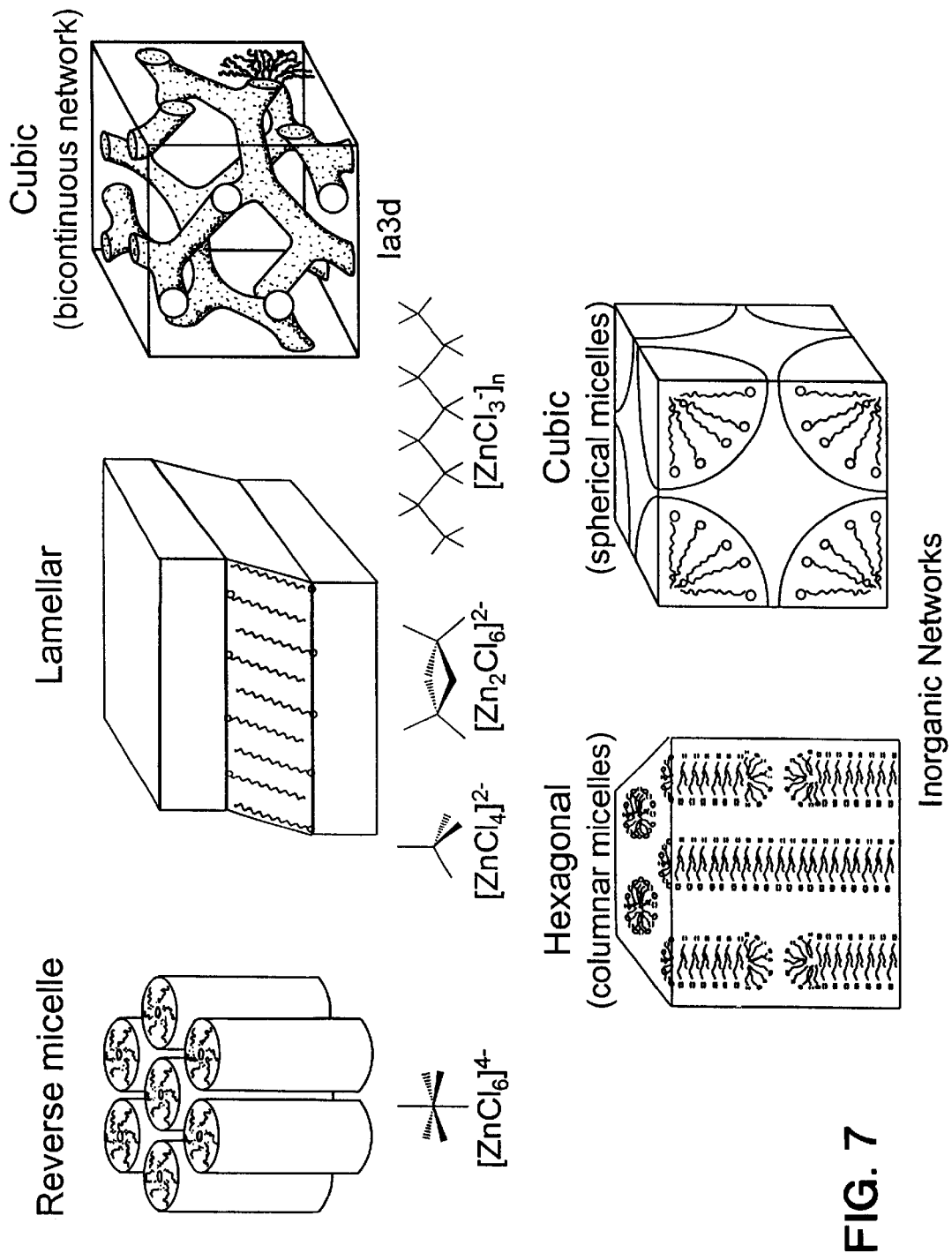
FIG. 7 is a schematic depiction of liquid crystalline structural metallotropism for $ZnCl_2$, including reverse micelle, lamellar, bicontinuous cubic, hexagonal columnar and spherical micelle geometries.
Figure 8:
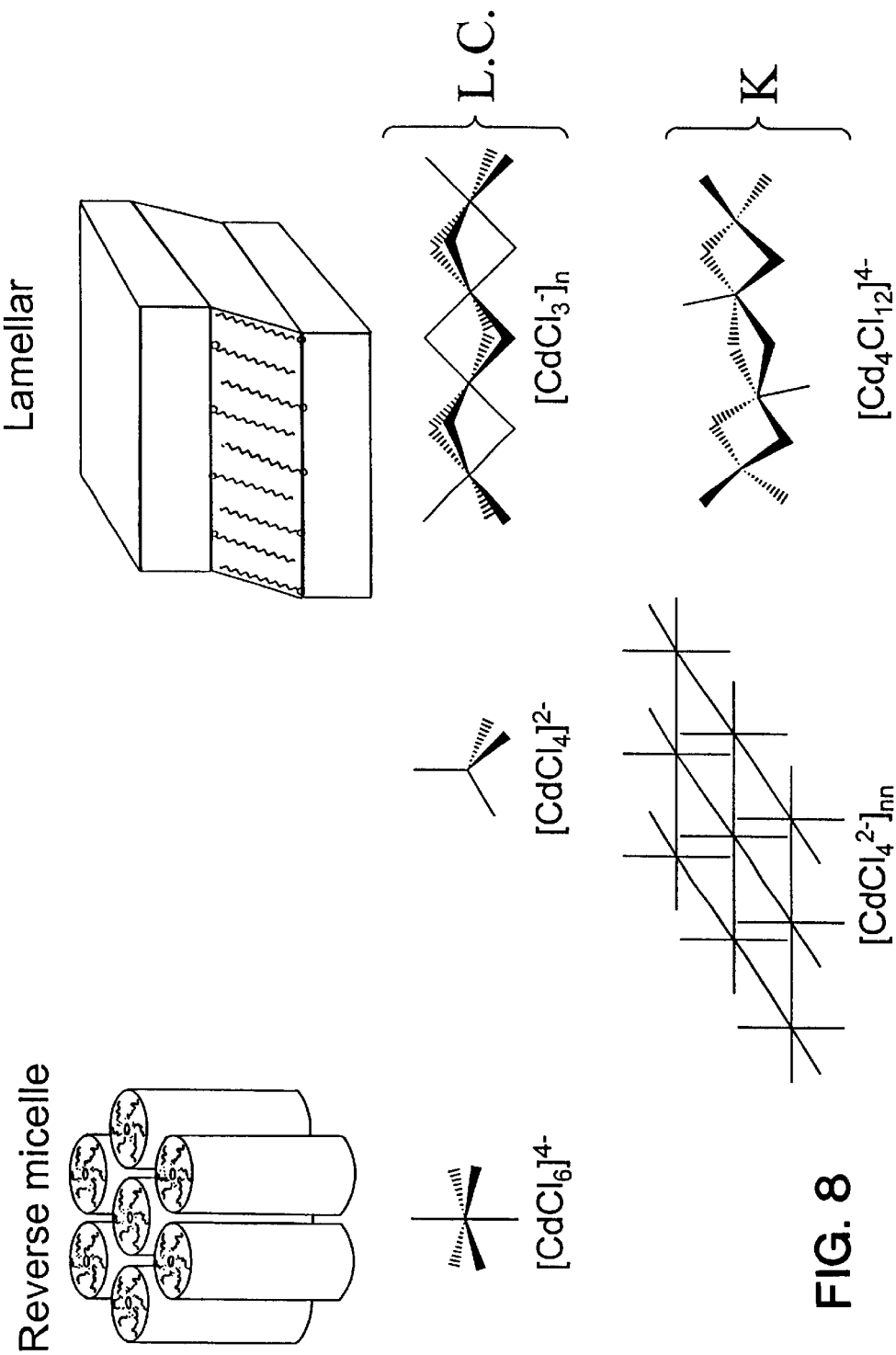
FIG. 8 is a schematic depiction of liquid crystalline structural metallotropism for $CdCl_2$, including reverse micelle and lamellar geometries.

The novel class of metallotropic liquid crystals provided in the present invention exhibit the greatest metal character of any known liquid crystals. In a preferred embodiment a liquid crystal of the present invention is referred to as a metallotropic liquid crystal. In a more preferred embodiment, the liquids of the present invention are prepared by surfactant templating of metal-chloride networks and in an even more preferred embodiment the metals are transition metals with unpaired electrons. As described in examples 1 and 7 the most extensive investigation of the metallotropic liquid crystals includes the zinc- and cadmium-halide systems. Liquid crystalline structural morphologies including reverse micelle, lamellar, bicontinuous cubic, hexagonal columnar and spherical micelle geometries are observed in the progression from 0 to 85 mole percent $ZnCl_2$, see FIG. 7, whereas reverse micelle and lamellar structures are primarily observed in the $CdCl_2$ system (see FIG. 8) for the $C_{16}TA$ surfactant templating. In all of the metallotropic systems other structural morphologies, such as hexagonal columnar, can be obtained by utilization of surfactants with shorter alkyl chains. Certain liquid crystalline phases with surfactant chain lengths of 10–12 carbons are liquid well below room temperature.

Figure 9:
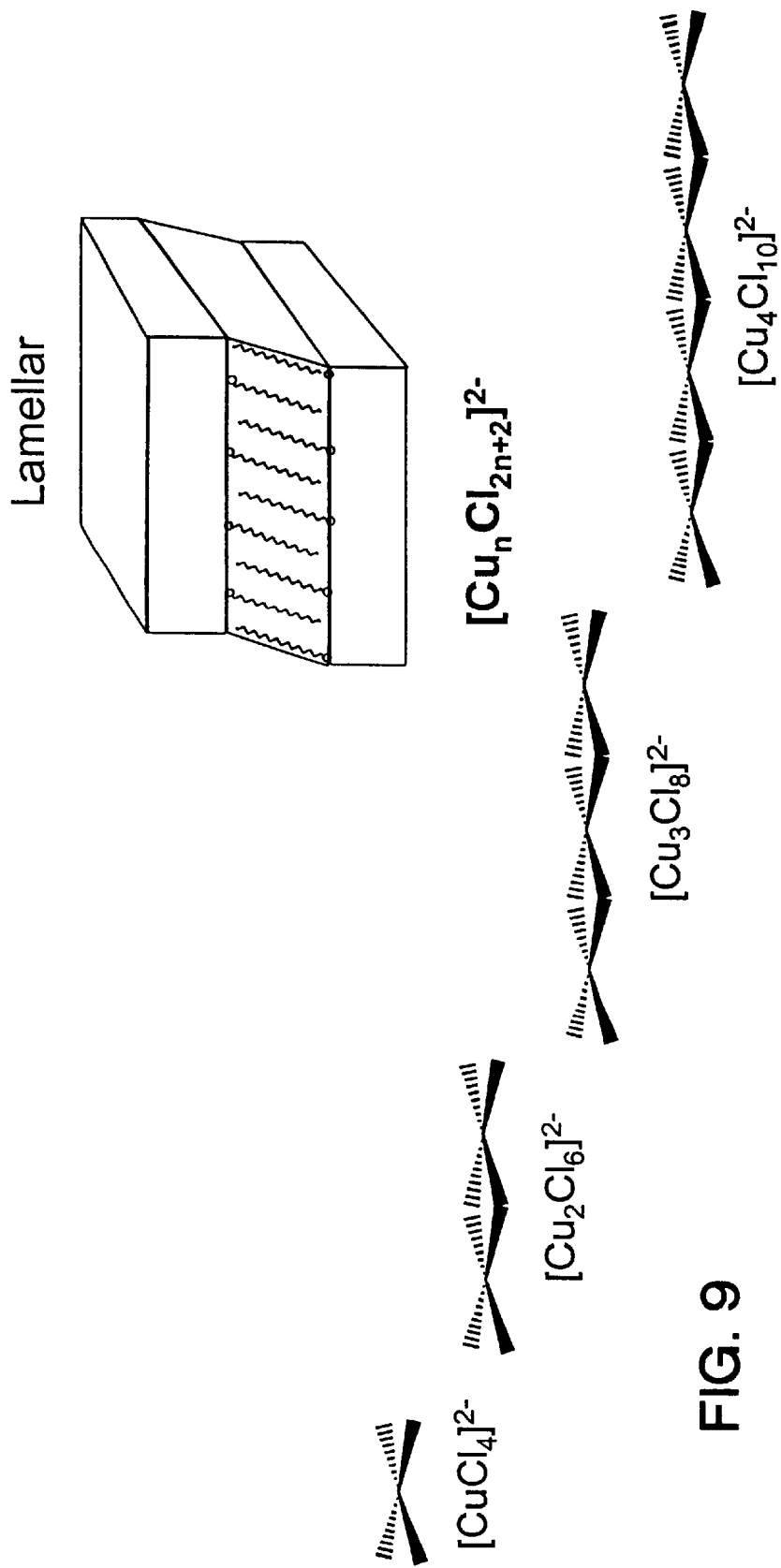
FIG. 9 is a schematic depiction of liquid crystalline structural metallotropism for $CuCl_2$ including lamellar geometries.

As disclosed herein, the ability to control the structural organization of inorganic liquids is not limited to the diamagnetic zinc- and cadmium chlorides. Similar metallotropic liquid crystalline phases can be prepared with alkylammonium surfactants and $MnCl_2.2H_2O$, $FeCl_2$, $CoCl_2$, $NiCl_2$ and $CuCl_2$ (See FIG. 9), each of which exhibits an unpaired electron configuration. The specific inorganic crystalline structure exerts a significant influence on the liquid crystalline structure as well as the compositional breadth over which liquid crystallinity is observed. Each of these is envisioned to exhibit unique magnetic properties. With one unpaired electron per copper site, a $CTAC/CuCl_2$ system was characterized to evaluate the magnetism of these liquid crystals. It has been observed that lamellar metallotropic liquid crystallinity is observed in the $CTAC/CuCl_2$ system between 10 and about 65 mole % as described above and in Example 9 below. Metallotropic liquid crystals of $MnCl_2.2H_2O$, $FeCl_2$, $COCl_2$, $NiCl_2$ have also been prepared at the 50 mole % composition for magnetic characterization.

Figure 6:
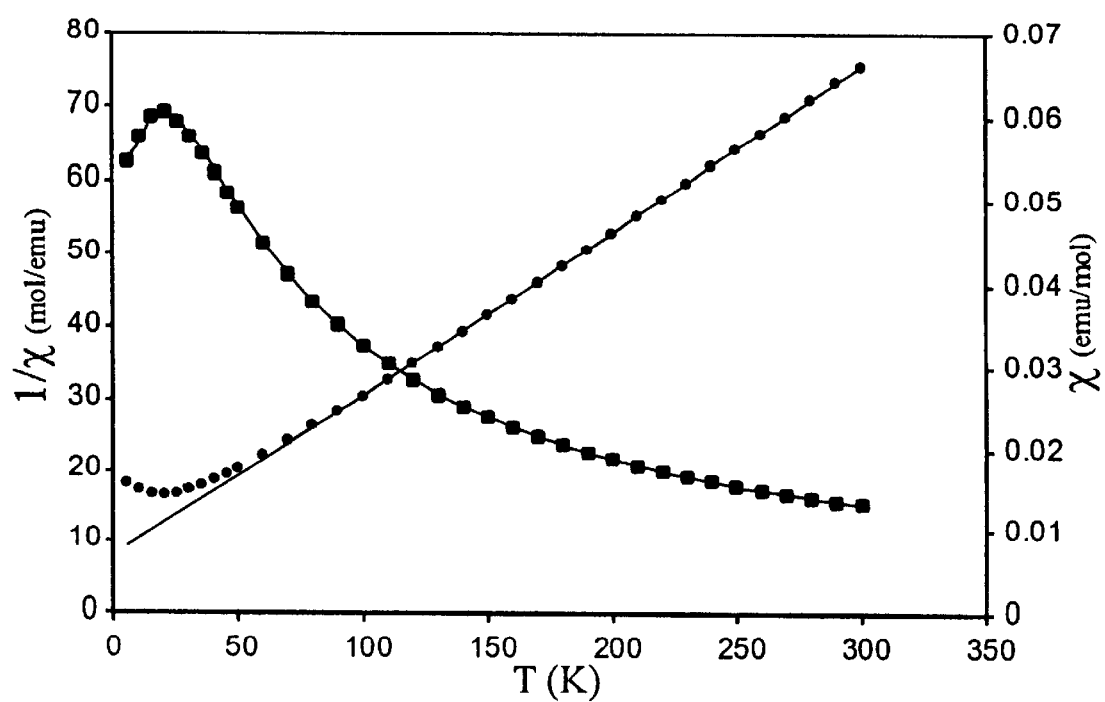
FIG. 6 is a $1/\chi$ vs T plot for an acetate chloride chain that exhibits anti-ferromagnetic ordering. The maximum in the $1/\chi$ vs T plot is observed at 21 K, instead of 55 K in the all chloride chain.

The extensive study of the metamagnetism observed in $FeCl_2$ and $FeBr_2$ (I. S. Jacobs and P. E. Lawrence, *Phys. Rev.*, 1967, 164, 886–878) and spin-flop transitions in $MnX_2.nH_2O$ (X=Cl and Br) (J. E. Rives, *Phys. Rev.*, 1967, 162, 491–496), provide a foundation for the evaluation of magnetism in the metal-rich metallotropic liquid crystals of iron and manganese halides. Also the applicants have previously discovered the material $[NH_4]MnCl_2(O_2CCH_3)]$ from the solvothermal reaction of $MnCl_2.2H_2O$. This material is a structural analog of the well studied $[NMe_4]MnCl_3$ (O. Kahn, Molecular Magnetism. VCH: Weinheim, Germany, 1993, Chapter 11 "Magnetic Chain Compounds: pp 251–286) and provides a useful demonstration of structure/property relationships by the fine tuning of the magnetism via a subtle structural modification. The acetate-bridge in the former results in an elongation of the Mn-Mn distance to 3.52 Å from 3.10 Å in the all chloride chain. Like the all chloride chain, this acetate chloride chain exhibits anti-ferromagnetic ordering; however, the maximum in the $1/\chi$ vs T plot (FIG. 6) is observed at 21 K, instead of 55 K in the all chloride chain. These SQUID data can be fit to the classical-spin expression derived by M. E. Fisher, *Am. J Phys.*, 1964, 32, 343, whereby $J_{intra}$ was found to be −3.5 $cm^{-1}$ (compared to −9.3 $cm^{-1}$ in the all chloride chain). Pertinent to this Example, these 1-D manganese chloride (or chloride-acetate) chains, which here are separated in the crystal structure by ammonium cations, are of the same inorganic structural morphology that is templated by the surfactants in the $Mn^{II}$, $Fe^{II}$, $Co^{II}$, and $Ni^{II}$ halide metallotropic liquid crystals at the 50 mole % composition. Thus, this Example pertains to the characterization of magnetic liquids.

With a SQUID susceptometer, the magnetic susceptibility is investigated as a function of temperature, as is the magnetization as a function of applied field of these novel liquids. Previous investigations of coordination-complex metallomesogens containing lanthanides (K. Binnemans et. al., "Rare-Earth Containing Magnetic Liquid Crystals," *J. Am. Chem. Soc.*, 2000, K. Binnemans, D. W. Bruce, S. R. Collison, R. V. Deun, Y. G. Galyametdinov, and F. Martin, "Towards Magnetic Liquid Crystals," *Phil. Trans. R. Soc. Lond. A*, 1999, 357, 3063–3077) or transition metals (K. Griesar, et al., *Adv. Mater.*, 1994, 6, 381–384) demonstrate a significant magnetic anisotropy of the liquid crystals that can be aligned by an external magnetic field. Significant hysteresis has also been observed, between heating from the crystal vs. cooling from an isotropic liquid, due to the structural organization of the liquid crystal under the applied field. Similar magnetic characteristics are provided in the surfactant rich metallotropic liquid crystals of the present invention.

Related studies of magnetic Langmuir-Blodgett (LB) films also suggest the provision of bulk magnetism in the compositions of the present invention. E. Coronado and C. Mingotaud, *Adv. Mater.*, 1999, 11, 869–872. The first two-dimensional magnets were prepared from LB films of manganese stearate. M. Pomerantz, et al., *Phys. Rev. Lett.*, 1978, 40, 246–249. And more recent studies have focused on the analogy between the magnetic properties of metal-containing LB films to those of layered solid-state materials. C. T. Seip, et al., *J. Am. Chem. Soc.*, 1997, 119, 7084–7094.

The lamellar metallotropic liquid crystals of the present invention exhibit a liquid structure that is related to that of metal containing LB films. Furthermore, in the present inventive liquid crystals, the relative density of spin carriers can be greatly varied, for example from 10 to 65 mole % $CuCl_2$ in the copper chloride system described herein. The more metal-rich compositions of the present inventive liquid crystals provide structures that are related to the parent solid-state structures and thus also provide similar magnetic properties.

EXAMPLE 9

Liquids and Glass of Other Metal-Halides $CuCl_2$ forms covalent chains of edge-shared square planes, weakly associated through the Jahn-Teller distorted axial contacts to a neighboring chain. This basic chain-type connectivity is also observed in molecular anions, the simplest of which is $[Cu_2C_6]^{2-}$. A continuum of $[Cu_nCl_{2n+2}]^{2-}$ oligomers exists, which can be effectively isolated by the counter ions such that inter-chain crystal packing forces are significantly less than the intra-chain covalent bonds. See FIG. 9. Exploiting these structural features, the series of $CTAC/CuCl_2$ metallotropic liquid crystals has been prepared. With the $C_{16}$ surfactant chain, lamellar liquid crystalline structure is observed from 5 to 65 mole % $CuCl_2$. Beyond about 70% $CuCl_2$ excess crystalline $CuCl_2$ is observed to coexist with the liquid crystalline phase. In contrast to the zinc and cadmium chloride systems, there is no evidence of reverse micelle formation in the copper chloride system. This is due to the strong Jahn-Teller structural distortion, which prevents the formation of $CuC_6^{4-}$ octahedral anions. Instead at the 25 mole % composition, a new crystalline phase is isolated in which a layer of $CuCl_4^{2-}$ and isolated $Cl^-$ anions are separated by the surfactant cations as well as four equivalents of methanol solvate. $[CTA]_3[Cl][CuCl_4]\cdot4MeOH$ crystallizes in the space group $P2_1/c$ with lattice constants of a=15.132(2) Å, b=15.193(2) Å, c=31.623(8) Å and β=92.42(2)°. With the $C_{16}$ surfactant chains, liquid crystallinity is observed between about 50° C. to 225° C. with the maximum temperature range observed for the 33 mole % composition. As described for the zinc and cadmium systems, other liquid crystalline structures and room temperature liquid crystals are formed with $C_{10}$ to $C_{14}$ surfactants.

A series of experiments at the 50 mole % metal-halide/CTAB composition has also been performed to assess the viability of metal-rich liquid crystalline phases of other transition-metal halides. Polarized optical micrographs of a series of these liquids (a. $MnBr_2$, b. $FeBr_2$, c. $CoBr_2$, d. $NiCl_2$), confirm the ability to form metal-richer liquid crystalline phases. Furthermore, the variation in optical texture exhibited by the different metal-halides gives indication that subtle differences in the nature of the inorganic components can be exploited to direct the structure of these composite liquids, in accordance with the present invention. Compositions of the present invention can also comprise $BeF_2$, $ZnBr_2$, $ZnI_2$, $NiCl_2$, $NiBr_2$, $NiI_2$ $CuCl$, $CuBr$ $AlCl_3$ and $AlBr_3$, or a combination thereof.

Refractory inorganic polymers can also be used as templates to form 100% inorganic liquid crystalline phases. Examples include $V_2O_5$ aqueous gels, clays and certain chalcogenide polymers. Zinc chloride, by way of additional example, can serve as an effective "solvent" for the formation of lyotropic-like liquid crystalline phases with these polymers. Alternatively, covalent metal-halide 1-D chain structures such as $CuCl_2$ (chains of square planes), $MCl_3$ (face sharing octahedral chains (M=Sc, Zr, Mn, Cd for example) may exhibit a similar lyotropic behavior in "$ZnCl_2$-solvent".

REFERENCES

The publications and other materials listed below and/or set forth by author and date in the text above to illuminate the background of the invention, and in particular cases, to provide additional details respecting the practice, are incorporated herein by reference.

A. A. Fannin et al., *J. Phys. Chem.*, 1984, 88, 2609.
A. A. Fannin, Jr. et al., *J. Phys. Chem.*, 1984, 88, 2614.
A. Firouzi et al., *J. Am. Chem. Soc.*, 1997, 119, 3596–3610.
A. Grund and M. M. Pizy, *Acta Cryst.*, 1952, 5, 837.
A. J. Easteal and C. A. Angell, *J. Phys. Chem.*, 1970, 74, 3987.
A. M. Dattelbaum and J. D. Martin, *Inorg. Chem.*, 1999, 38, 6200–6205.
A. M. Dattelbaum and J. D. Martin. *Inorg. Chem.*, 1999, 38, 2669–2374.
A. Monnier et al., *Science*, 1993, 261, 1299–1303.
A. P. Alivisatos, et al. *Adv. Mater.*, 1998, 10,1297–1336.
A. S. Sonin, *J. Mater. Chem.*, 1998, 8, 2557.
A. T. Ward, *J. Phys. Chem.*, 1968, 72, 4133.
A. Uhlherr, and S. R. Elliott, *J. Phys. Condens. Matter*, 1994, 6, L99-L105.
B. Brehier, *Z. Kristallogr.* 1961, 115, 373–402.
B. V. Shanabrook and J. S. Lannin, *Phys. Rev.*, 1981, 824, 4771.
C. A. Angel and J. W. Shuppert, *J. Phys. Chem.*, 1980, 84, 538.
C. A. Angell and J. Wong, *J. Chem. Phys.* 1970, 53, 2053–2066.
C. A. Angell and W. Sichina, *Ann. N.Y. Acad. Sci,.* 1976, 279, 53.
C. Almirante et al., *J. Phys. Chem.* 1986, 90, 852–859.
C. Austen Angell, *J. Phys. Chem.* B. 1999, 103, 3977.
C. E. Fairhurst et al., *Handbook of Liquid Crystals*, Wiley-VCH, Weinheim, 1998, Vol. 3, pp 341–392.
C. J. Bowlas et al., *J. Chem. Soc. Chem. Commun*, 1996, 1625–1626.
C. K. Lee et al., *Chem. Mater.* 1999, 11, 1237.
C. L Hussey, in *Chemisry of Non-Aqueous Solutions*, G. Mamantov and A. I. Popov, Eds., VCH Publishiers, New York, 1994, pp. 227–275.
C. L. Hussey, in *Advances in Molten Salt Chemistry*, Vol. 5, G. Mamantov and C. B. Mamantov, Eds., Elsevier, Amsterdam, 1983, pp. 185–230.
C. T. Kresge et al., *Nature*, 1992, 359, 710–712
C. T. Rutledge and G. T. Clayton, *J. Chem. Phys.*, 1970, 52,1927.
C. T. Seip et al., *J. Am. Chem. Soc.*, 1997, 119, 7084–7094.
C. Tanford, *The Hydrophobic Effect: Formation of Micelles and Biological Membranes*, Wiley, New York, 1980, p. 75.
C. W. Tompson and N. S. Gingrich, *J. Chem. Phys.*, 1959, 31, 1598. Chem. Mater., 1998, 10, 1904–1913.
D. A. Allen, R. A. Howe, N. D. Wood and W. S. Howells, *J.Chem. Phys.* 1991, 94, 5071–5076.
D. L. Price et al., *J. Phys.: Condens. Matter*, 1991, 3, 9835–9842.
D. Mitzi, *Prog. Inorg. Chem.*, 1999, 48, 1–121.
D. W. Wertz, "Chemistry A Molecular Science," 1997, NCSU Chem. Dept. Publisher, Raleigh, NC. J. D. Martin: contributing author Chapter 6: Ionic Bonding and Crystalline Solids, Chapter 13:Inorganic Chemistry.
D. W. Wertz. "Chemistry A Quantative Science," 1998, NCSU Chem. Dept. Publisher, Raleigh, NC. J. D. Martin, contributing author.
D. Zhao et al., *Science*, 1998, 279, 548–552.
D. -P. Kim and J. Economy, *Chem. Mater.*, 1994, 6, 395–400.
E. Coronado and C. Mingotaud, *Adv. Mater.*, 1999, 11, 869–872.
E. Hengge and D. Kovar, *Z. Anorg. Allg. Chem.*, 1979, 458,163.
Eric R. Weeks et al., *Science*, 2000, 287, 627.
F. J. Zuniga and G. Chapuis, *Acta Cryst.* 1983, B39, 620–625.
F. J. Zuniga and G. Chapuis, *Ctyst Struct. Comm.* 1981, 10, 533–540.
F. J. Zuniga and G. Chapuis, *Mol. Ciyst Liq. Cryst.* (1985), 128, 349–366.
F. K. Broome et al., *J. Am. Chem. Soc.*, 73, 3350 (1951).
F. Neve et al., *Chem. Mater.*, 1998, 10, 1904.
F. Neve, *Adv. Mater.* 1996, 8, 277–289.
F. R. Duke and R. A. Fleming, J. Electrochem. Soc., 1957, 104, 251.
F. Reinitzer, *Monatsch Chem.*, 1888, 9, 421.
G. W. Gray and J. W. G. Goodby, *Smectic Liquid Crystals*: Textures and Structures, Leonard Hill, London, 1984 pp. 23–44, 74–81, plates 4, 26 and 29.
G. W. Stewart and R. M. Morrow, *Phys. Rev.*, 1927, 30, 232.
G. W. Stewart, *Faraday Trans.*, 1933, 982.
H. E. Stanley, *MRS Bull.*, 1999, 24, 22–30.
H. Eyring et al., *Proc. N. A. S.*, 1958, 44, 683.
H. Foliner and B. Brehler, *Acta Cryst*, 1970, B26, 1679–1682.

H. Hoshino et al., *Polymer Bull.* 1992, 29, 453–460.

H. L. Chum and R. A. Osteryoung, in *Ionic Liquids*, d. Inman and D. G. Lovering, Eds., Plenum Press, New Youk, 1981, pp. 407–423.

H. L. Yakel, and J. Brynestad, *Inorg. Chem.* 1978, 17, 3294–3295.

H. Liu et al., BNL National Synchrotron Light Source Activity Report, 1997, B-72.

H. Ohtaki and S.-I. Ishiguro in *Chemisry of Non-Aqueous Solutions*, G. Mamantov and A. I. Popov, Eds., VCH Publishiers, New York, 1994, pp.179–226.

H. Yang et al., *J. Mater. Chem.*, 1998, 8, 1205–1211.

H. Zocher and C. Töbrök, *Kolloid Z.*, 1960, 170, 140–144.

H. Zocher, *Z. Anorg. Allg. Chem.*, 147, 91 (1925).

I. S. Jacobs and P. E. Lawrence, *Phys. Rev.*, 1967, 164, 886–878.

J. A. Barker, *Lattice Theories of the Liquid State*, 1963, Pergamon Press, New York.

J. A. E. Desa et al., *J. Non-Cryst. Solids*, 1982, 51, 57–86.

J. Billard, in *Liquid Crystals of One-and Two Dimensional Order*, W. Helfrich and G. Heppke Eds., Springer-Verlag, Berlin, 1980, pp. 383–395.

J. D. MacKenzie and W. K. Murphy, *J. Chem. Phys.* 1960, 33, 366–369.

J. D. Martin and B. R. Leafblad. *Angew. Chem.*, 1998, 3318–3320. (Cover feature)

J. D. Martin and K. B. Greenwood. Angew. *Chem. Int Ed. Engl.*, 36, 2072–2075 (1997).

J. D. Martin and T. A. Thornton, *Proc. Mat Res. Soc.*, 1999, 559, 243–248.

J. D. Martin et al. *Chem. Mater.*, 1998, 10, 2699–2713.

J. D. Martin et al., *Inorg. Chem.*, 1998, 37, 1341–1346.

J. D. Martin and R. Hess. *J. Chem. Soc. Chem. Commun.*, 1996, 2419–20.

J. D. Martin. *J. Chem. Ed.*, 1998, 75, 325–327. Reprinted by invitation in Crucible, 1999, 30, 6–10.

J. D. Martin. *New Directions in Materials Synthesis, ACS Symposium in Print.* (reviewed) Eds. C. H. Winter and D. M. Hoffman. 1999, 727, 28–38.

J. E. Enderby, *Chem. Soc. Rev.* 1995, 159–168.

J. E. Rives, *Phys. Rev.*, 1967, 162, 491–496.

J. Fuller et al., *Chem. Soc. Chem. Commun.*, 1994, 299.

J. Fuller et al., *J. Electrochem. Soc.*, 1997, 144, 3881.

J. H. Clint, *Surfactant Aggregation*, Chapman and Hall: New York, 1992.

J. L. Serrano, Ed., *Metallomesogens: Synthesis, Properties and Applications*, VCH, New York 1995.

J. O. Isard, *J. Non-Cryst. Solids*, 1969, 1, 235–261.

J. R. Koe et al., *Angew. Chem. Int Ed.*, 1998, 37, 1441. (Angew. Chem., 1998, 110, 1513.)

J. R. Koe et al., *Polyhedron*, 1998, 17, 1971

J. S. Lannin, *J. Non-Cryst. Solids*, 1987, 97&98, 203.

J. Sayettatetal., *Angew Chem. Int Ed. Engl.*, 1998, 37, 1711–1714.

J. T. Fourkas et al. Eds., *Supercooled Liquids: Advances and Novel Applications*, ACS Books, Washington, D.C., 1997.

J. Wong and C. A. Angel, *Glass Structure by Spectroscopy*, 1976, Marcel Dekker, N.Y.

J. Wong and F. Lytle, *J. Non-Cryst Solids*, 1980, 37, 273–284.

K. Binnemans et al., *Phil. Trans. R. Soc. Lond.* A, 1999, 357, 3063–3077.

K. Binnemans et. al., *J. Am. Chem. Soc.*, 2000,

K. Fontell, *Colloid Polym. Sci.*, 1990, 268, 264–285.

K. Griesar et al., *Adv. Mater.*, 1994, 6, 381–384.

K. Kajiwara et al., *Makromol. Chem.*, 1986, 187, 2883–2893.

K. -H. Lii et al., *Chem. Mater.*, 1998, 10, 2599–2609.

L. Oervinka, *J. Non-Cryst Solids*, 1988, 106, 291.

L. Richter et al., *Textures of Liquid Crystals*, D. Demus, 1978.

M. E. Fisher, *Am. J. Phys.*, 1964, 32, 343.

M. O'Keeffe and B. G. Hyde, *Acta. Cryst*, 1976, B32 2923–2936.

M. Pomerantz et al., *Phys. Rev. Lett.*, 1978, 40, 246–249.

M. R. Ciajolo et al., *Acta Cryst.* 1977, B33, 553–555.

M. V. Suslic and S. V. Mentus, *J. Chem. Phys.* 1975, 62, 744–745.

M. Wilson and P. A. Madden *Phys. Rev. Lett.*, 1998, 80, 532–535.

M. Wilson et al., *J. Chem. Soc. Faraday Trans.* 1998, 94, 1221–1228.

N. Guillou et al., *Solid Chem. and Cryst Chem., Acad. Sci. Paris*, 1999, t.2, Series IIc, 387–392.

N. Guo et al., *Acta Cryst.* 1985, C51, 617–619.

O. Kahn, *Molecular Magnetism.* VCH: Weinheim, Germany, 1993. Chapter 11 "Magnetic Chain Compounds: pp 251–286.

P. A. Buining and H. N. W. Lekkerkerker, *J. Phys. Chem.* 1993, 97, 11510–11516.

P. Ballone et al., Tosi, *Physica*, 1986, 142B, 294–300.

P. Davidson et al., *Adv. Mater.* 1993, 5, 665–668.

P. Davidson et al., *Euro. Phys. Lett.* 1993, 21, 317–322.

P. Davidson et al., *J. Phys. II France*, 5, 1577 (1995).

P. Debye and P. Shearer, *Nachr. Gesell. Wiss. Göttingen*, 1916, 1; ibid., 1916, 16.

P. Ekwall, *Advances in Liquid Crystals*, Brown, G. H. (Ed.) Acad. Press, 1975, 1, 1–143.

P. Feng et al., *Nature*, 1997, 388, 735–740.

P. H. Gaskell and D. J. Wallis, *Phys. Rev. Lett.*, 1996, 76, 66–69.

P. H. Poole et al., *Phys. Rev. Lett.*, 1997, 2281–2284.

P. Kékicheff and B. Cabane, *J. Phys.*, 1987, 48, 1571–1583.

P. Kékicheff, *Mol. Cryst Liq. Cryst*, 1991, 198, 131–144.

P. S. Salmon, *Proc. R. Soc. Lond. A* 1994, 445, 3151–365.

R. Bums et al., *Z. Kristallogr.*, 1995, 210, 62.

R. M. Sullivan and J. D. Martin. Submitted to *J. Am. Chem. Soc.*, 1999.

R. M. Sullivan et al., BNL National Synchrotron Light Source Activity Report, 1998, in press. www.nsls.bnlgov/Pubs/ActivR/AR-98/MA 1218.pdf R. M. Wenslow and K. T. Mueller, *J. Non-Cryst. Solids*, 1998, 231, 78–88.

R. Schwartz and A. Koster, *Z. Anorg. Allg. Chem.*, 1952, 270, 2.

R. Schwarz and H. Mekbach, *Z. Anorg. Allg. Chem.*, 1937, 232, 241.

R. T. Carlin, and J. S. Wilkes, in Chemisry of Non-Aqueous Solutions, G. Mamantov and A. I. Popov, Eds., VCH Publishiers, New York, 1994, pp. 277–306.

Roger M. Sullivan and James D. Martin, *Luminescent Materials* Ed. J. McKittrick, Proc. Mat. Res. Soc., 1999, 560, in press.

S. Bigin and J. E. Enderby, *J. Phys. C: Solid State Phys.*, 1981, 14, 3129–3136.

S. R. Elliott, *J. Phys. Condens. Matter*, 1992, 4, 7661–7678.

S. R. Elliott, *Nature*, 1991, 354, 445–452.

S. R. Elliott, *Phys. Ref. Lett.*, 1991, 67, 711.

*Structural Inorganic Chemistry*, Fifth Ed. A. F. Wells, Oxford: New York, 1984.

T. Jiang and G. A. Ozin, *J. Mater. Chem.*, 1997, 7, 2213–2222.

T. Welton, *Chem. Rev.*, 1999, 99, 2071.

T. Yamaguchi et al., *J. Phys. Chem.*, 1989, 93, 2620–2625.

W. M. Meier and D. H. Olson, Butterworths-Heinemann: London, 1992.
W. Vogel, *Glass Chemistry*, 2$^{nd}$ edition, Springer-Verlag, Berlin, 1985.
W. W. Emerson, *Nature*, 1956, 178, 1248–1249.
X. Auvray et al., *J. Phys. Chem.*, 1989, 93, 7458–7464.
Y. Badyl and R. A. Howe, *J. Phys: Condens. Matter*, 1993, 5, 7189.
Y. Badyl and R. A. Howe, *J. Phys: Condens. Matter*, 1996, 8, 3733.
Y. Maeda and S. Hachisu, *Colloids and Surf.* 1983, 6, 1–16.
Y. S. Badyal et al., *J. Phys.: Condens. Matter*, 1994, 6, 10193–10220.
U.S. Pat. No. 2,239,551
U.S. Pat. No. 2,269,059
U.S. Pat. No. 2,272,342
U.S. Pat. No. 2,326,059
U.S. Pat. No. 3,117,838
U.S. Pat. No. 3,416,890
U.S. Pat. No. 3,486,913
U.S. Pat. No. 3,666,414
U.S. Pat. No. 4,043,802
U.S. Pat. No. 4,125,319
U.S. Pat. No. 4,133,517
U.S. Pat. No. 4,138,247
U.S. Pat. No. 4,232,552
U.S. Pat. No. 4,242,487
U.S. Pat. No. 4,292,253
U.S. Pat. No. 4,339,207
U.S. Pat. No. 4,362,645
U.S. Pat. No. 4,422,732
U.S. Pat. No. 4,491,604
U.S. Pat. No. 4,501,602
U.S. Pat. No. 4,552,855
U.S. Pat. No. 4,563,300
U.S. Pat. No. 4,563,301
U.S. Pat. No. 4,569,924
U.S. Pat. No. 4,599,869
U.S. Pat. No. 4,622,170
U.S. Pat. No. 4,701,024
U.S. Pat. No. 4,765,818
U.S. Pat. No. 4,794,296
U.S. Pat. No. 4,803,147
U.S. Pat. No. 4,810,673
U.S. Pat. No. 4,810,674
U.S. Pat. No. 4,839,112
U.S. Pat. No. 4,845,183
U.S. Pat. No. 4,939,215
U.S. Pat. No. 4,942,119
U.S. Pat. No. 5,008,234
U.S. Pat. No. 5,011,753
U.S. Pat. No. 5,043,002
U.S. Pat. No. 5,075,796
U.S. Pat. No. 5,114,760
U.S. Pat. No. 5,141,685
U.S. Pat. No. 5,152,819
U.S. Pat. No. 5,185,676
U.S. Pat. No. 5,211,934
U.S. Pat. No. 5,215,737
U.S. Pat. No. 5,227,223
U.S. Pat. No. 5,232,781
U.S. Pat. No. 5,250,282
U.S. Pat. No. 5,264,641
U.S. Pat. No. 5,270,781
U.S. Pat. No. 5,304,363
U.S. Pat. No. 5,308,602
U.S. Pat. No. 5,320,822
U.S. Pat. No. 5,334,368
U.S. Pat. No. 5,364,797
U.S. Pat. No. 5,370,785
U.S. Pat. No. 5,375,157
U.S. Pat. No. 5,378,962
U.S. Pat. No. 5,403,649
U.S. Pat. No. 5,422,384
U.S. Pat. No. 5,538,710
U.S. Pat. No. 5,545,367
U.S. Pat. No. 5,560,748
U.S. Pat. No. 5,563,424
U.S. Pat. No. 5,587,082
U.S. Pat. No. 5,591,326
U.S. Pat. No. 5,594,263
U.S. Pat. No. 5,595,715
U.S. Pat. No. 5,638,876
U.S. Pat. No. 5,645,891
U.S. Pat. No. 5,655,189
U.S. Pat. No. 5,672,556
U.S. Pat. No. 5,696,785
U.S. Pat. No. 5,712,402
U.S. Pat. No. 5,738,936
U.S. Pat. No. 5,785,946
U.S. Pat. No. 5,786,294
U.S. Pat. No. 5,800,800
U.S. Pat. No. 5,804,836
U.S. Pat. No. 5,830,427
U.S. Pat. No. 5,840,264
U.S. Pat. No. 5,841,493
U.S. Pat. No. 5,849,258
U.S. Pat. No. 5,855,864
U.S. Pat. No. 5,856,430
U.S. Pat. No. 5,856,431
U.S. Pat. No. 5,858,457
U.S. Pat. No. 5,863,515
U.S. Pat. No. 5,865,978
U.S. Pat. No. 5,876,637
U.S. Pat. No. 5,885,542
U.S. Pat. No. 5,902,564
U.S. Pat. No. 5,908,692

It will be understood that various details of the invention can be changed without departing from the scope of the invention. Furthermore, the foregoing description is for the purpose of illustration only, and not for the purpose of limitation-the invention being defined by the claims.

What is claimed is:

1. An inorganic glass of hybrid composition, the composition comprising:

(a) an inorganic component; and (b) a template component, wherein the inorganic component and the template component are present in the compositio n in a ratio that provides an intermediate range structural order to the composition.

2. The composition of claim 1, wherein the inorganic component further comprises a metal.

3. An inorganic liquid of hybrid composition or an inorganic glass of hybrid composition, the composition comprising:

(a) a met al halide inorganic component; and (b) a template component, wherein the metal halide inorganic component and the template component are present in the composition in a ratio that provides an intermediate range structural order to the composition.

4. The composition of claim 3, wherein the metal is selected from the group consisting of Al, Mn, Fe, Co, Ni, Cu, Cd, Zn and combinations thereof.

5. The composition of claim 3, wherein a halogen is selected from the group consisting of F, Cl, Br, I and combinations thereof.

6. The composition of claim 5, further comprising the formula:

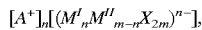

wherein A is the template component, $M^I$ is a metal in a monovalent oxidation state, $M^{II}$ is a metal in a divalent oxidation state, X is a halogen, and m and n are integers.

7. The composition of claim 1 or claim 3, wherein the template component is selected from the group consisting of an organic molecule or ion, a surfactant, an alkali metal cation, an alkaline earth metal cation, a clay, a nano-tube, a carbon fiber, a ceramic, and combinations thereof.

8. The composition of claim 7, wherein the surfactant further comprises an unsubstituted branched or unbranched $C_{1-20}$-alkyl, a substituted branched or unbranched $C_{1-20}$-alkyl, an unsubstituted branched or unbranched $C_{1-20}$-alkenyl, a substituted branched and unbranched $C_{1-20}$-alkenyls, an unsubstituted branched or unbranched $C_{1-20}$-alkynyls, a substituted branched or unbranched $C_{1-20}$-alkynyls, substituted, unsubstituted, or multiple ring aryl groups, or combinations thereof.

9. The composition of claim 8, wherein the surfactant further comprises a chain length of $C_8$ to $C_{18}$.

10. The composition of claim 9, wherein the surfactant further comprises a nitrogen substituent.

11. The composition of claim 1 or claim 3, wherein the ratio further comprises a greater mole percent of the inorganic component as compared to the template component to thereby provide an inorganic hybrid composition that is rich in the inorganic component.

12. The composition of claim 1 or claim 3, further comprising a polar solvent.

13. The composition of claim 12, wherein the polar solvent is water, acetone, methanol or a combination thereof.

14. The composition of claim 1 or claim 3, further comprising a macroscopic characteristic selected from the group consisting of a magnetic characteristic, an optical characteristic, a conductive characteristic, a catalytic characteristic, a luminescent characteristic, and combinations thereof.

15. A metallotropic liquid crystalline composition comprising:

(a) a metal halide inorganic component; and (b) a template component, wherein the metal halide inorganic component and the template component are present in the composition in a ratio that provides an intermediate range structural order to the composition.

16. The composition of claim 15, wherein the metal halide inorganic component comprises a metal selected from the group consisting of Al, Mn, Fe, Co, Ni, Cu, Cd, Zn and combinations thereof.

17. The composition of claim 16, wherein a halogen is selected from the group consisting of F, Cl, Br, I, and combinations thereof.

18. The composition of claim 15, wherein the template component is selected from the group consisting of an organic molecule or ion, a surfactant, an alkali metal cation, an alkaline earth metal cation, a clay, a nano-tube, a carbon fiber, a ceramic, and combinations thereof.

19. The composition of claim 18, wherein the surfactant further comprises an unsubstituted branched or unbranched $C_{1-20}$-alkyl, a substituted branched or unbranched $C_{1-20}$-alkyl, an unsubstituted branched or unbranched $C_{1-20}$-alkenyl, a substituted branched and unbranched $C_{1-20}$-alkenyls, an unsubstituted branched or unbranched $C_{1-20}$-alkynyls, a substituted branched or unbranched $C_{1-20}$-alkynyls, substituted, unsubstituted, or multiple ring aryl groups, or combinations thereof.

20. The composition of claim 19, wherein the surfactant further comprises a chain length of $C_8$ to $C_{18}$.

21. The composition of claim 19, wherein the surfactant further comprises a nitrogen substituent.

22. The composition of claim 21, further comprising a divalent metal halide and a surfactant template selected from the group consisting of $((CH_3)_3N(CH_2)_nCH_3)^+$, n=8–18; $((CH_3)_2N((CH_2)_nCH_3)_2)^+$, n=8–18; and $(C_5H_5N(CH_2)_nCH_3)^+$, n=8–18.

23. The composition of claim 17, wherein the metal halide is $ZnX_2$ where X=Cl or Br, and the composition further comprises from about 0.01 to about 90 mole percent $ZnX_2$.

24. The composition of claim 23, further comprising at least about 45 mole percent $ZnX_2$, and wherein the template component further comprises $((CH_3)_3NH]X$, X=Cl or Br.

25. The composition of claim 17 wherein the metal halide is $CdX_2$ where X=Cl or Br, and the composition further comprises from about 0.01 to about 60 mole percent $CdX_2$.

26. The composition of claim 17, wherein the metal halide is $CuX_2$ where X=Cl or Br, and the composition further comprises from about 0.01 to about 75 mole percent $CuX_2$.

27. The composition of claim 17, wherein the metal halide is $MX_2$ where $M=Mn^{II}$, $Fe^{II}$, $Co^{II}$ or $Ni^{II}$ and X=Cl or Br, and the composition further comprises 50 mole percent $MX_2$.

28. The composition of claim 15, wherein the ratio further comprises a greater mole percent of the inorganic component as compared to the template component to thereby provide an inorganic hybrid composition that is rich in the inorganic component.

29. The composition of claim 15, further comprising a polar solvent.

30. The composition of claim 29, wherein the polar solvent is water, acetone, methanol or a combination thereof.

31. The composition of claim 15, further comprising a macroscopic characteristic selected from the group consisting of a magnetic characteristic, an optical characteristic, a conductive characteristic, a catalytic characteristic, a luminescent characteristic, and combinations thereof.

32. A metallotropic glass composition comprising:

(a) an inorganic component; and (b) a template component, wherein the inorganic component and the template component are present in the composition in a ratio that provides an intermediate range structural order to the composition.

33. The composition of claim 32, wherein the metal is selected from the group consisting of Al, Mn, Fe, Co, Ni, Cu, Cd, Zn and combinations thereof.

34. The composition of claim 32, further comprising a metal halide.

35. The composition of claim 34, wherein a halogen is selected from the group consisting of F, Cl, Br, I, and combinations thereof.

36. The composition of claim 32, wherein the template component is selected from the group consisting of an organic molecule or ion, a surfactant, an alkali metal cation, an alkaline earth metal cation, a clay, a nano-tube, a carbon fiber, a ceramic, and combinations thereof.

37. The composition of claim 36, wherein the surfactant further comprises an unsubstituted branched or unbranched $C_{1-20}$-alkyl, a substituted branched or unbranched $C_{1-20}$- alkyl, an unsubstituted branched or unbranched $C_{1-20}$-alkenyl, a substituted branched and unbranched $C_{1-20}$-alkenyls, an unsubstituted branched or unbranched $C_{1-20}$-alkynyls, a substituted branched or unbranched $C_{1-20}$-alkynyls, substituted, unsubstituted, or multiple ring aryl groups, or combinations thereof.

38. The composition of claim 37, wherein the surfactant further comprises a chain length of $C_8$ to $C_{18}$.

39. The composition of claim 36, wherein the surfactant further comprises a nitrogen substituent.

40. The composition of claim 32, wherein the ratio further comprises a greater proportion of the inorganic component as compared to the template component to thereby provide a metallotropic glass composition that is rich in the inorganic component.

41. The composition of claim 3, further defined as a liquid crystal.

42. A method of preparing an inorganic glass that is a hybrid material comprising an inorganic component and an organic component that together exhibit an intermediate range structural order, the method comprising:

(a) providing an inorganic component;

(b) providing a template component; and (c) mixing the inorganic and the template components at a ratio that provides an intermediate range structural order, whereby an inorganic hybrid material having an intermediate range structural order is produced.

43. The method of claim 42, wherein the inorganic component further comprises a metal.

44. A method of preparing an inorganic liquid or glass that is a hybrid material comprising a metal halide inorganic component and an organic component that together exhibit an intermediate range structural order, the method comprising:

(a) providing a metal halide inorganic component;

(b) providing a template component; and (c) mixing the metal halide inorganic and the template components at a ratio that provides an intermediate range structural order, whereby an inorganic hybrid material having an intermediate range structural order is produced.

45. The method of claim 42 or claim 44, wherein the ratio further comprises a greater mole percent of the inorganic component as compared to the template component to thereby provide an inorganic hybrid material that is rich in the inorganic component.

46. The method of claim 44, wherein the metal is selected from the group consisting of Al, Mn, Fe, Co, Ni, Cu, Cd, Zn and combinations thereof.

47. The method of claim 44, wherein a halogen is selected from the group consisting of F, Cl, Br, I, and combinations thereof.

48. The method of claim 44, wherein the metal halide further comprises the formula:

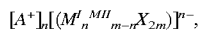

wherein A is the template component, $M^I$ is a metal in a monovalent oxidation state, $M^{II}$ is a metal in a divalent oxidation state, X is a halogen, and m and n are integers.

49. The method of claim 44, wherein the metal is zinc and the halide is chloride or bromide and the zinc is present in an amount ranging from about 0.01 to about 90 mole percent.

50. The method of claim 44, wherein the metal is cadmium and the halide is chloride or bromide and the cadmium is present in an amount ranging from about 0.01 to about 60 mole percent.

51. The method of claim 44, wherein the metal is copper and the halide is chloride or bromide and the copper is present in an amount ranging from about 0.01 to about 75 mole percent.

52. The method of claim 44, wherein the metal halide is $MX_2$ where $M=Mn^{II}$, $Fe^{II}$, $Co^{II}$ or $Ni^{II}$ and $X=Cl$ or Br, and the composition further comprises 50 mole percent $MX_2$.

53. The method of claim 42 or claim 44, wherein the template component is selected from the group consisting of an organic molecule or ion, a surfactant, an alkali metal cation, an alkaline earth metal cation, a clay, a nano-tube, a carbon fiber, a ceramic, and combinations thereof.

54. The method of claim 53, wherein the surfactant further comprises an unsubstituted branched or unbranched $C_{1-20}$-alkyl, a substituted branched or unbranched $C_{1-20}$-alkyl, an unsubstituted branched or unbranched $C_{1-20}$-alkenyl, a substituted branched and unbranched $C_{1-20}$-alkenyls, an unsubstituted branched or unbranched $C_{1-20}$-alkynyls, a substituted branched or unbranched $C_{1-20}$-alkynyls, substituted, unsubstituted, or multiple ring aryl groups, or combinations thereof.

55. The method of claim 54, wherein the surfactant further comprises a chain length of $C_8$ to $C_{18}$.

56. The method of claim 54, wherein the surfactant further comprises a nitrogen substituent.

57. The method of claim 44, wherein the inorganic hybrid material is a liquid crystalline material.

58. The method of claim 42 or claim 44, wherein the mixing of the inorganic component and the template component further comprises melting the mixture or further comprises melting the inorganic component, melting the template component and mixing the melts.

59. The method of claim 42 or claim 44, wherein the mixing of the inorganic component and the template component further comprises mixing the inorganic cormponent and the template material in a solvent and evaporating the solvent.

60. The method of claim 42 or claim 44, further comprising adding a polar solvent to the mixing of the inorganic component and the template component.

61. The method of claim 60, wherein the polar solvent is water, acetone, methanol or combinations thereof.

* * * * *